US012088802B2

(12) United States Patent
Kanoh et al.

(10) Patent No.: US 12,088,802 B2
(45) Date of Patent: *Sep. 10, 2024

(54) ENCODER, DECODER, ENCODING METHOD, AND DECODING METHOD

(71) Applicant: Panasonic Intellectual Property Corporation of America, Torrance, CA (US)

(72) Inventors: Ryuichi Kanoh, Osaka (JP); Tadamasa Toma, Osaka (JP); Kiyofumi Abe, Osaka (JP); Takahiro Nishi, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 236 days.

This patent is subject to a terminal disclaimer.

(21) Appl. No.: 17/876,925

(22) Filed: Jul. 29, 2022

(65) Prior Publication Data

US 2022/0385902 A1    Dec. 1, 2022

Related U.S. Application Data

(63) Continuation of application No. 16/942,081, filed on Jul. 29, 2020, now Pat. No. 11,438,588, which is a
(Continued)

(51) Int. Cl.
*H04N 19/119*    (2014.01)
*H04N 19/176*    (2014.01)

(52) U.S. Cl.
CPC ......... *H04N 19/119* (2014.11); *H04N 19/176* (2014.11)

(58) Field of Classification Search
CPC .......................... H04N 19/119; H04N 19/176
See application file for complete search history.

(56) References Cited

U.S. PATENT DOCUMENTS

| 2012/0033731 | A1 | 2/2012 | Yamamoto et al. |
| 2017/0208336 | A1 | 7/2017 | Li et al. |

(Continued)

FOREIGN PATENT DOCUMENTS

| JP | 2017-28726 | 2/2017 |
| WO | 2017/123980 | 7/2017 |

OTHER PUBLICATIONS

International Search Report (ISR) issued on Mar. 26, 2019 in International (PCT) Application No. PCT/JP2019/003039.
(Continued)

*Primary Examiner* — Dakshesh D Parikh
(74) *Attorney, Agent, or Firm* — Wenderoth, Lind & Ponack, L.L.P.

(57) ABSTRACT

An encoder includes circuitry and memory coupled to the circuitry. The circuitry in operation: determines whether the shape of a current chroma block to be split satisfies a first condition; generates one or more second candidates for a block partitioning method by eliminating one or more predetermined candidates from a plurality of first candidates for a block partitioning method when the current chroma block satisfies the first condition; selects a block partitioning method from among the one or more second candidates; and splits the current chroma block according to the block partitioning method selected.

2 Claims, 40 Drawing Sheets

Related U.S. Application Data continuation of application No. PCT/JP2019/003039, filed on Jan. 29, 2019.

(60) Provisional application No. 62/623,822, filed on Jan. 30, 2018.

(56) References Cited

U.S. PATENT DOCUMENTS

2017/0251221 A1   8/2017  Yamamoto et al.
2020/0137424 A1*  4/2020  Zhao .................. H04N 19/184

OTHER PUBLICATIONS

H.265 (ISO/IEC 23008-2 High Efficiency video coding (HEVC)), Dec. 1, 2013.
Jianle Chen, et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, Document: JVET-G1001-v1, Jul. 2017, pp. 1-6.
Joint Video Exploration Team (JVET), HM-16.6-JEM-7.1, source/Lib/TLibEncoder/TEncSbac.cpp, https://jvet.hhi.fraunhofer.de/trac/vvc/browser/jem/tags/HM-16.6-JEM-7.1?order=name, Oct. 2017.
ITU-T H.265, "High efficiency video coding", Series H: Audiovisual and Multimedia Systems, Apr. 2013, pp. 32, 63-68.

* cited by examiner

FIG. 3

| TRANSFORM TYPE | BASIS FUNCTION $T_i(j)$, $i, j = 0, 1, ..., N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$<br>WHERE $\omega_0 = \begin{cases} \sqrt{\dfrac{2}{N}} & i = 0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$<br>WHERE $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

TEMPLATE GENERATED BASED ON REFERENCE PIXEL OF
CANDIDATE MV (L0) AND REFERENCE PIXEL OF CANDIDATE MV (L1)

FIG. 15

| CONDITION | BLOCK PARTITION SHAPE | LIMITING CONDITION |
|---|---|---|
| (SHORTER SIDE) = (LONGER SIDE) * SQUARE | 306, 307, 308, 309 | SPLITTABLE IN BOTH VERTICAL AND HORIZONTAL DIRECTIONS |
| (SHORTER SIDE) < (LONGER SIDE) * RECTANGLE | 310 PROHIBITED; 311; 312 PROHIBITED; 313 | ELIMINATE, FROM BLOCK PARTITIONING METHOD CANDIDATES, SPLITTING HORIZONTALLY ELONGATED BLOCK IN HORIZONTAL DIRECTION AND SPLITTING VERTICALLY ELONGATED BLOCK IN VERTICAL DIRECTION |

FIG. 18

| CONDITION | BLOCK PARTITION SHAPE | LIMITING CONDITION |
|---|---|---|
| (SHORTER SIDE) = (LONGER SIDE) * SQUARE | 306 307 308 309 | SPLITTABLE IN BOTH VERTICAL AND HORIZONTAL DIRECTIONS |
| (SHORTER SIDE) < (LONGER SIDE) * RECTANGLE | 310 PROHIBITED<br>311<br>312 PROHIBITED<br>313 | REGARDING TERNARY SPLITTING, ELIMINATE, FROM BLOCK PARTITIONING METHOD CANDIDATES, SPLITTING HORIZONTALLY ELONGATED BLOCK IN HORIZONTAL DIRECTION AND SPLITTING VERTICALLY ELONGATED BLOCK IN VERTICAL DIRECTION |

FIG. 20

| CONDITION | BLOCK PARTITION SHAPE | LIMITING CONDITION |
|---|---|---|
| (SHORTER SIDE) = (LONGER SIDE) * SQUARE | 306, 307, 308, 309 | SPLITTABLE IN BOTH VERTICAL AND HORIZONTAL DIRECTIONS |
| (SHORTER SIDE) < (LONGER SIDE) ≤ (SHORTER SIDE × 2) | 314, 315, 316, 317 | SPLITTABLE IN BOTH VERTICAL AND HORIZONTAL DIRECTIONS |
| (SHORTER SIDE × 2) < (LONGER SIDE) | 318 PROHIBITED, 319, 320 PROHIBITED, 321 | ELIMINATE, FROM BLOCK PARTITIONING METHOD CANDIDATES, SPLITTING HORIZONTALLY ELONGATED BLOCK IN HORIZONTAL DIRECTION AND SPLITTING VERTICALLY ELONGATED BLOCK IN VERTICAL DIRECTION |

FIG. 22

| CONDITION | BLOCK PARTITION SHAPE | LIMITING CONDITION |
|---|---|---|
| (SHORTER SIDE) = (LONGER SIDE) * SQUARE | 306, 307, 308, 309 | SPLITTABLE IN BOTH VERTICAL AND HORIZONTAL DIRECTIONS |
| (SHORTER SIDE) < (LONGER SIDE) AND (SHORTER SIDE ≥ 32) | 322, 323, 324, 325, 326, 327, 32 PIXELS | SPLITTABLE IN BOTH VERTICAL AND HORIZONTAL DIRECTIONS |
| (SHORTER SIDE) < (LONGER SIDE) AND (SHORTER SIDE < 32) | 328, 329 PROHIBITED; 330, 331 PROHIBITED | ELIMINATE, FROM BLOCK PARTITIONING METHOD CANDIDATES, SPLITTING HORIZONTALLY ELONGATED BLOCK IN HORIZONTAL DIRECTION AND SPLITTING VERTICALLY ELONGATED BLOCK IN VERTICAL DIRECTION |

FIG. 24

| CONDITION | BLOCK PARTITION SHAPE | LIMITING CONDITION |
|---|---|---|
| LESS THAN 1:2 | 332  333  334  335 | SPLITTABLE IN BOTH VERTICAL AND HORIZONTAL DIRECTIONS |
| AT LEAST 1:2 AND LESS THAN 1:4 | 336  337<br>338  339 PROHIBITED | REGARDING TERNARY SPLITTING, ELIMINATE, FROM BLOCK PARTITIONING METHOD CANDIDATES, SPLITTING HORIZONTALLY ELONGATED BLOCK IN HORIZONTAL DIRECTION AND SPLITTING VERTICALLY ELONGATED BLOCK IN VERTICAL DIRECTION |
| GREATER THAN 1:4 | 340  341<br>342 PROHIBITED  343 PROHIBITED | REGARDING TERNARY SPLITTING AND BINARY SPLITTING, ELIMINATE SPLITTING HORIZONTALLY ELONGATED BLOCK IN HORIZONTAL DIRECTION AND SPLITTING VERTICALLY ELONGATED BLOCK INTO VERTICAL DIRECTION, FROM BLOCK PARTITIONING METHOD CANDIDATES |

FIG. 37
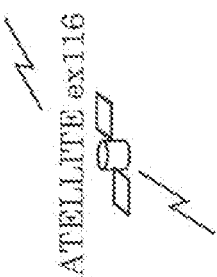
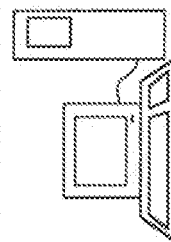
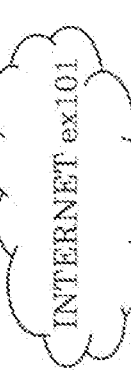
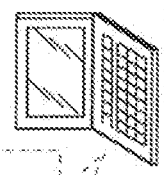

U.S. 12,088,802 B2

ENCODER, DECODER, ENCODING METHOD, AND DECODING METHOD

BACKGROUND

1. Technical Field

The present disclosure relates to an encoder that encodes a video including a plurality of pictures, and related technologies.

2. Description of the Related Art

Conventionally, H.265 has been known as standards for encoding moving pictures. H.265 is also referred to as High-Efficiency Video Coding (HEVC) (H.265 (ISO/IEC 23008-2 HEVC)/HEVC (High Efficiency Video Coding)) (see, for example, Non-patent Literature (NPL) 1).

SUMMARY

An encoder according to one aspect of the present disclosure includes circuitry and memory coupled to the circuitry. The circuitry in operation: determines whether a shape of a current chroma block to be split in an image satisfies a first condition; generates one or more second candidates for a block partitioning method by eliminating one or more predetermined candidates from a plurality of first candidates for a block partitioning method when the shape of the current chroma block satisfies the first condition; selects a block partitioning method from among the one or more second candidates; and splits the current chroma block according to the block partitioning method selected.

It should be noted that these generic or specific aspects may be implemented using a system, a method, an integrated circuit, a computer program, or a non-transitory computer-readable recording medium such as a compact disc read only memory (CD-ROM), and may also be implemented by any combination of systems, methods, integrated circuits, computer programs, and non-transitory computer-readable recording media.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 is a chart indicating transform basis functions for each transform type;

FIG. 15 is a chart illustrating block partitioning methods and a limiting condition when splitting is performed, according to concrete example 1 of the first aspect;

FIG. 18 is a chart illustrating block partitioning methods and a limiting condition when splitting is performed, according to concrete example 2 of the first aspect;

FIG. 20 is a chart illustrating block partitioning methods and a limiting condition when splitting is performed, according to concrete example 3 of the first aspect;

FIG. 22 is a chart illustrating block partitioning methods and a limiting condition when splitting is performed, according to concrete example 4 of the first aspect;

FIG. 24 is a chart illustrating block partitioning methods and a limiting condition when splitting is performed, according to concrete example 5 of the first aspect;

FIG. 37 illustrates an overall configuration of a content providing system for implementing a content distribution service;

DETAILED DESCRIPTION OF THE EMBODIMENTS

Figure 1:
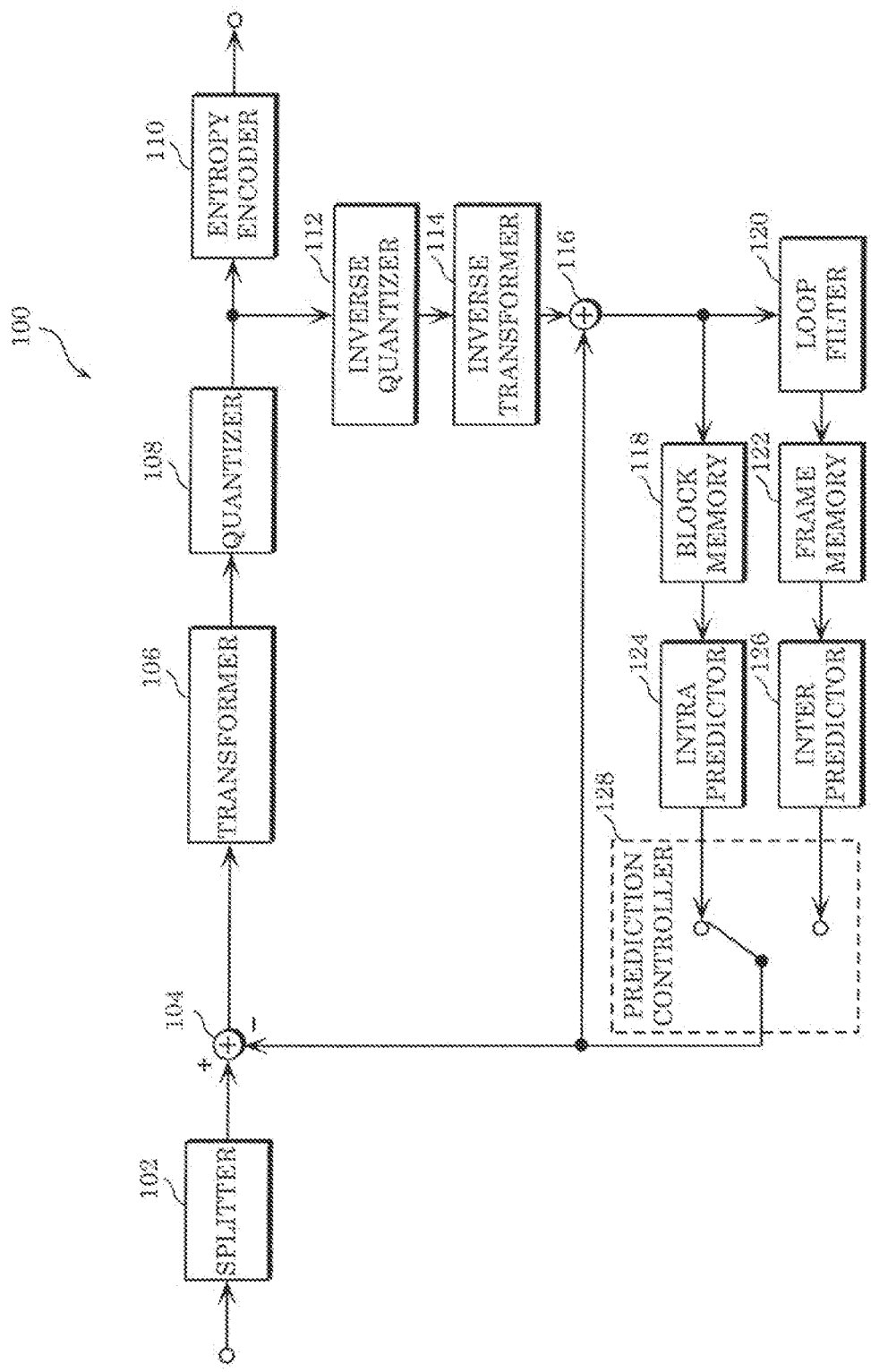
FIG. 1 is a block diagram illustrating a functional configuration of an encoder according to Embodiment 1.

[Underlying Knowledge Forming Basis of the Present Disclosure]

An encoder that encodes a video including a plurality of pictures includes a block splitter that partitions each of the pictures into units such as coding tree units (CTUs) and coding units (CUs) into which a CTU is recursively split.

In the process of partitioning a picture into CTUs, the picture is partitioned into CTUs, each having a fixed size, which are raster-scanned from upper left to lower right. The size of a CTU may be set to any pixel size among 16×16, 32×32, and 64×64, using any value of 16, 32, and 64 which are multiples of 16.

In the process of partitioning a CTU into CUs, the CTU is partitioned into CUs each having a variable size based on quadtree block splitting that is recursive. A quadtree is a tree structure in which each board is split into four branches. When a CTU is not to be partitioned, the CTU becomes a CU and the size of the CTU becomes the largest size of a CU. The size of a CU may be set to any pixel size among 8×8, 16×16, 32×32, and 64×64.

In view of this, an encoder according to one aspect of the present disclosure includes circuitry and memory. Using the memory, the circuitry: determines whether a shape of a current block to be split in an image satisfies a first condition; generates one or more second candidates for a block partitioning method by eliminating one or more predetermined candidates from a plurality of first candidates for a block partitioning method when the shape of the current block satisfies the first condition; selects a block partitioning method from among the one or more second candidates; and splits the current block according to the block partitioning method selected.

This enables the encoder to generate, under a given condition, new candidates for a block partitioning method by eliminating one or more candidates from a multiple number of candidates for a block partitioning method, and to split a current block into shapes corresponding to shapes obtained by using a block partitioning method selected from among the generated candidates. Accordingly, the encoder is capable, under a given condition, of splitting the current block using the block partitioning method efficiently selected. In addition, the encoder is capable of prohibiting the appearance of a block having a shape corresponding to a shape obtained by using a block partitioning method candidate that has been eliminated. Therefore, when a coding mode is determined using an optimization method such as a rate-distortion (R-D) optimization, the number of variations for carrying out trial calculations decreases and it is expected that the amount of processing for encoding decreases while the degradation of coding efficiency is inhibited. Moreover, with the encoder intentionally biasing the generation frequency of information relating to a block partitioning direction, accuracy in probability estimation in arithmetic coding using a context, such as context adaptive binary arithmetic coding (CABAC), increases, and the improvement of coding performance can be expected.

The first condition is, for example, that the shape of the current block is a rectangle.

With this, when the shape of a current block to be split is a rectangle, the encoder is capable of generating new candidates for a block partitioning method by eliminating one or more candidates from a multiple number of candidates for a block partitioning method, and splitting the current block into shapes corresponding to shapes obtained by using a block partitioning method selected from among the generated candidates. Accordingly, when the shape of the current block is a rectangle, the encoder is capable of splitting the current block using the block partitioning method efficiently selected.

The first condition is, for example, that a ratio of a longer side to a shorter side of the current block is greater than a first value.

With this, when the shape of a current block to be split is a rectangle more elongated than a predetermined shape, the encoder is capable of splitting the current block into shapes corresponding to shapes obtained by using a block partitioning method selected from among candidates for a block partitioning method generated by eliminating one or more candidates from a multiple number of candidates for a block partitioning method. Accordingly, when the shape of the current block is a rectangle more elongated than the predetermined shape, the encoder is capable of splitting the current block into the shapes corresponding to the shapes obtained by using the block partitioning method efficiently selected.

The first value is, for example, 2.

With this, when the shape of a current block to be split is a rectangle having the longer side that is two times as long as the shorter side, the encoder is capable of splitting the current block into shapes corresponding to shapes obtained by using a block partitioning method selected from among candidates for a block partitioning method generated by eliminating one or more candidates from a multiple candidates for a block partitioning method. Accordingly, when the current block is a rectangle having the longer side that is two times as long as the shorter side, the encoder is capable of splitting the current block into the shapes corresponding to the shapes obtained by using the block partitioning method efficiently selected.

The first value is, for example, 4.

With this, when the shape of a current block to be split is a rectangle having the longer side that is four times as long as the shorter side, the encoder is capable of splitting the current block into shapes corresponding to shapes obtained by using a block partitioning method selected from among candidates for a block partitioning method generated by eliminating one or more candidates from a multiple number of candidates for a block partitioning method. Accordingly, when the current block is a rectangle having the longer side that is four times as long as the shorter side, the encoder is capable of splitting the current block into the shapes corresponding to the shapes obtained by using the block partitioning method efficiently selected.

The first condition is, for example, that the shape of the current block is a rectangle and a length of a shorter side of the current block is less than a second value.

With this, when the shape of a current block to be split is a rectangle having the shorter side that is less than a predetermined value, that is, when the current block has an elongated shape, the encoder is capable of splitting the current block into shapes corresponding to shapes obtained by using a block partitioning method selected from among candidates for a block partitioning method generated by eliminating one or more candidates from a multiple number of candidates for a block partitioning method. Accordingly, when the current block is a rectangle having the shorter side that is less than the predetermined value, that is, when the current block has an elongated shape, the encoder is capable of splitting the current block into the shapes corresponding to the shapes obtained by using the block partitioning method efficiently selected.

The second value is, for example, 64 pixels.

With this, when the shape of a current block to be split is a rectangle having the shorter side that is less than 64 pixels, the encoder is capable of splitting the current block into shapes corresponding to shapes obtained by using a block partitioning method selected from among candidates for a block partitioning method generated by eliminating one or more candidates from a multiple number of candidates for a block partitioning method. Accordingly, when the current block is a rectangle having the shorter side that is less than 64 pixels, the encoder is capable of splitting the current block into the shapes corresponding to the shapes obtained by using the block partitioning method efficiently selected.

The first condition is, for example, that a ratio of a longer side to a shorter side of a block generated through the splitting of the current block is greater than a third value.

With this, when a current block is split into rectangles each being more elongated than a predetermined shape, the encoder is capable of splitting the current block into shapes corresponding to shapes obtained by using a block partitioning method selected from among candidates for a block partitioning method generated by eliminating one or more candidates from a multiple number of candidates for a block partitioning method. Accordingly, when the current block is split into rectangles each being more elongated than the predetermined shape, the encoder is capable of splitting the current block into the shapes corresponding to the shapes obtained by using the block partitioning method efficiently selected.

The third value is, for example, 4.

With this, when a current block is split into rectangles each having the longer side that is four times as long as the shorter side, the encoder is capable of splitting the current block into shapes corresponding to shapes obtained by using a block partitioning method selected from among candidates for a block partitioning method generated by eliminating one or more candidates from a multiple number of candidates for a block partitioning method. Accordingly, when the current block is split into rectangles each having the longer side that is four times as long as the shorter side, the encoder is capable of splitting the current block into the shapes corresponding to the shapes obtained by using the block partitioning method efficiently selected.

The third value is, for example, 8.

With this, when a current block is split into rectangles each having the longer side that is eight times as long as the shorter side, the encoder is capable of splitting the current block into shapes corresponding to shapes obtained by using a block partitioning method selected from among candidates for a block partitioning method generated by eliminating one or more candidates from a multiple number of candidates for a block partitioning method. Accordingly, when the current block is split into rectangles each having the longer side that is eight times as long as the shorter side, the encoder is capable of splitting the current block into the shapes corresponding to the shapes obtained by using the block partitioning method efficiently selected.

The one or more predetermined candidates include, for example, a candidate that splits a block having a shorter side and a longer side in such a manner that a ratio of the longer side to the shorter side further increases.

This enables the encoder to eliminate a block partitioning method candidate such that a current block is split into shapes each being more elongated than before the splitting. The encoder is therefore capable of prohibiting the appearance of an extremely elongated block that is expected to hardly appear in the process of block partitioning. Accordingly, when a coding mode is determined using an optimization method such as an R-D optimization, the number of variations for trial calculations decreases and it is expected that the amount of processing for encoding decreases while the degradation of coding efficiency is inhibited. Moreover, the encoder intentionally biases the generation frequency of information relating to a block partitioning direction. Thus, accuracy in probability estimation in arithmetic coding using a context, such as CABAC, increases, and the improvement of encoding performance can be expected. The encoder is also capable of limiting the appearance of an extremely elongated block, and this in turn makes it possible to improve subjective image quality.

The one or more predetermined candidates include, for example, a candidate that performs binary splitting on a block having a shorter side and a longer side in such a manner that a ratio of the longer side to the shorter side further increases.

This enables the encoder to eliminate a block partitioning method candidate such that a current block is split into two blocks each being more elongated than before the splitting. The encoder is therefore capable of prohibiting the appearance of an extremely elongated block that is predicted to hardly appear in the process of block partitioning. Accordingly, when a coding mode is determined using an optimization method such as an R-D optimization, the number of variations for trial calculations decreases and it is expected that the amount of processing for encoding decreases while the degradation of coding efficiency is inhibited. Moreover, the encoder intentionally biases the generation frequency of information relating to a block partitioning direction. Thus, accuracy in probability estimation in arithmetic coding using a context, such as CABAC, increases, and the improvement of encoding performance can be expected. The encoder is also capable of limiting the appearance of an extremely elongated block, and this in turn makes it possible to improve subjective image quality.

The one or more predetermined candidates include, for example, a candidate that performs ternary splitting on a block having a shorter side and a longer side in such a manner that a ratio of the longer side to the shorter side further increases.

This enables the encoder to eliminate a block partitioning method candidate such that a current block is split into three blocks each being more elongated than before the splitting. The encoder is therefore capable of prohibiting the appearance of an extremely elongated block that is predicted to hardly appear in the process of block partitioning. Accordingly, when a coding mode is determined using an optimization method such as an R-D optimization, the number of variations for trial calculations decreases and it is expected that the amount of processing for encoding decreases while the degradation of coding efficiency is inhibited. Moreover, the encoder intentionally biases the generation frequency of information relating to a block partitioning direction. Thus, accuracy in probability estimation in arithmetic coding using a context, such as CABAC, increases, and the improvement of encoding performance can be expected. The encoder is also capable of limiting the appearance of an extremely elongated block, and this in turn makes it possible to improve subjective image quality.

For example, when the shape of the current block does not satisfy a second condition, the circuitry encodes block partitioning information relating to the block partitioning method according to which the current block is split, and when the shape of the current block satisfies the second condition, the circuitry skips the encoding of the block partitioning information.

This enables the encoder to reduce an encoding load by skipping the process of encoding block partitioning information and writing a bitstream into syntax as required by the encoding. Accordingly, the encoder is capable of improving coding efficiency.

The block partitioning information includes, for example, at least one of a number into which the current block is split or a direction in which the current block is split.

This enables the encoder to include, into block partitioning information, information for uniquely determining a block partition shape.

The second condition is, for example, that the block partitioning method involves a partitioning direction and the shape of the current block is a rectangle.

This enables the encoder to skip the encoding of block partitioning information when the block partitioning method according to which a current block is split involves a direction and the shape of the current block is a rectangle. Accordingly, the encoder is capable of improving coding efficiency.

The second condition is, for example, that the block partitioning method is binary splitting and the shape of the current block is a rectangle.

This enables the encoder to skip the encoding of block partitioning information when the block partitioning method according to which a current block is split is binary splitting and the shape of the current block is a rectangle. Accordingly, the encoder is capable of improving coding efficiency.

The second condition is, for example, that the block partitioning method is binary splitting and a ratio of a longer side to a shorter side of the current block is greater than a predetermined value.

This enables the encoder to skip the encoding of block partitioning information when the block partitioning method according to which a current block is split is binary splitting and a ratio of the longer side to the shorter side of the current block is greater than a predetermined value. Accordingly, the encoder is capable of improving coding efficiency.

The second condition is, for example, that the block partitioning method is ternary splitting and the shape of the current block is a rectangle.

This enables the encoder to skip the encoding of block partitioning information when the block partitioning method according to which a current block is split is ternary splitting and the shape of the current block is a rectangle. Accordingly, the encoder is capable of improving coding efficiency.

The second condition is, for example, that the block partitioning method is ternary splitting and a ratio of a longer side to a shorter side of the current block is greater than a predetermined value.

This enables the encoder to skip the encoding of block partitioning information when the block partitioning method according to which a current block is split is ternary splitting and a ratio of the longer side to the shorter side of the current block is greater than a predetermined value. Accordingly, the encoder is capable of improving coding efficiency.

For example, the circuitry writes the first condition into syntax that is a sequence layer, a picture layer, or a slice layer.

This enables the encoder to transmit, to a decoder, information relating to a block partitioning method candidate to be eliminated. Accordingly, the decoder is capable of improving decoding efficiency.

For example, the circuitry writes the first condition into a sequence parameter set (SPS).

This enables the encoder to transmit, to a decoder, information relating to a block partitioning method candidate to be eliminated. Accordingly, the decoder is capable of improving decoding efficiency.

For example, a decoder according to one aspect of the present disclosure includes circuitry and memory. Using the memory, the circuitry: parses, from an encoded bitstream generated by encoding an image, block partitioning information relating to a block partitioning method according to which a current block to be split in the image is split; and splits the current block based on the block partitioning information parsed. When a shape of the current block satisfies a first condition, the block partitioning information is generated by (i) generating one or more second candidates for a block partitioning method by eliminating one or more predetermined candidates from a plurality of first candidates for a block partitioning method and (ii) selecting a block partitioning method from among the one or more second candidates.

This enables the decoder to split a current block into shapes corresponding to shapes obtained by using a block partitioning method selected from among candidates for a block partitioning method generated under a given condition by eliminating one or more candidates from a multiple number of candidates for a block partitioning method. Accordingly, the decoder is capable of splitting the current block into the shapes corresponding to the shapes obtained by using the block partitioning method efficiently selected. In addition, the decoder is capable, under a given condition, of prohibiting the appearance of a block having a shape corresponding to a shape obtained by using a block partitioning method that has been eliminated. Therefore, when a decoding mode is determined using an optimization method such as an R-D optimization, the number of variations for trial calculations decreases and it is expected that the amount of processing for decoding decreases while the degradation of decoding efficiency is inhibited. Moreover, the decoder intentionally biases the generation frequency of the information relating to a block partitioning direction. This increases accuracy in probability estimation in arithmetic decoding using a context, such as CABAD, and the improvement of decoding performance can be expected.

For example, when the shape of the current block does not satisfy a second condition, the circuitry performs a decoding process by (i) parsing the block partitioning information relating to the block partitioning method according to which the current block is split and (ii) splitting the current block. When the shape of the current block satisfies the second condition, the circuitry performs a decoding process by splitting the current block without parsing the block partitioning information.

This enables the decoder to reduce the amount of decoding by not decoding information relating to encoding and a bitstream generated by writing block partitioning information into syntax. Accordingly, the decoder is capable of improving decoding efficiency.

The block partitioning information relates to, for example, at least one of a number into which the current block is split or a direction in which the current block is split.

This enables the decoder to include, into the block partitioning information, information for uniquely determining a block partitioning method.

The second condition is, for example, that the block partitioning method is uniquely determined based on the shape of the current block.

With this, when a block partitioning method is uniquely determined based on the shape of a current block to be split, the decoder is capable of splitting the current block into shapes corresponding to shapes obtained by using a block partitioning method selected from among candidates for a block partitioning method generated by eliminating one or more candidates from a multiple number of candidates for a block partitioning method. Accordingly, when a block partitioning method is uniquely determined based on the shape of the current block, the decoder is capable of splitting the current block into the shapes corresponding to the shapes obtained by using the block partitioning method efficiently selected.

The first condition is, for example, that the shape of the current block is a rectangle.

With this, when the shape of the current block is a rectangle, the decoder is capable of splitting the current block into shapes corresponding to shapes obtained by using a block partitioning method selected from among candidates for a block partitioning method generated by eliminating one or more candidates from a multiple number of candidates for a block partitioning method. Accordingly, when the shape of the current block is a rectangle, the decoder is capable of splitting the current block into the shapes corresponding to the shapes obtained by using the block partitioning method efficiently selected.

The first condition is, for example, that a ratio of a longer side to a shorter side of the current block is greater than a first value.

With this, when the shape of the current block is more elongated than a predetermined shape, the decoder is capable of splitting the current block into shapes corresponding to shapes obtained by using a block partitioning method selected from among candidates for a block partitioning method generated by eliminating one or more candidates from a multiple number of candidates for a block partitioning method. Accordingly, when the shape of the current block is more elongated than the predetermined shape, the decoder is capable of splitting the current block into the shapes corresponding to the shapes obtained by using the block partitioning method efficiently selected.

The first value is, for example, 2.

With this, when a current block is a rectangle having the longer side that is two times as long as the shorter side, the decoder is capable of splitting the current block into shapes corresponding to shapes obtained by using a block partitioning method selected from candidates for a block partitioning method generated by eliminating one or more candidates from a multiple number of candidates for a block partitioning method. Accordingly, when the current block is a rectangle having the longer side that is two times as long as the shorter side, the decoder is capable of splitting the current block into the shapes corresponding to the shapes obtained by using the block partitioning method efficiently selected.

The first value is, for example, 4.

With this, when a current block is split into rectangles each having the longer side that is four times as long as the shorter side, the decoder is capable of splitting the current block into shapes corresponding to shapes obtained by using a block partitioning method selected from among candidates for a block partitioning method generated by eliminating one or more candidates from a multiple number of candidates for a block partitioning method. Accordingly, when the current block is split into rectangles each having the longer side that is four times as long as the shorter side, the decoder is capable of splitting the current block into the shapes corresponding to the shapes obtained by using the block partitioning method efficiently selected.

The first condition is, for example, that the shape of the current block is a rectangle and a length of a shorter side of the current block is less than a second value.

With this, when a current block to be split is a rectangle having the shorter side that is less than a predetermined value, that is, when the current block has an elongated shape, the decoder is capable of splitting the current block into shapes corresponding to shapes obtained by using a block partitioning method selected from among candidates for a block partitioning method generated by eliminating one or more candidates from a multiple number of candidates for a block partitioning method. Accordingly, when the current block is a rectangle having the shorter side that is less than the predetermined value, that is, when the current block has an elongated shape, the decoder is capable of splitting the current block into the shapes corresponding to the shapes obtained by using the block partitioning method efficiently selected.

The second value is, for example, 64 pixels.

With this, when a current block to be split is a rectangle having the shorter side that is less than 64 pixels, the decoder is capable of splitting the current block into shapes corresponding to shapes obtained by using a block partitioning method selected from among candidates for a block partitioning method generated by eliminating one or more candidates from a multiple number of candidates for a block partitioning method. Accordingly, when the current block is a rectangle having the shorter side that is less than 64 pixels, the decoder is capable of splitting the current block into the shapes corresponding to the shapes obtained by using the block partitioning method efficiently selected.

The first condition is, for example, that a ratio of a longer side to a shorter side of a block generated through the splitting of the current block is greater than a third value.

With this, when a current block is split into rectangles each being more elongated than a predetermined shape, the decoder is capable of splitting the current block into shapes corresponding to shapes obtained by using a block partitioning method selected from among candidates for a block partitioning method generated by eliminating one or more candidates from a multiple number of candidates for a block partitioning method. Accordingly, when the current block is split into rectangles each being more elongated than the predetermined shape, the decoder is capable of splitting the current block into the shapes corresponding to the shapes obtained by using the block partitioning method efficiently selected.

The third value is, for example, 4.

With this, when a current block is split into rectangles each having the longer side that is four times as long as the shorter side, the decoder is capable of splitting the current block into shapes corresponding to shapes obtained by using a block partitioning method selected from among candidates for a block partitioning method generated by eliminating one or more candidates from a multiple number of candidates for a block partitioning method. Accordingly, when the current block is split into rectangles each having the longer side that is four times as long as the shorter side, the decoder is capable of splitting the current block into the shapes corresponding to the shapes obtained by using the block partitioning method efficiently selected.

The third value is, for example, 8.

With this, when a current block is split into rectangles each having the longer side that is eight times as long as the shorter side, the decoder is capable of splitting the current block into shapes corresponding to shapes obtained by using a block partitioning method selected from among candidates for a block partitioning method generated by eliminating one or more candidates from a multiple number of candidates for a block partitioning method. Accordingly, when the current block is split into rectangles each having the longer side that is eight times as long as the shorter side, the decoder is capable of splitting the current block into the shapes corresponding to the shapes obtained by using the block partitioning method efficiently selected.

The one or more predetermined candidates include, for example, a candidate that splits a block having a shorter side and a longer side in such a manner that a ratio of the longer side to the shorter side further increases.

This enables the decoder to eliminate a block partitioning method candidate such that a current block is further split into three blocks more elongated than before the splitting. The decoder is therefore capable of prohibiting the appearance of an extremely elongated block that is hardly predicted to appear in the process of block partitioning. Accordingly, when a decoding mode is determined using an optimization method such as an R-D optimization, the number of variations for trial calculations decreases and it is expected that the amount of processing for decoding decreases while the degradation of decoding efficiency is inhibited. Moreover, the decoder intentionally biases the generation frequency of the information relating to a block partitioning direction. This increases accuracy in probability estimation in arithmetic decoding using a context, such as CABAD, and the improvement of decoding performance can be expected. The decoder is also capable of limiting the appearance of an extremely elongated block, and this in turn makes it possible to improve subjective image quality.

The one or more predetermined candidates include, for example, a candidate that performs binary splitting on a block having a shorter side and a longer side in such a manner that a ratio of the longer side to the shorter side further increases.

This enables the decoder to eliminate a block partitioning method candidate such that a current block is split into three blocks more elongated than before the splitting. The decoder is therefore capable of prohibiting the appearance of an extremely elongated block that is hardly predicted to appear in the process of block partitioning. Therefore, when a decoding mode is determined using an optimization method such as an R-D optimization, the number of variations for trial calculations decreases and it is expected that the amount of processing for decoding decreases while the degradation of decoding efficiency is inhibited. Moreover, the decoder intentionally biases the generation frequency of the information relating to a block partitioning direction. This increases accuracy in probability estimation in arithmetic decoding using a context, such as CABAD, and the improvement of decoding performance can be expected. The decoder is also capable of limiting the appearance of an extremely elongated block, and this in turn makes it possible to improve subjective image quality.

The one or more predetermined candidates include, for example, a candidate that performs ternary splitting on a block having a shorter side and a longer side in such a manner that a ratio of the longer side to the shorter side further increases.

This enables the decoder to eliminate a block partitioning method candidate such that a current block is split into three blocks more elongated than before the splitting. The decoder is therefore capable of prohibiting the appearance of an extremely elongated block that is hardly predicted to appear in the process of block partitioning. Therefore, when a decoding mode is determined using an optimization method such as an R-D optimization, the number of variations for trial calculations decreases and it is expected that the amount of processing for decoding decreases while the degradation of decoding efficiency is inhibited. Moreover, the decoder intentionally biases the generation frequency of the information relating to a block partitioning direction. This increases accuracy in probability estimation in arithmetic decoding using a context, such as CABAD and the improvement of decoding performance can be expected. The decoder is also capable of limiting the appearance of an extremely elongated block, and this in turn makes it possible to improve subjective image quality.

For example, an encoding method according to one aspect of the present disclosure includes: determining whether a shape of a current block to be split in an image satisfies a first condition; generating one or more second candidates for a block partitioning method by eliminating one or more predetermined candidates from a plurality of first candidates for a block partitioning method when the shape of the current block satisfies the first condition; selecting a block partitioning method from among the one or more second candidates; and splitting the current block according to the block partitioning method selected.

With the encoding method, it is possible to split a current block into shapes corresponding to shapes obtained by using a block partitioning method selected from among candidates for a block partitioning method generated under a given condition by eliminating one or more candidates from a multiple number of candidates for a block partitioning method. Accordingly, with the encoding method, it is possible, under a given condition, to split the current block into the shapes corresponding to the shapes obtained by using the block partitioning method efficiently selected. In addition, the encoding method makes it possible to prohibit the appearance of a block having a shape corresponding to a shape obtained by using a block partitioning method candidate that has been eliminated. Accordingly, when a coding mode is determined using an optimization method such as an R-D optimization, the number of variations for trial calculations decreases and it is expected that the amount of processing for encoding decreases while the degradation of coding efficiency is inhibited. Moreover, the generation frequency of the information relating to a block partitioning direction is intentionally biased. Thus, accuracy in probability estimation in arithmetic coding using a context, such as CABAC, increases, and the improvement of encoding performance can be expected.

For example, a decoding method according to one aspect of the present disclosure includes: parsing, from an encoded bitstream generated by encoding an image, block partitioning information relating to a block partitioning method according to which a current block to be split in the image is split; and splitting the current block based on the block partitioning information parsed. When a shape of the current block satisfies a first condition, the block partitioning information is generated by (i) generating one or more second candidates for a block partitioning method by eliminating one or more predetermined candidates from a plurality of first candidates for a block partitioning method and (ii) selecting a block partitioning method from among the one or more second candidates.

With the decoding method, it is possible to split a current block into shapes corresponding to shapes obtained by using a block partitioning method selected from among candidates for a block partitioning method generated under a given condition by eliminating one or more candidates from a multiple number of candidates for a block partitioning method. Accordingly, it is possible, under a given condition, to split the current block into the shapes corresponding to the shapes obtained by using the block partitioning method efficiently selected. In addition, it is possible with the decoding method to prohibit the appearance of a block having a shape corresponding to a shape obtained by using a block partitioning method candidate that has been eliminated. Therefore, when a decoding mode is determined using an optimization method such as an R-D optimization, the number of variations for trial calculations decreases and it is expected that the amount of processing for decoding decreases while the degradation of decoding efficiency is inhibited. Moreover, the generation frequency of the information relating to a block partitioning direction is intentionally biased. This increases accuracy in probability estimation in arithmetic decoding using a context, such as CABAD, and the improvement of decoding performance can be expected.

An encoder according to one aspect of the present disclosure may include, for example, a splitter, an intra predictor, an inter predictor, a loop filter, a transformer, a quantizer, and an entropy encoder.

The splitter may partition a picture into a plurality of blocks. The intra predictor may perform intra prediction on a block included in the plurality of blocks. The inter predictor may perform inter prediction on the block. The transformer may transform prediction errors between an original image and a prediction image obtained through the intra prediction or the inter prediction to generate transform coefficients. The quantizer may quantize the transform coefficients to generate quantized coefficients. The entropy encoder may encode the quantized coefficients to generate an encoded bitstream. The loop filter may apply a filter to a reconstructed image of the block.

Moreover, the encoder may, for example, encode a video including a plurality of pictures.

The splitter may include circuitry and memory. Using the memory, the circuitry: determines whether a shape of a current block to be split in an image satisfies a first condition; generates one or more second candidates for a block partitioning method by eliminating one or more predetermined candidates from a plurality of first candidates for a block partitioning method when the shape of the current block satisfies the first condition; selects a block partitioning method from among the one or more second candidates; and splits the current block according to the block partitioning method selected.

A decoder according to one aspect of the present disclosure may include, for example, an entropy decoder, an inverse quantizer, an inverse transformer, an intra predictor, an inter predictor, and a loop filter.

The entropy decoder may parse, from an encoded bitstream, quantized coefficients of a block in a picture. The inverse quantizer may inverse quantize the quantized coefficients to obtain transform coefficients. The inverse transformer may inverse transform the transform coefficients to obtain prediction errors. The intra predictor may perform intra prediction on the block. The inter predictor may perform inter prediction on the block. The loop filter may apply a filter to a reconstructed image generated using a prediction image obtained through the intra prediction or the inter prediction and the prediction errors.

Moreover, the decoder may, for example, decode a video including a plurality of pictures.

The decoder may further include a splitter that partitions a picture into a plurality of blocks.

The splitter may include circuitry and memory. Using the memory, the circuitry: parses, from an encoded bitstream generated by encoding an image, block partitioning information relating to a block partitioning method according to which a current block to be split in the image is split; and splits the current block based on the block partitioning information parsed. When a shape of the current block satisfies a first condition, the block partitioning information is generated by (i) generating one or more second candidates for a block partitioning method by eliminating one or more predetermined candidates from a plurality of first candidates for a block partitioning method and (ii) selecting a block partitioning method from among the one or more second candidates.

General or specific aspects of the present disclosure may be realized as a system, method, integrated circuit, computer program, computer-readable medium such as a CD-ROM, or any given combination thereof.

Hereinafter, embodiments will be described with reference to the drawings.

Note that the embodiments described below each show a general or specific example. The numerical values, shapes, materials, components, the arrangement and connection of the components, steps, order of the steps, etc. that are indicated in the following embodiments are mere examples, and therefore are not intended to limit the scope of the claims. Moreover, among the components in the following embodiments, those not recited in any of the independent claims defining the broadest inventive concepts are described as optional components.

Embodiment 1

First, an outline of Embodiment 1 will be presented. Embodiment 1 is one example of an encoder and a decoder to which the processes and/or configurations presented in subsequent description of aspects of the present disclosure are applicable. Note that Embodiment 1 is merely one example of an encoder and a decoder to which the processes and/or configurations presented in the description of aspects of the present disclosure are applicable. The processes and/or configurations presented in the description of aspects of the present disclosure can also be implemented in an encoder and a decoder different from those according to Embodiment 1.

When the processes and/or configurations presented in the description of aspects of the present disclosure are applied to Embodiment 1, for example, any of the following may be performed.

(1) regarding the encoder or the decoder according to Embodiment 1, among components included in the encoder or the decoder according to Embodiment 1, substituting a component corresponding to a component presented in the description of aspects of the present disclosure with a component presented in the description of aspects of the present disclosure;

(2) regarding the encoder or the decoder according to Embodiment 1, implementing discretionary changes to functions or implemented processes performed by one or more components included in the encoder or the decoder according to Embodiment 1, such as addition, substitution, or removal, etc., of such functions or implemented processes, then substituting a component corresponding to a component presented in the description of aspects of the present disclosure with a component presented in the description of aspects of the present disclosure;

(3) regarding the method implemented by the encoder or the decoder according to Embodiment 1, implementing discretionary changes such as addition of processes and/or substitution, removal of one or more of the processes included in the method, and then substituting a process corresponding to a process presented in the description of aspects of the present disclosure with a process presented in the description of aspects of the present disclosure;

(4) combining one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(5) combining a component including one or more functions included in one or more components included in the encoder or the decoder according to Embodiment 1, or a component that implements one or more processes implemented by one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(6) regarding the method implemented by the encoder or the decoder according to Embodiment 1, among processes included in the method, substituting a process corresponding to a process presented in the description of aspects of the present disclosure with a process presented in the description of aspects of the present disclosure; and (7) combining one or more processes included in the method implemented by the encoder or the decoder according to Embodiment 1 with a process presented in the description of aspects of the present disclosure.

Note that the implementation of the processes and/or configurations presented in the description of aspects of the present disclosure is not limited to the above examples. For example, the processes and/or configurations presented in the description of aspects of the present disclosure may be implemented in a device used for a purpose different from the moving picture/picture encoder or the moving picture/picture decoder disclosed in Embodiment 1. Moreover, the processes and/or configurations presented in the description of aspects of the present disclosure may be independently implemented. Moreover, processes and/or configurations described in different aspects may be combined.

[Encoder Outline]

First, the encoder according to Embodiment 1 will be outlined. FIG. 1 is a block diagram illustrating a functional configuration of encoder 100 according to Embodiment 1. Encoder 100 is a moving picture/picture encoder that encodes a moving picture/picture block by block.

As illustrated in FIG. 1, encoder 100 is a device that encodes a picture block by block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, and prediction controller 128.

Encoder 100 is realized as, for example, a generic processor and memory. In this case, when a software program stored in the memory is executed by the processor, the processor functions as splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128. Alternatively, encoder 100 may be realized as one or more dedicated electronic circuits corresponding to splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128.

Hereinafter, each component included in encoder 100 will be described.

[Splitter]

Splitter 102 splits each picture included in an input moving picture into blocks, and outputs each block to subtractor 104. For example, splitter 102 first splits a picture into blocks of a fixed size (for example, 128×128). The fixed size block is also referred to as coding tree unit (CTU). Splitter 102 then splits each fixed size block into blocks of variable sizes (for example, 64×64 or smaller), based on recursive quadtree and/or binary tree block splitting. The variable size block is also referred to as a coding unit (CU), a prediction unit (PU), or a transform unit (TU). Note that in this embodiment, there is no need to differentiate between CU, PU, and TU; all or some of the blocks in a picture may be processed per CU, PU, or TU.

Figure 2:
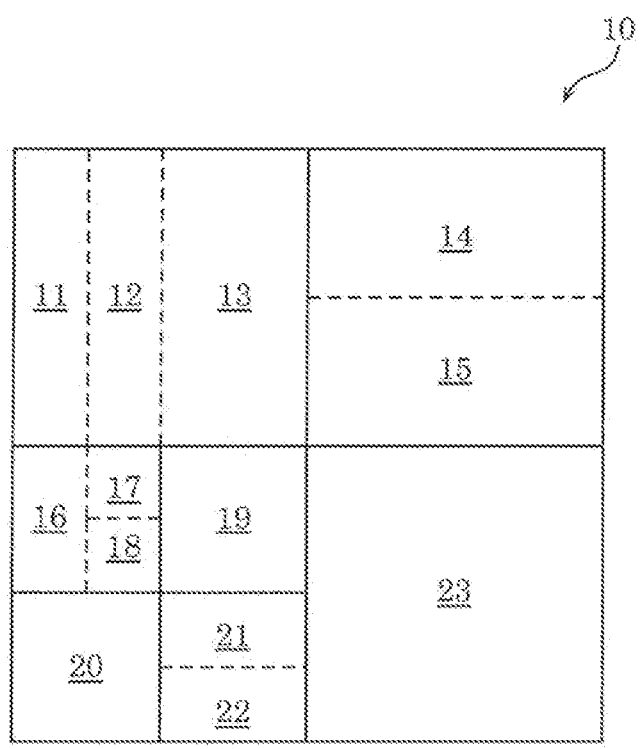
FIG. 2 illustrates one example of block splitting according to Embodiment 1.

FIG. 2 illustrates one example of block splitting according to Embodiment 1. In FIG. 2, the solid lines represent block boundaries of blocks split by quadtree block splitting, and the dashed lines represent block boundaries of blocks split by binary tree block splitting.

Here, block 10 is a square 128×128 pixel block (128×128 block). This 128×128 block 10 is first split into four square 64×64 blocks (quadtree block splitting).

The top left 64×64 block is further vertically split into two rectangle 32×64 blocks, and the left 32×64 block is further vertically split into two rectangle 16×64 blocks (binary tree block splitting). As a result, the top left 64×64 block is split into two 16×64 blocks 11 and 12 and one 32×64 block 13.

The top right 64×64 block is horizontally split into two rectangle 64×32 blocks 14 and 15 (binary tree block splitting).

The bottom left 64×64 block is first split into four square 32×32 blocks (quadtree block splitting). The top left block and the bottom right block among the four 32×32 blocks are further split. The top left 32×32 block is vertically split into two rectangle 16×32 blocks, and the right 16×32 block is further horizontally split into two 16×16 blocks (binary tree block splitting). The bottom right 32×32 block is horizontally split into two 32×16 blocks (binary tree block splitting). As a result, the bottom left 64×64 block is split into 16×32 block 16, two 16×16 blocks 17 and 18, two 32×32 blocks 19 and 20, and two 32×16 blocks 21 and 22.

The bottom right 64×64 block 23 is not split.

As described above, in FIG. 2, block 10 is split into 13 variable size blocks 11 through 23 based on recursive quadtree and binary tree block splitting. This type of splitting is also referred to as quadtree plus binary tree (QTBT) splitting.

Note that in FIG. 2, one block is split into four or two blocks (quadtree or binary tree block splitting), but splitting is not limited to this example. For example, one block may be split into three blocks (ternary block splitting). Splitting including such ternary block splitting is also referred to as multi-type tree (MBT) splitting.

[Subtractor]

Subtractor 104 subtracts a prediction signal (prediction sample) from an original signal (original sample) per block split by splitter 102. In other words, subtractor 104 calculates prediction errors (also referred to as residuals) of a block to be encoded (hereinafter referred to as a current block). Subtractor 104 then outputs the calculated prediction errors to transformer 106.

The original signal is a signal input into encoder 100, and is a signal representing an image for each picture included in a moving picture (for example, a luma signal and two chroma signals). Hereinafter, a signal representing an image is also referred to as a sample.

[Transformer]

Transformer 106 transforms spatial domain prediction errors into frequency domain transform coefficients, and outputs the transform coefficients to quantizer 108. More specifically, transformer 106 applies, for example, a predefined discrete cosine transform (DCT) or discrete sine transform (DST) to spatial domain prediction errors.

Note that transformer 106 may adaptively select a transform type from among a plurality of transform types, and transform prediction errors into transform coefficients by using a transform basis function corresponding to the selected transform type. This sort of transform is also referred to as explicit multiple core transform (EMT) or adaptive multiple transform (AMT).

The transform types include, for example, DCT-II, DCT-V, DCT-VIII, DST-I, and DST-VII. FIG. 3 is a chart indicating transform basis functions for each transform type. In FIG. 3, N indicates the number of input pixels. For example, selection of a transform type from among the plurality of transform types may depend on the prediction type (intra prediction and inter prediction), and may depend on intra prediction mode.

Information indicating whether to apply such EMT or AMT (referred to as, for example, an AMT flag) and information indicating the selected transform type is signalled at the CU level. Note that the signaling of such information need not be performed at the CU level, and may be performed at another level (for example, at the sequence level, picture level, slice level, tile level, or CTU level).

Moreover, transformer 106 may apply a secondary transform to the transform coefficients (transform result). Such a secondary transform is also referred to as adaptive secondary transform (AST) or non-separable secondary transform (NSST). For example, transformer 106 applies a secondary transform to each sub-block (for example, each 4×4 sub-block) included in the block of the transform coefficients corresponding to the intra prediction errors. Information indicating whether to apply NSST and information related to the transform matrix used in NSST are signalled at the CU level. Note that the signaling of such information need not be performed at the CU level, and may be performed at another level (for example, at the sequence level, picture level, slice level, tile level, or CTU level).

Here, a separable transform is a method in which a transform is performed a plurality of times by separately performing a transform for each direction according to the number of dimensions input. A non-separable transform is a method of performing a collective transform in which two or more dimensions in a multidimensional input are collectively regarded as a single dimension.

In one example of a non-separable transform, when the input is a 4×4 block, the 4×4 block is regarded as a single array including 16 components, and the transform applies a 16×16 transform matrix to the array.

Moreover, similar to above, after an input 4×4 block is regarded as a single array including 16 components, a transform that performs a plurality of Givens rotations on the array (i.e., a Hypercube-Givens Transform) is also one example of a non-separable transform.

[Quantizer]

Quantizer 108 quantizes the transform coefficients output from transformer 106. More specifically, quantizer 108 scans, in a predetermined scanning order, the transform coefficients of the current block, and quantizes the scanned transform coefficients based on quantization parameters (QP) corresponding to the transform coefficients. Quantizer 108 then outputs the quantized transform coefficients (hereinafter referred to as quantized coefficients) of the current block to entropy encoder 110 and inverse quantizer 112.

A predetermined order is an order for quantizing/inverse quantizing transform coefficients. For example, a predetermined scanning order is defined as ascending order of frequency (from low to high frequency) or descending order of frequency (from high to low frequency).

A quantization parameter is a parameter defining a quantization step size (quantization width). For example, if the value of the quantization parameter increases, the quantization step size also increases. In other words, if the value of the quantization parameter increases, the quantization error increases.

[Entropy Encoder]

Entropy encoder 110 generates an encoded signal (encoded bitstream) by variable length encoding quantized coefficients, which are inputs from quantizer 108. More specifically, entropy encoder 110, for example, binarizes quantized coefficients and arithmetic encodes the binary signal.

[Inverse Quantizer]

Inverse quantizer 112 inverse quantizes quantized coefficients, which are inputs from quantizer 108. More specifically, inverse quantizer 112 inverse quantizes, in a predetermined scanning order, quantized coefficients of the current block. Inverse quantizer 112 then outputs the inverse quantized transform coefficients of the current block to inverse transformer 114.

[Inverse Transformer]

Inverse transformer 114 restores prediction errors by inverse transforming transform coefficients, which are inputs from inverse quantizer 112. More specifically, inverse transformer 114 restores the prediction errors of the current block by applying an inverse transform corresponding to the transform applied by transformer 106 on the transform coefficients. Inverse transformer 114 then outputs the restored prediction errors to adder 116.

Note that since information is lost in quantization, the restored prediction errors do not match the prediction errors calculated by subtractor 104. In other words, the restored prediction errors include quantization errors.

[Adder]

Adder 116 reconstructs the current block by summing prediction errors, which are inputs from inverse transformer 114, and prediction samples, which are inputs from prediction controller 128. Adder 116 then outputs the reconstructed block to block memory 118 and loop filter 120. A reconstructed block is also referred to as a local decoded block.

[Block Memory]

Block memory 118 is storage for storing blocks in a picture to be encoded (hereinafter referred to as a current picture) for reference in intra prediction. More specifically, block memory 118 stores reconstructed blocks output from adder 116.

[Loop Filter]

Loop filter 120 applies a loop filter to blocks reconstructed by adder 116, and outputs the filtered reconstructed blocks to frame memory 122. A loop filter is a filter used in an encoding loop (in-loop filter), and includes, for example, a deblocking filter (DF), a sample adaptive offset (SAO) filter, and an adaptive loop filter (ALF).

In ALF, a least square error filter for removing compression artifacts is applied. For example, one filter from among a plurality of filters is selected for each 2×2 sub-block in the current block based on direction and activity of local gradients, and is applied.

More specifically, first, each sub-block (for example, each 2×2 sub-block) is categorized into one out of a plurality of classes (for example, 15 or 25 classes). The classification of the sub-block is based on gradient directionality and activity. For example, classification index C is derived based on gradient directionality D (for example, 0 to 2 or 0 to 4) and gradient activity A (for example, 0 to 4) (for example, C=5D+A). Then, based on classification index C, each sub-block is categorized into one out of a plurality of classes (for example, 15 or 25 classes).

For example, gradient directionality D is calculated by comparing gradients of a plurality of directions (for example, the horizontal, vertical, and two diagonal directions). Moreover, for example, gradient activity A is calculated by summing gradients of a plurality of directions and quantizing the sum.

The filter to be used for each sub-block is determined from among the plurality of filters based on the result of such categorization.

Figure 4A:
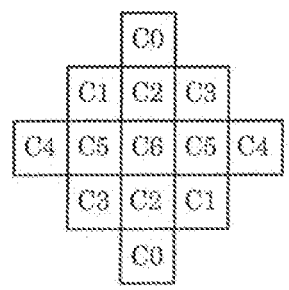
FIG. 4A illustrates one example of a filter shape used in ALF.
Figure 4B:
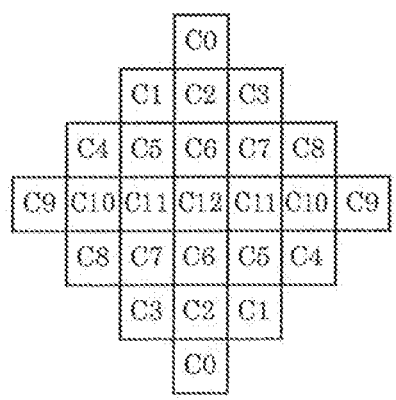
FIG. 4B illustrates another example of a filter shape used in ALF.
Figure 4C:
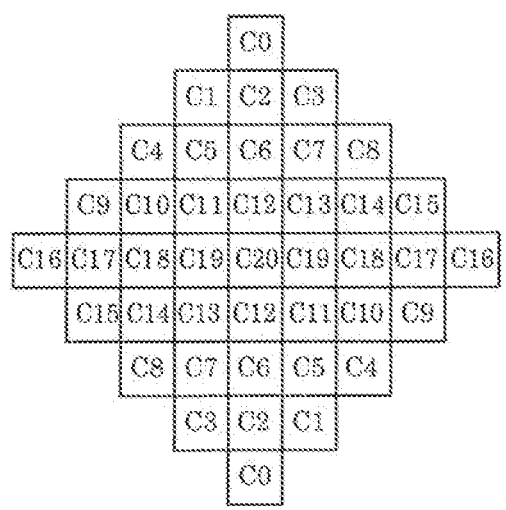
FIG. 4C illustrates another example of a filter shape used in ALF.

The filter shape to be used in ALF is, for example, a circular symmetric filter shape. FIG. 4A through FIG. 4C illustrate examples of filter shapes used in ALF. FIG. 4A illustrates a 5×5 diamond shape filter, FIG. 4B illustrates a 7×7 diamond shape filter, and FIG. 4C illustrates a 9×9 diamond shape filter. Information indicating the filter shape is signalled at the picture level. Note that the signaling of information indicating the filter shape need not be performed at the picture level, and may be performed at another level (for example, at the sequence level, slice level, tile level, CTU level, or CU level).

The enabling or disabling of ALF is determined at the picture level or CU level. For example, for luma, the decision to apply ALF or not is done at the CU level, and for chroma, the decision to apply ALF or not is done at the picture level. Information indicating whether ALF is enabled or disabled is signalled at the picture level or CU level. Note that the signaling of information indicating whether ALF is enabled or disabled need not be performed at the picture level or CU level, and may be performed at another level (for example, at the sequence level, slice level, tile level, or CTU level).

The coefficients set for the plurality of selectable filters (for example, 15 or 25 filters) is signalled at the picture level. Note that the signaling of the coefficients set need not be performed at the picture level, and may be performed at another level (for example, at the sequence level, slice level, tile level, CTU level, CU level, or sub-block level).

[Frame Memory]

Frame memory 122 is storage for storing reference pictures used in inter prediction, and is also referred to as a frame buffer. More specifically, frame memory 122 stores reconstructed blocks filtered by loop filter 120.

[Intra Predictor]

Intra predictor 124 generates a prediction signal (intra prediction signal) by intra predicting the current block with reference to a block or blocks in the current picture and stored in block memory 118 (also referred to as intra frame prediction). More specifically, intra predictor 124 generates an intra prediction signal by intra prediction with reference to samples (for example, luma and/or chroma values) of a block or blocks neighboring the current block, and then outputs the intra prediction signal to prediction controller 128.

For example, intra predictor 124 performs intra prediction by using one mode from among a plurality of predefined intra prediction modes. The intra prediction modes include one or more non-directional prediction modes and a plurality of directional prediction modes.

The one or more non-directional prediction modes include, for example, planar prediction mode and DC prediction mode defined in the H.265/high-efficiency video coding (HEVC) standard (see NPL 1).

Figure 5A:
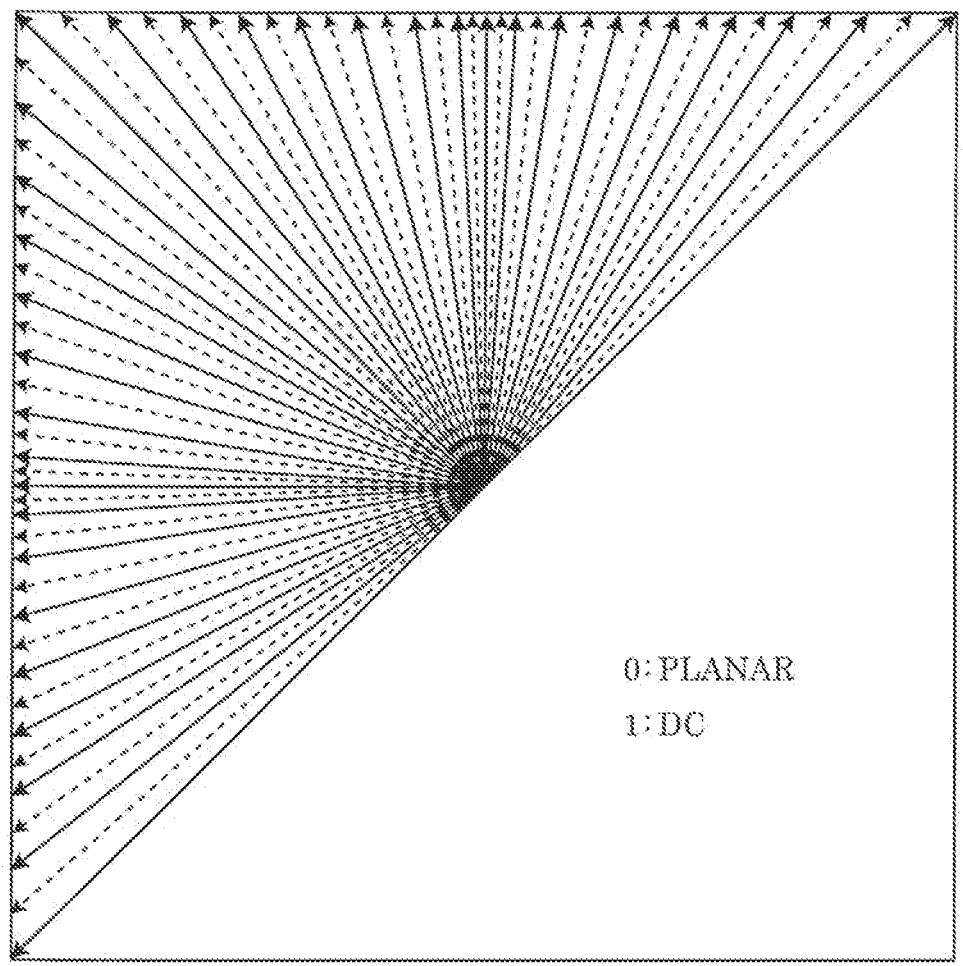
FIG. 5A illustrates 67 intra prediction modes used in intra prediction.

The plurality of directional prediction modes include, for example, the 33 directional prediction modes defined in the H.265/HEVC standard. Note that the plurality of directional prediction modes may further include 32 directional prediction modes in addition to the 33 directional prediction modes (for a total of 65 directional prediction modes). FIG. 5A illustrates 67 intra prediction modes used in intra prediction (two non-directional prediction modes and 65 directional prediction modes). The solid arrows represent the 33 directions defined in the H.265/HEVC standard, and the dashed arrows represent the additional 32 directions.

Note that a luma block may be referenced in chroma block intra prediction. In other words, a chroma component of the current block may be predicted based on a luma component of the current block. Such intra prediction is also referred to as cross-component linear model (CCLM) prediction. Such a chroma block intra prediction mode that references a luma block (referred to as, for example, CCLM mode) may be added as one of the chroma block intra prediction modes.

Intra predictor 124 may correct post-intra-prediction pixel values based on horizontal/vertical reference pixel gradients. Intra prediction accompanied by this sort of correcting is also referred to as position dependent intra prediction combination (PDPC). Information indicating whether to apply PDPC or not (referred to as, for example, a PDPC flag) is, for example, signalled at the CU level. Note that the signaling of this information need not be performed at the CU level, and may be performed at another level (for example, on the sequence level, picture level, slice level, tile level, or CTU level).

[Inter Predictor]

Inter predictor 126 generates a prediction signal (inter prediction signal) by inter predicting the current block with reference to a block or blocks in a reference picture, which is different from the current picture and is stored in frame memory 122 (also referred to as inter frame prediction). Inter prediction is performed per current block or per sub-block (for example, per 4×4 block) in the current block. For example, inter predictor 126 performs motion estimation in a reference picture for the current block or sub-block. Inter predictor 126 then generates an inter prediction signal of the current block or sub-block by motion compensation by using motion information (for example, a motion vector) obtained from motion estimation. Inter predictor 126 then outputs the generated inter prediction signal to prediction controller 128.

The motion information used in motion compensation is signalled. A motion vector predictor may be used for the signaling of the motion vector. In other words, the difference between the motion vector and the motion vector predictor may be signalled.

Note that the inter prediction signal may be generated using motion information for a neighboring block in addition to motion information for the current block obtained from motion estimation. More specifically, the inter prediction signal may be generated per sub-block in the current block by calculating a weighted sum of a prediction signal based on motion information obtained from motion estimation and a prediction signal based on motion information for a neighboring block. Such inter prediction (motion compensation) is also referred to as overlapped block motion compensation (OBMC).

In such an OBMC mode, information indicating sub-block size for OBMC (referred to as, for example, OBMC block size) is signalled at the sequence level. Moreover, information indicating whether to apply the OBMC mode or not (referred to as, for example, an OBMC flag) is signalled at the CU level. Note that the signaling of such information need not be performed at the sequence level and CU level, and may be performed at another level (for example, at the picture level, slice level, tile level, CTU level, or sub-block level).

Figure 5B:
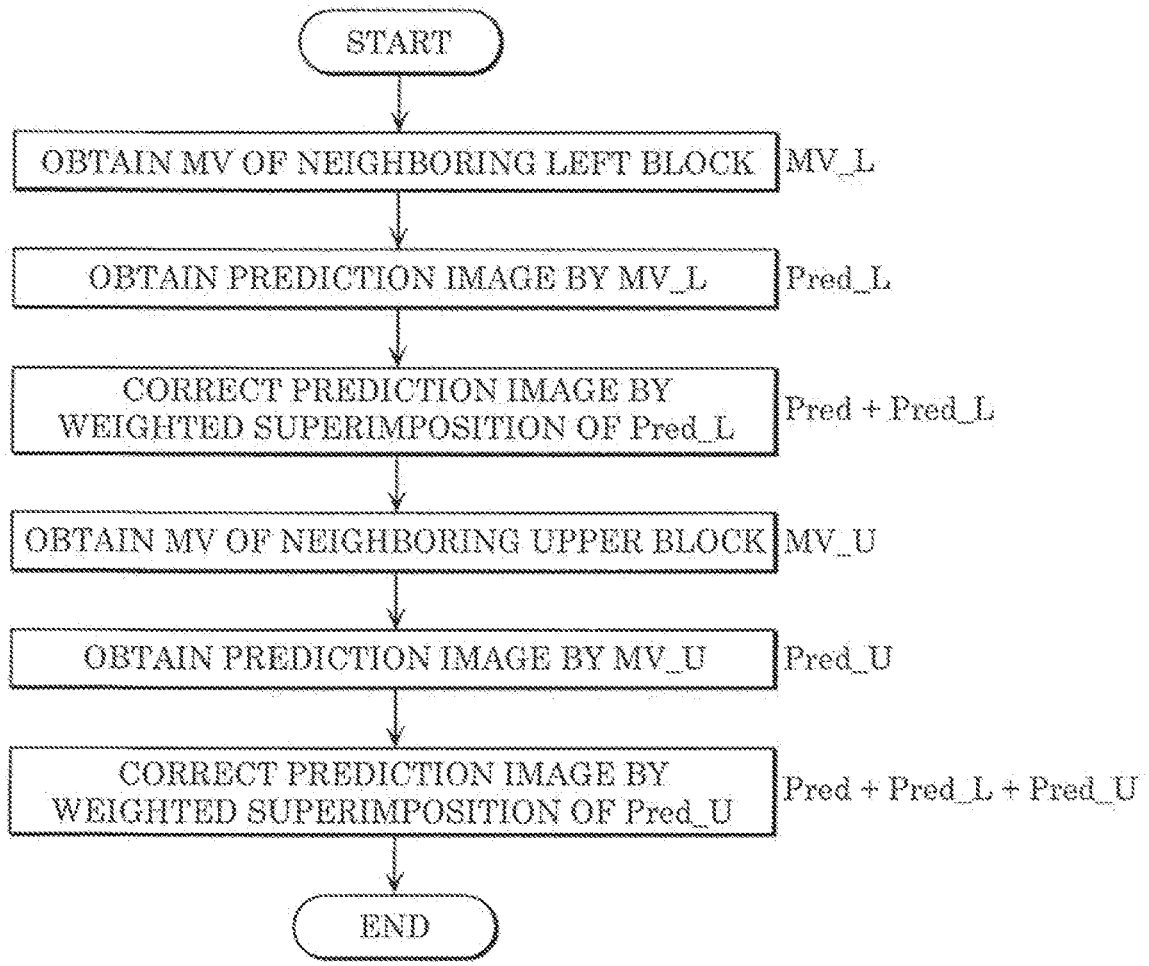
FIG. 5B is a flow chart for illustrating an outline of a prediction image correction process performed via OBMC processing.
Figure 5C:
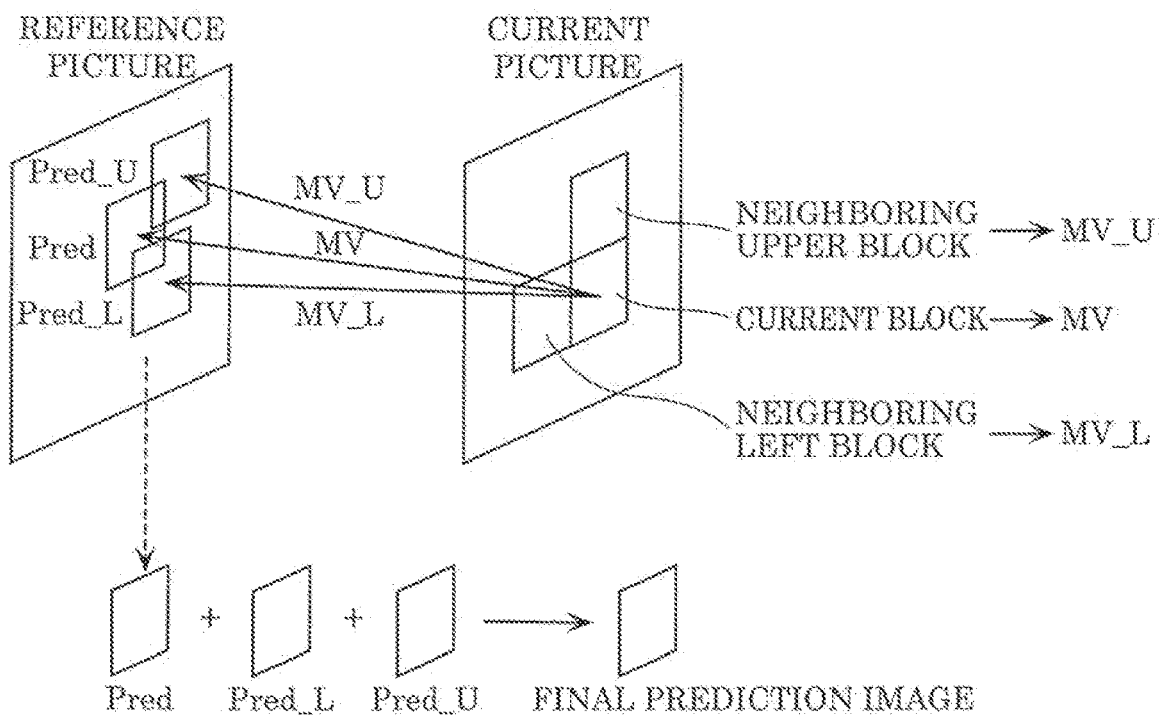
FIG. 5C is a conceptual diagram for illustrating an outline of a prediction image correction process performed via OBMC processing.

Hereinafter, the OBMC mode will be described in further detail. FIG. 5B is a flowchart and FIG. 5C is a conceptual diagram for illustrating an outline of a prediction image correction process performed via OBMC processing.

First, a prediction image (Pred) is obtained through typical motion compensation using a motion vector (MV) assigned to the current block.

Next, a prediction image (Pred_L) is obtained by applying a motion vector (MV_L) of the encoded neighboring left block to the current block, and a first pass of the correction of the prediction image is made by superimposing the prediction image and Pred_L.

Similarly, a prediction image (Pred_U) is obtained by applying a motion vector (MV_U) of the encoded neighboring upper block to the current block, and a second pass of the correction of the prediction image is made by superimposing the prediction image resulting from the first pass and Pred_U. The result of the second pass is the final prediction image.

Note that the above example is of a two-pass correction method using the neighboring left and upper blocks, but the method may be a three-pass or higher correction method that also uses the neighboring right and/or lower block.

Note that the region subject to superimposition may be the entire pixel region of the block, and, alternatively, may be a partial block boundary region.

Note that here, the prediction image correction process is described as being based on a single reference picture, but the same applies when a prediction image is corrected based on a plurality of reference pictures. In such a case, after corrected prediction images resulting from performing correction based on each of the reference pictures are obtained, the obtained corrected prediction images are further superimposed to obtain the final prediction image.

Note that the unit of the current block may be a prediction block and, alternatively, may be a sub-block obtained by further dividing the prediction block.

One example of a method for determining whether to implement OBMC processing is by using an obmc_flag, which is a signal that indicates whether to implement OBMC processing. As one specific example, the encoder determines whether the current block belongs to a region including complicated motion. The encoder sets the obmc_flag to a value of "1" when the block belongs to a region including complicated motion and implements OBMC processing when encoding, and sets the obmc_flag to a value of "0" when the block does not belong to a region including complication motion and encodes without implementing OBMC processing. The decoder switches between implementing OBMC processing or not by decoding the obmc_flag written in the stream and performing the decoding in accordance with the flag value.

Note that the motion information may be derived on the decoder side without being signalled. For example, a merge mode defined in the H.265/HEVC standard may be used. Moreover, for example, the motion information may be derived by performing motion estimation on the decoder side. In this case, motion estimation is performed without using the pixel values of the current block.

Here, a mode for performing motion estimation on the decoder side will be described. A mode for performing motion estimation on the decoder side is also referred to as pattern matched motion vector derivation (PMMVD) mode or frame rate up-conversion (FRUC) mode.

Figure 5D:
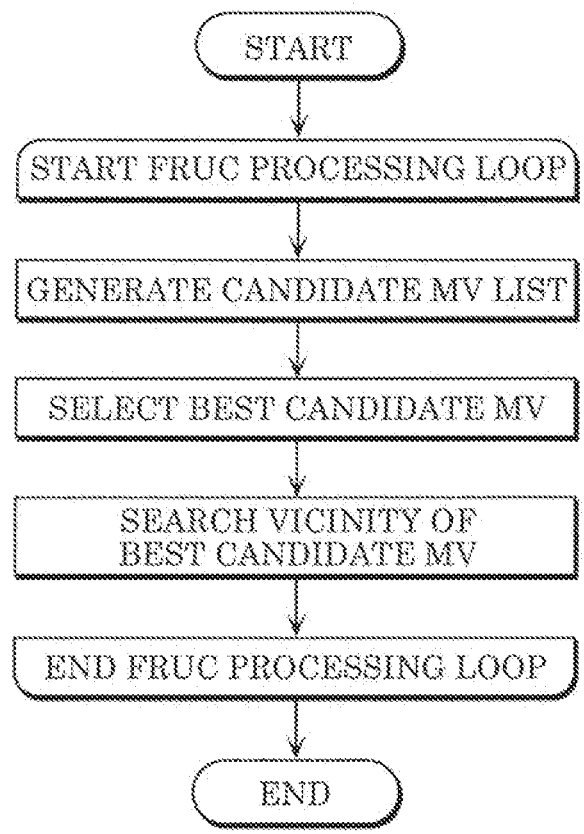
FIG. 5D illustrates one example of FRUC.

One example of FRUC processing is illustrated in FIG. 5D. First, a candidate list (a candidate list may be a merge list) of candidates each including a motion vector predictor is generated with reference to motion vectors of encoded blocks that spatially or temporally neighbor the current block. Next, the best candidate MV is selected from among a plurality of candidate MVs registered in the candidate list. For example, evaluation values for the candidates included in the candidate list are calculated and one candidate is selected based on the calculated evaluation values.

Next, a motion vector for the current block is derived from the motion vector of the selected candidate. More specifically, for example, the motion vector for the current block is calculated as the motion vector of the selected candidate (best candidate MV), as-is. Alternatively, the motion vector for the current block may be derived by pattern matching performed in the vicinity of a position in a reference picture corresponding to the motion vector of the selected candidate. In other words, when the vicinity of the best candidate MV is searched via the same method and an MV having a better evaluation value is found, the best candidate MV may be updated to the MV having the better evaluation value, and the MV having the better evaluation value may be used as the final MV for the current block. Note that a configuration in which this processing is not implemented is also acceptable.

The same processes may be performed in cases in which the processing is performed in units of sub-blocks.

Note that an evaluation value is calculated by calculating the difference in the reconstructed image by pattern matching performed between a region in a reference picture corresponding to a motion vector and a predetermined region. Note that the evaluation value may be calculated by using some other information in addition to the difference.

The pattern matching used is either first pattern matching or second pattern matching. First pattern matching and second pattern matching are also referred to as bilateral matching and template matching, respectively.

In the first pattern matching, pattern matching is performed between two blocks along the motion trajectory of the current block in two different reference pictures. Therefore, in the first pattern matching, a region in another reference picture conforming to the motion trajectory of the current block is used as the predetermined region for the above-described calculation of the candidate evaluation value.

Figure 6:
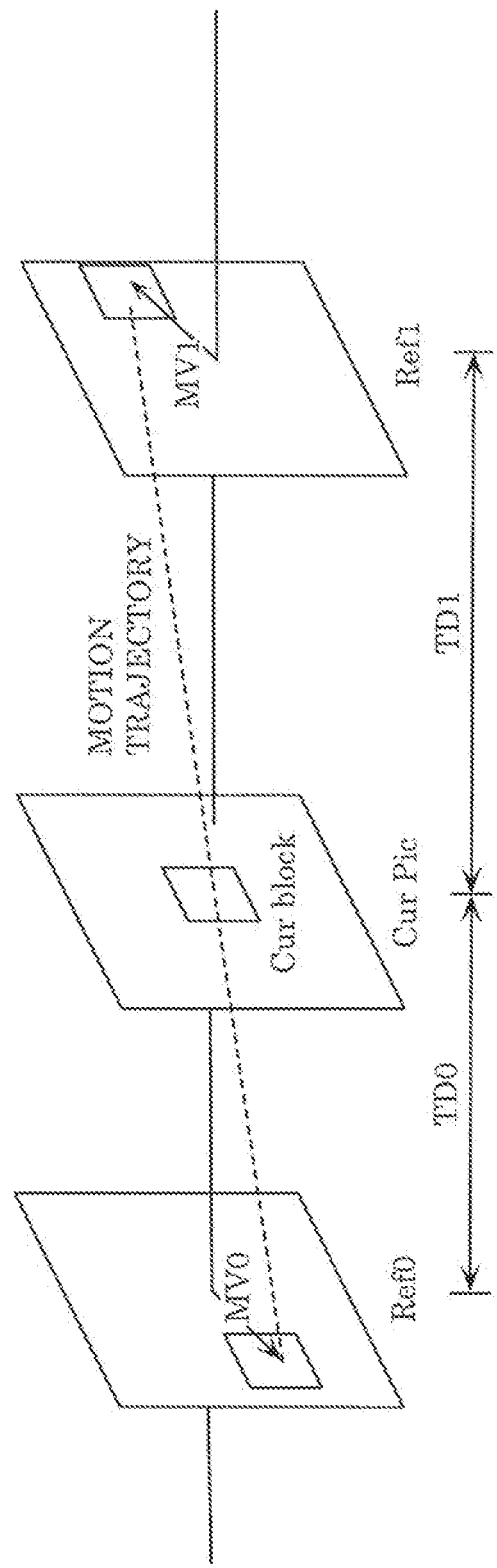
FIG. 6 is for illustrating pattern matching (bilateral matching) between two blocks along a motion trajectory.

FIG. 6 is for illustrating one example of pattern matching (bilateral matching) between two blocks along a motion trajectory. As illustrated in FIG. 6, in the first pattern matching, two motion vectors (MV0, MV1) are derived by finding the best match between two blocks along the motion trajectory of the current block (Cur block) in two different reference pictures (Ref0, Ref1). More specifically, a difference between (i) a reconstructed image in a specified position in a first encoded reference picture (Ref0) specified by a candidate MV and (ii) a reconstructed picture in a specified position in a second encoded reference picture (Ref1) specified by a symmetrical MV scaled at a display time interval of the candidate MV may be derived, and the evaluation value for the current block may be calculated by using the derived difference. The candidate MV having the best evaluation value among the plurality of candidate MVs may be selected as the final MV.

Under the assumption of continuous motion trajectory, the motion vectors (MV0, MV1) pointing to the two reference blocks shall be proportional to the temporal distances (TD0, TD1) between the current picture (Cur Pic) and the two reference pictures (Ref0, Ref1). For example, when the current picture is temporally between the two reference pictures and the temporal distance from the current picture to the two reference pictures is the same, the first pattern matching derives a mirror based bi-directional motion vector.

In the second pattern matching, pattern matching is performed between a template in the current picture (blocks neighboring the current block in the current picture (for example, the top and/or left neighboring blocks)) and a block in a reference picture. Therefore, in the second pattern matching, a block neighboring the current block in the current picture is used as the predetermined region for the above-described calculation of the candidate evaluation value.

Figure 7:
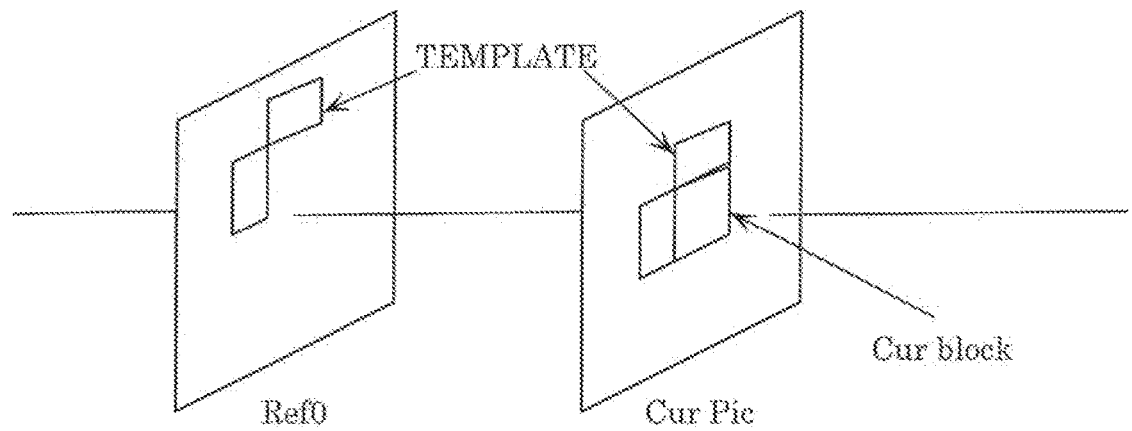
FIG. 7 is for illustrating pattern matching (template matching) between a template in the current picture and a block in a reference picture.

FIG. 7 is for illustrating one example of pattern matching (template matching) between a template in the current picture and a block in a reference picture. As illustrated in FIG. 7, in the second pattern matching, a motion vector of the current block is derived by searching a reference picture (Ref0) to find the block that best matches neighboring blocks of the current block (Cur block) in the current picture (Cur Pic). More specifically, a difference between (i) a reconstructed image of an encoded region that is both or one of the neighboring left and neighboring upper regions and (ii) a reconstructed picture in the same position in an encoded reference picture (Ref0) specified by a candidate MV may be derived, and the evaluation value for the current block may be calculated by using the derived difference. The candidate MV having the best evaluation value among the plurality of candidate MVs may be selected as the best candidate MV.

Information indicating whether to apply the FRUC mode or not (referred to as, for example, a FRUC flag) is signalled at the CU level. Moreover, when the FRUC mode is applied (for example, when the FRUC flag is set to true), information indicating the pattern matching method (first pattern matching or second pattern matching) is signalled at the CU level. Note that the signaling of such information need not be performed at the CU level, and may be performed at another level (for example, at the sequence level, picture level, slice level, tile level, CTU level, or sub-block level).

Here, a mode for deriving a motion vector based on a model assuming uniform linear motion will be described. This mode is also referred to as a bi-directional optical flow (BIO) mode.

Figure 8:
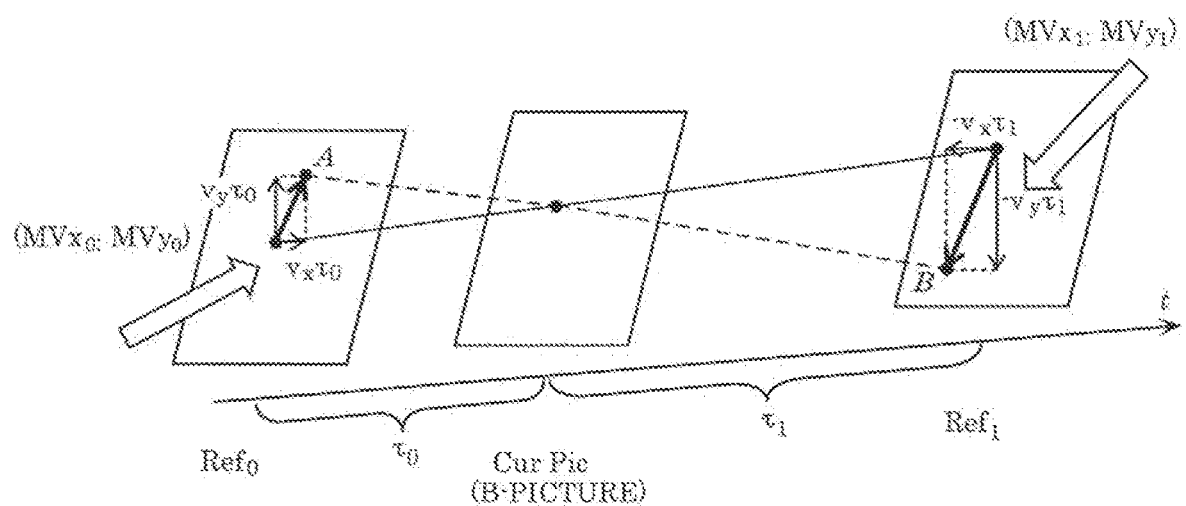
FIG. 8 is for illustrating a model assuming uniform linear motion.

FIG. 8 is for illustrating a model assuming uniform linear motion. In FIG. 8, $(v_x, v_y)$ denotes a velocity vector, and $\tau_0$ and $\tau_1$ denote temporal distances between the current picture (Cur Pic) and two reference pictures ($Ref_0$, $Ref_1$). ($MVx_0$, $MVy_0$) denotes a motion vector corresponding to reference picture $Ref_0$, and ($MVx_1$, $MVy_1$) denotes a motion vector corresponding to reference picture $Ref_1$.

Here, under the assumption of uniform linear motion exhibited by velocity vector $(v_x, v_y)$, ($MVx_0$, $MVy_0$) and (MVx₁, MVy₁) are represented as (v_xτ₀, v_yτ₀) and (−v_xτ₁, −v_yτ₁), respectively, and the following optical flow equation is given.

MATH. 1

$$\partial I^{(k)}/\partial t + v_x \partial I^{(k)}/\partial x + v_y \partial I^{(k)}/\partial y = 0. \quad (1)$$

Here, $I^{(k)}$ denotes a luma value from reference picture k (k=0, 1) after motion compensation. This optical flow equation shows that the sum of (i) the time derivative of the luma value, (ii) the product of the horizontal velocity and the horizontal component of the spatial gradient of a reference picture, and (iii) the product of the vertical velocity and the vertical component of the spatial gradient of a reference picture is equal to zero. A motion vector of each block obtained from, for example, a merge list is corrected pixel by pixel based on a combination of the optical flow equation and Hermite interpolation.

Note that a motion vector may be derived on the decoder side using a method other than deriving a motion vector based on a model assuming uniform linear motion. For example, a motion vector may be derived for each sub-block based on motion vectors of neighboring blocks.

Here, a mode in which a motion vector is derived for each sub-block based on motion vectors of neighboring blocks will be described. This mode is also referred to as affine motion compensation prediction mode.

Figure 9A:
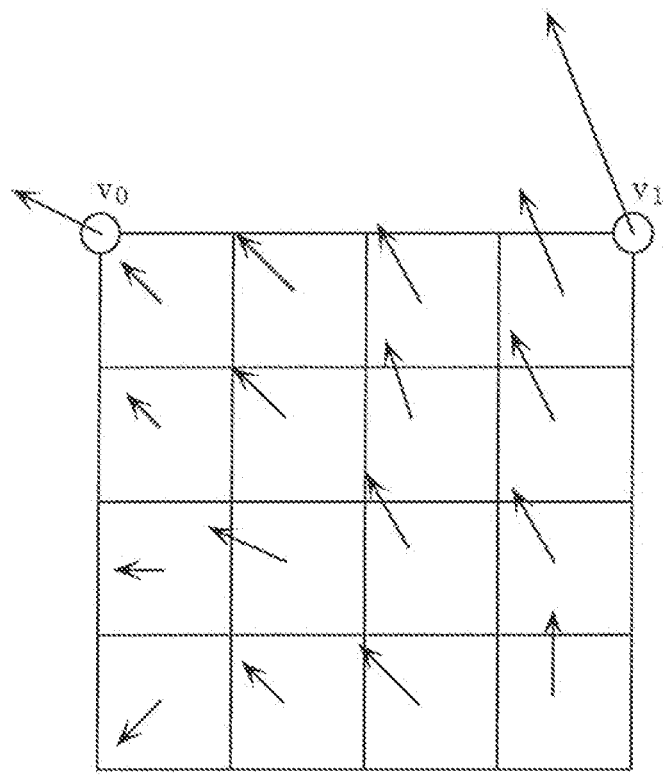
FIG. 9A is for illustrating deriving a motion vector of each sub-block based on motion vectors of neighboring blocks.

FIG. 9A is for illustrating deriving a motion vector of each sub-block based on motion vectors of neighboring blocks. In FIG. 9A, the current block includes 16 4×4 sub-blocks. Here, motion vector $v_0$ of the top left corner control point in the current block is derived based on motion vectors of neighboring sub-blocks, and motion vector $v_1$ of the top right corner control point in the current block is derived based on motion vectors of neighboring blocks. Then, using the two motion vectors $v_0$ and $v_1$, the motion vector $(v_x, v_y)$ of each sub-block in the current block is derived using Equation 2 below.

MATH. 2

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \quad (2)$$

Here, x and y are the horizontal and vertical positions of the sub-block, respectively, and w is a predetermined weighted coefficient.

Such an affine motion compensation prediction mode may include a number of modes of different methods of deriving the motion vectors of the top left and top right corner control points. Information indicating such an affine motion compensation prediction mode (referred to as, for example, an affine flag) is signalled at the CU level. Note that the signaling of information indicating the affine motion compensation prediction mode need not be performed at the CU level, and may be performed at another level (for example, at the sequence level, picture level, slice level, tile level, CTU level, or sub-block level).

[Prediction Controller]

Prediction controller 128 selects either the intra prediction signal or the inter prediction signal, and outputs the selected prediction signal to subtractor 104 and adder 116.

Figure 9B:
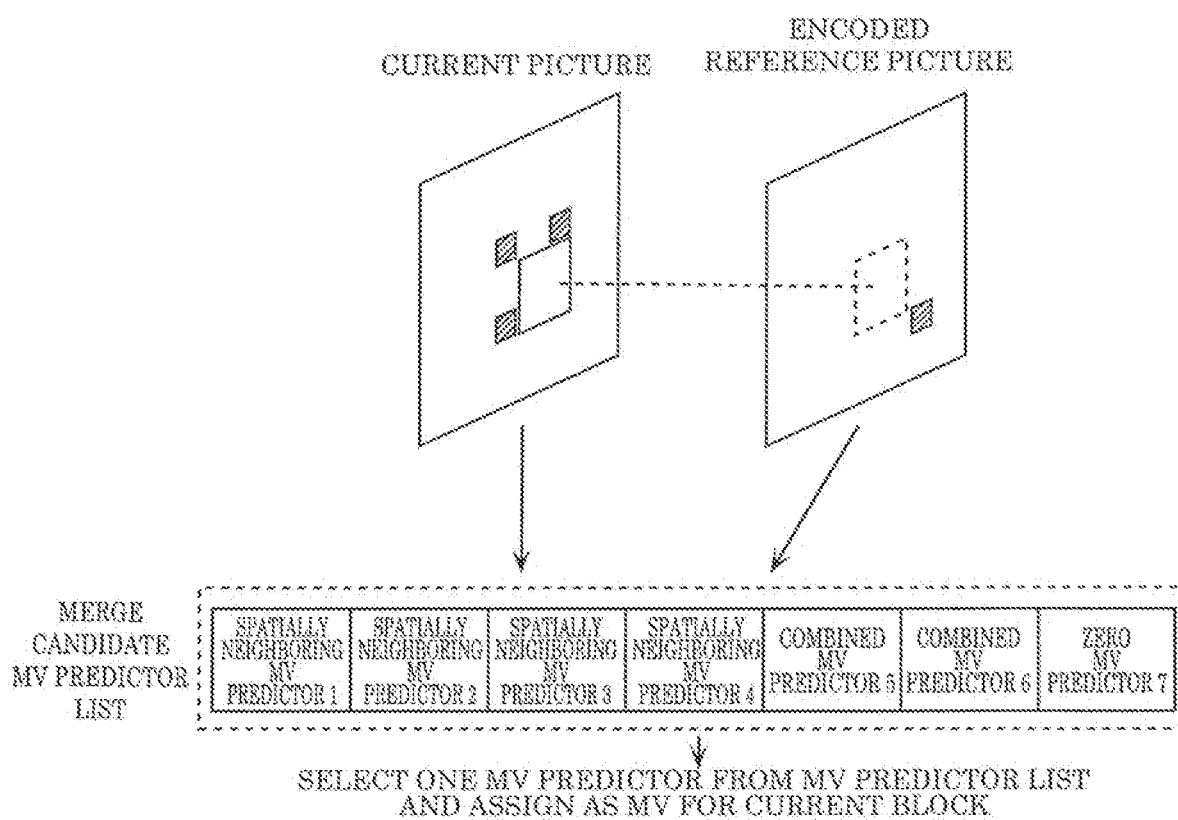
FIG. 9B is for illustrating an outline of a process for deriving a motion vector via merge mode.

Here, an example of deriving a motion vector via merge mode in a current picture will be given. FIG. 9B is for illustrating an outline of a process for deriving a motion vector via merge mode.

First, an MV predictor list in which candidate MV predictors are registered is generated. Examples of candidate MV predictors include: spatially neighboring MV predictors, which are MVs of encoded blocks positioned in the spatial vicinity of the current block; a temporally neighboring MV predictor, which is an MV of a block in an encoded reference picture that neighbors a block in the same location as the current block; a combined MV predictor, which is an MV generated by combining the MV values of the spatially neighboring MV predictor and the temporally neighboring MV predictor; and a zero MV predictor, which is an MV whose value is zero.

Next, the MV of the current block is determined by selecting one MV predictor from among the plurality of MV predictors registered in the MV predictor list.

Furthermore, in the variable-length encoder, a merge_idx, which is a signal indicating which MV predictor is selected, is written and encoded into the stream.

Note that the MV predictors registered in the MV predictor list illustrated in FIG. 9B constitute one example. The number of MV predictors registered in the MV predictor list may be different from the number illustrated in FIG. 9B, the MV predictors registered in the MV predictor list may omit one or more of the types of MV predictors given in the example in FIG. 9B, and the MV predictors registered in the MV predictor list may include one or more types of MV predictors in addition to and different from the types given in the example in FIG. 9B.

Note that the final MV may be determined by performing DMVR processing (to be described later) by using the MV of the current block derived via merge mode.

Here, an example of determining an MV by using DMVR processing will be given.

Figure 9C:
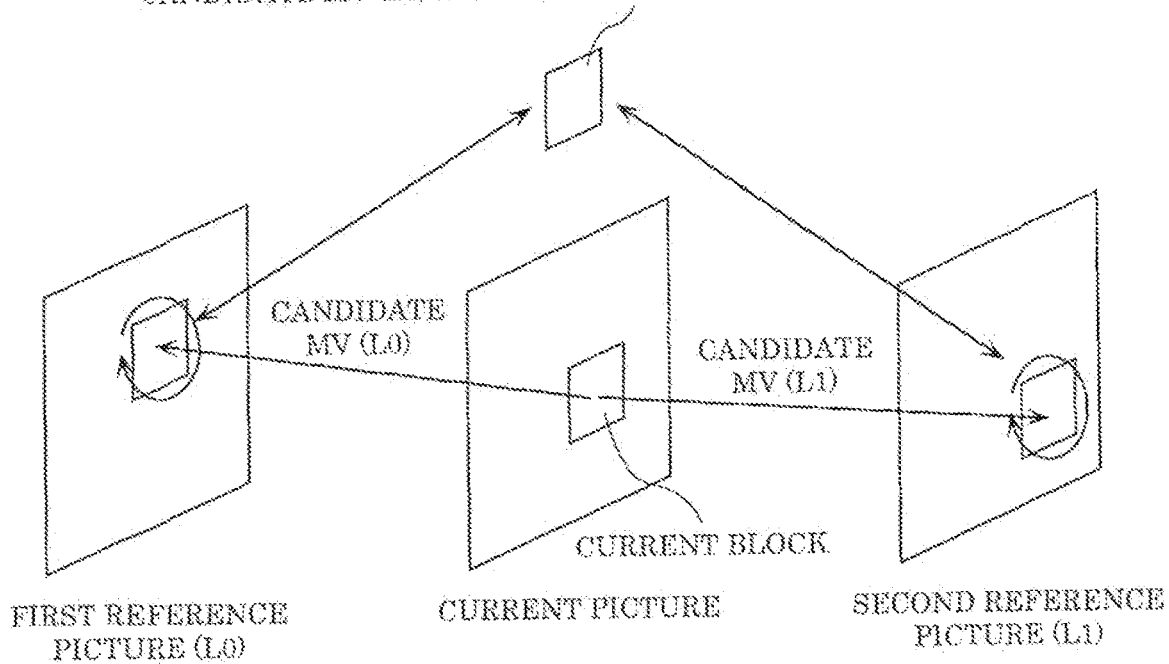
FIG. 9C is a conceptual diagram for illustrating an outline of DMVR processing.

FIG. 9C is a conceptual diagram for illustrating an outline of DMVR processing.

First, the most appropriate MVP set for the current block is considered to be the candidate MV, reference pixels are obtained from a first reference picture, which is a picture processed in the L0 direction in accordance with the candidate MV, and a second reference picture, which is a picture processed in the L1 direction in accordance with the candidate MV, and a template is generated by calculating the average of the reference pixels.

Next, using the template, the surrounding regions of the candidate MVs of the first and second reference pictures are searched, and the MV with the lowest cost is determined to be the final MV. Note that the cost value is calculated using, for example, the difference between each pixel value in the template and each pixel value in the regions searched, as well as the MV value.

Note that the outlines of the processes described here are fundamentally the same in both the encoder and the decoder.

Note that processing other than the processing exactly as described above may be used, so long as the processing is capable of deriving the final MV by searching the surroundings of the candidate MV.

Here, an example of a mode that generates a prediction image by using LIC processing will be given.

Figure 9D:
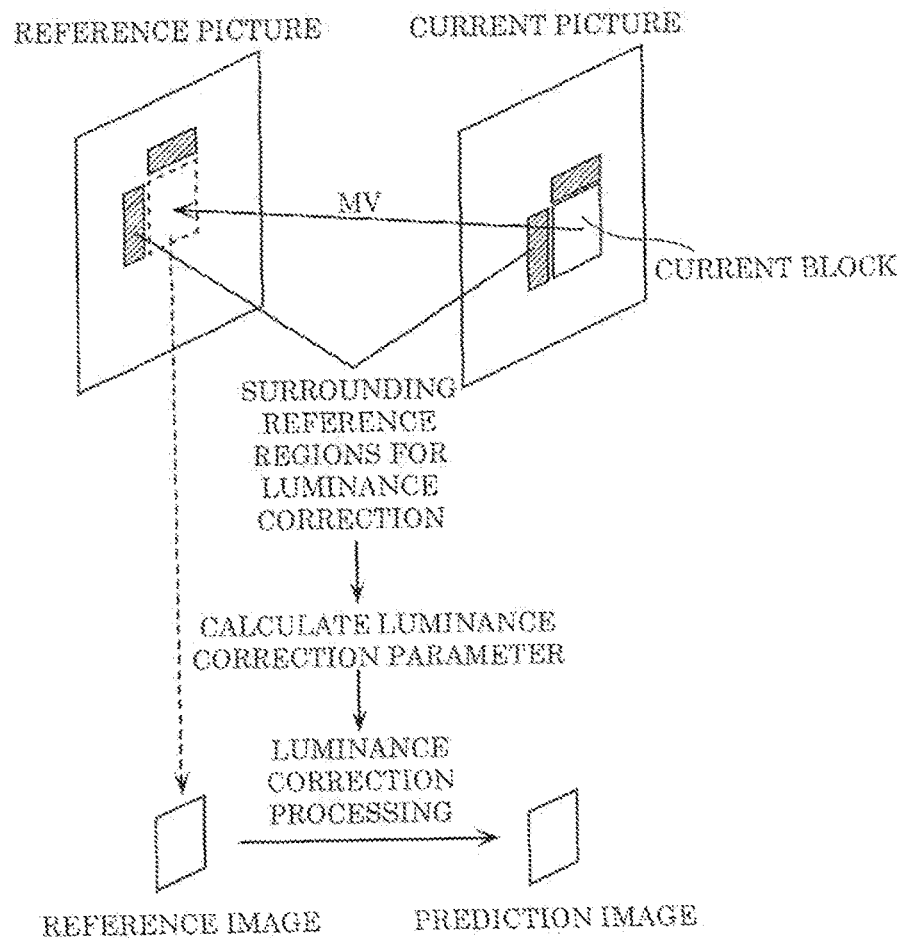
FIG. 9D is for illustrating an outline of a prediction image generation method using a luminance correction process performed via LIC processing.

FIG. 9D is for illustrating an outline of a prediction image generation method using a luminance correction process performed via LIC processing.

First, an MV is extracted for obtaining, from an encoded reference picture, a reference image corresponding to the current block.

Next, information indicating how the luminance value changed between the reference picture and the current picture is extracted and a luminance correction parameter is calculated by using the luminance pixel values for the encoded left neighboring reference region and the encoded upper neighboring reference region, and the luminance pixel value in the same location in the reference picture specified by the MV.

The prediction image for the current block is generated by performing a luminance correction process by using the luminance correction parameter on the reference image in the reference picture specified by the MV.

Note that the shape of the surrounding reference region illustrated in FIG. 9D is just one example; the surrounding reference region may have a different shape.

Moreover, although a prediction image is generated from a single reference picture in this example, in cases in which a prediction image is generated from a plurality of reference pictures as well, the prediction image is generated after performing a luminance correction process, via the same method, on the reference images obtained from the reference pictures.

One example of a method for determining whether to implement LIC processing is by using an lic_flag, which is a signal that indicates whether to implement LIC processing. As one specific example, the encoder determines whether the current block belongs to a region of luminance change. The encoder sets the lic_flag to a value of "1" when the block belongs to a region of luminance change and implements LIC processing when encoding, and sets the lic_flag to a value of "0" when the block does not belong to a region of luminance change and encodes without implementing LIC processing. The decoder switches between implementing LIC processing or not by decoding the lic_flag written in the stream and performing the decoding in accordance with the flag value.

One example of a different method of determining whether to implement LIC processing is determining so in accordance with whether LIC processing was determined to be implemented for a surrounding block. In one specific example, when merge mode is used on the current block, whether LIC processing was applied in the encoding of the surrounding encoded block selected upon deriving the MV in the merge mode processing may be determined, and whether to implement LIC processing or not can be switched based on the result of the determination. Note that in this example, the same applies to the processing performed on the decoder side.

[Decoder Outline]

Figure 10:
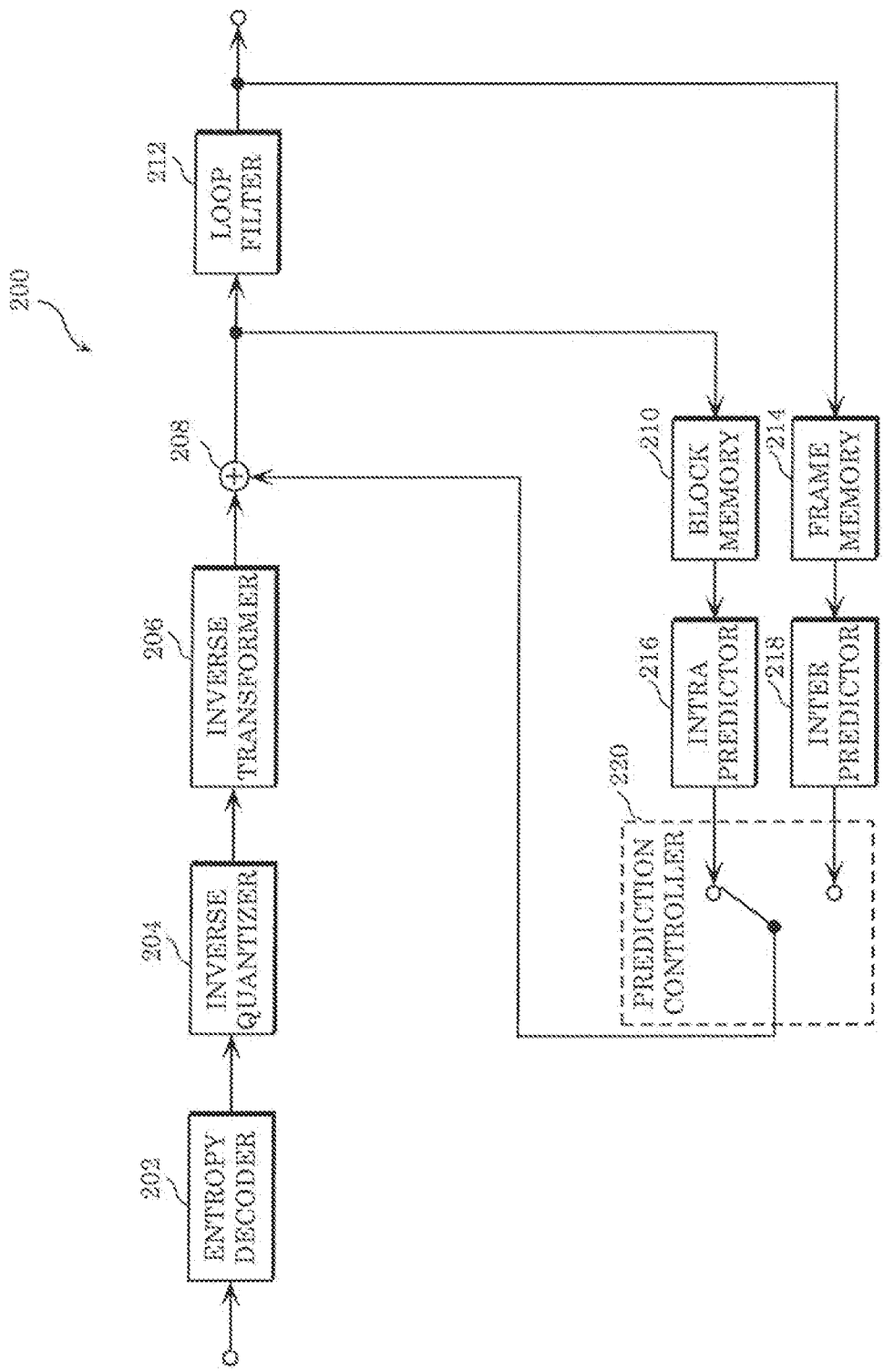
FIG. 10 is a block diagram illustrating a functional configuration of a decoder according to Embodiment 1.

Next, a decoder capable of decoding an encoded signal (encoded bitstream) output from encoder 100 will be described. FIG. 10 is a block diagram illustrating a functional configuration of decoder 200 according to Embodiment 1. Decoder 200 is a moving picture/picture decoder that decodes a moving picture/picture block by block.

As illustrated in FIG. 10, decoder 200 includes entropy decoder 202, inverse quantizer 204, inverse transformer 206, adder 208, block memory 210, loop filter 212, frame memory 214, intra predictor 216, inter predictor 218, and prediction controller 220.

Decoder 200 is realized as, for example, a generic processor and memory. In this case, when a software program stored in the memory is executed by the processor, the processor functions as entropy decoder 202, inverse quantizer 204, inverse transformer 206, adder 208, loop filter 212, intra predictor 216, inter predictor 218, and prediction controller 220. Alternatively, decoder 200 may be realized as one or more dedicated electronic circuits corresponding to entropy decoder 202, inverse quantizer 204, inverse transformer 206, adder 208, loop filter 212, intra predictor 216, inter predictor 218, and prediction controller 220.

Hereinafter, each component included in decoder 200 will be described.

[Entropy Decoder]

Entropy decoder 202 entropy decodes an encoded bitstream. More specifically, for example, entropy decoder 202 arithmetic decodes an encoded bitstream into a binary signal. Entropy decoder 202 then debinarizes the binary signal. With this, entropy decoder 202 outputs quantized coefficients of each block to inverse quantizer 204.

Inverse Quantized

Inverse quantizer 204 inverse quantizes quantized coefficients of a block to be decoded (hereinafter referred to as a current block), which are inputs from entropy decoder 202. More specifically, inverse quantizer 204 inverse quantizes quantized coefficients of the current block based on quantization parameters corresponding to the quantized coefficients. Inverse quantizer 204 then outputs the inverse quantized coefficients (i.e., transform coefficients) of the current block to inverse transformer 206.

[Inverse Transformer]

Inverse transformer 206 restores prediction errors by inverse transforming transform coefficients, which are inputs from inverse quantizer 204.

For example, when information parsed from an encoded bitstream indicates application of EMT or AMT (for example, when the AMT flag is set to true), inverse transformer 206 inverse transforms the transform coefficients of the current block based on information indicating the parsed transform type.

Moreover, for example, when information parsed from an encoded bitstream indicates application of NSST, inverse transformer 206 applies a secondary inverse transform to the transform coefficients.

[Adder]

Adder 208 reconstructs the current block by summing prediction errors, which are inputs from inverse transformer 206, and prediction samples, which is an input from prediction controller 220. Adder 208 then outputs the reconstructed block to block memory 210 and loop filter 212.

[Block Memory]

Block memory 210 is storage for storing blocks in a picture to be decoded (hereinafter referred to as a current picture) for reference in intra prediction. More specifically, block memory 210 stores reconstructed blocks output from adder 208.

[Loop Filter]

Loop filter 212 applies a loop filter to blocks reconstructed by adder 208, and outputs the filtered reconstructed blocks to frame memory 214 and, for example, a display device.

When information indicating the enabling or disabling of ALF parsed from an encoded bitstream indicates enabled, one filter from among a plurality of filters is selected based on direction and activity of local gradients, and the selected filter is applied to the reconstructed block.

[Frame Memory]

Frame memory 214 is storage for storing reference pictures used in inter prediction, and is also referred to as a frame buffer. More specifically, frame memory 214 stores reconstructed blocks filtered by loop filter 212.

[Intra Predictor]

Intra predictor 216 generates a prediction signal (intra prediction signal) by intra prediction with reference to a block or blocks in the current picture and stored in block memory 210. More specifically, intra predictor 216 generates an intra prediction signal by intra prediction with reference to samples (for example, luma and/or chroma values) of a block or blocks neighboring the current block, and then outputs the intra prediction signal to prediction controller 220.

Note that when an intra prediction mode in which a chroma block is intra predicted from a luma block is selected, intra predictor 216 may predict the chroma component of the current block based on the luma component of the current block.

Moreover, when information indicating the application of PDPC is parsed from an encoded bitstream, intra predictor 216 corrects post-intra-prediction pixel values based on horizontal/vertical reference pixel gradients.

[Inter Predictor]

Inter predictor 218 predicts the current block with reference to a reference picture stored in frame memory 214. Inter prediction is performed per current block or per sub-block (for example, per 4×4 block) in the current block. For example, inter predictor 218 generates an inter prediction signal of the current block or sub-block by motion compensation by using motion information (for example, a motion vector) parsed from an encoded bitstream, and outputs the inter prediction signal to prediction controller 220.

Note that when the information parsed from the encoded bitstream indicates application of OBMC mode, inter predictor 218 generates the inter prediction signal using motion information for a neighboring block in addition to motion information for the current block obtained from motion estimation.

Moreover, when the information parsed from the encoded bitstream indicates application of FRUC mode, inter predictor 218 derives motion information by performing motion estimation in accordance with the pattern matching method (bilateral matching or template matching) parsed from the encoded bitstream. Inter predictor 218 then performs motion compensation using the derived motion information.

Moreover, when BIO mode is to be applied, inter predictor 218 derives a motion vector based on a model assuming uniform linear motion. Moreover, when the information parsed from the encoded bitstream indicates that affine motion compensation prediction mode is to be applied, inter predictor 218 derives a motion vector of each sub-block based on motion vectors of neighboring blocks.

[Prediction Controller]

Prediction controller 220 selects either the intra prediction signal or the inter prediction signal, and outputs the selected prediction signal to adder 208.

This aspect may be implemented in combination with at least one or more of the other aspects according to the present disclosure. In addition, one or more of the processes in the flowcharts, one or more of the constituent elements of the apparatuses, and part of the syntax described in this aspect may be implemented in combination with other aspects.

[Internal Configuration of Block Splitter in Encoder According to First Aspect]

Figure 11:
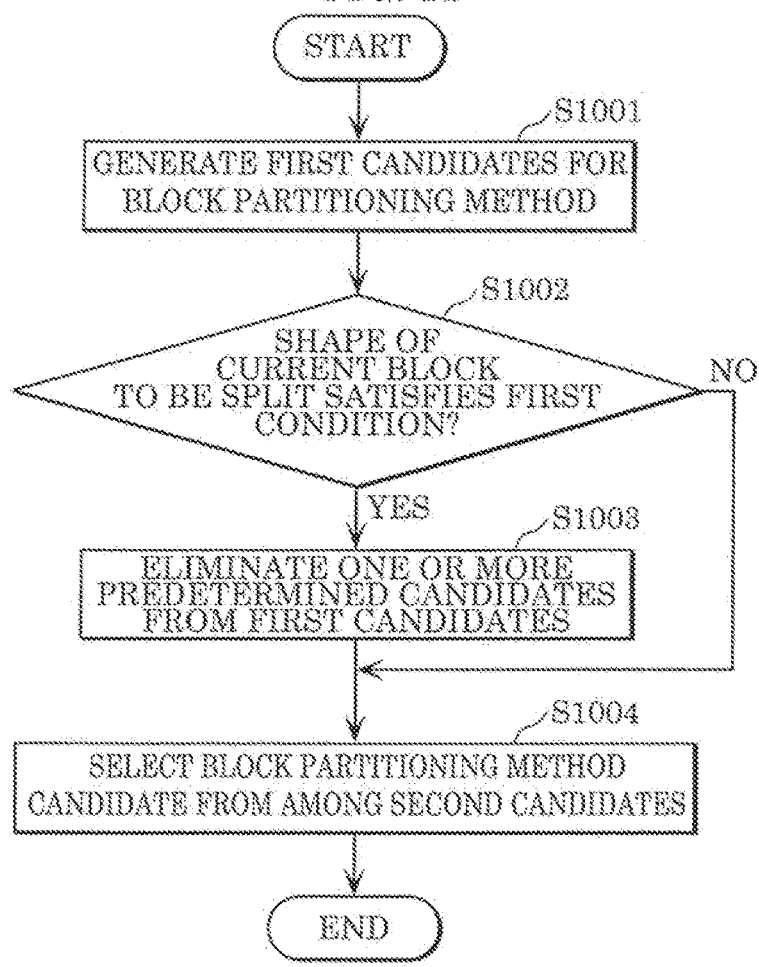
FIG. 11 is a flowchart illustrating a process of selecting a block partitioning method candidate, which is performed by a block splitter in an encoder according to a first aspect.

FIG. 11 is a flowchart illustrating a process of selecting a block partitioning method candidate, which is performed by a block splitter in an encoder according to a first aspect.

First, encoder 100 generates first candidates for a block partitioning method (S1001). A block partitioning method is a method for splitter 102 in encoder 100 to split a current block. A current block to be split is an image block to be split by splitter 102 when encoder 100 performs encoding. The first candidates may include, for example, a method of performing binary splitting in a vertical direction, a method of performing binary splitting in a horizontal direction, a method of performing ternary splitting in a vertical direction, a method of performing quad splitting, and a method in which no splitting is performed. Note that the block partitioning methods included in the first candidates are not limited to those listed above.

Subsequently, encoder 100 determines whether the shape of a current block to be split satisfies a first condition (S1002). The first condition may be, for example, whether a value indicating a ratio of the longer side to the shorter side of the current block is greater than a predetermined value.

When the shape of the current block satisfies the first condition (Yes in S1002), encoder 100 eliminates one or more predetermined block partitioning method candidates from the first candidates including a plurality of candidates for a block partitioning method (S1003). A candidate to be eliminated from the first candidates may be, for example, a candidate corresponding to a block partitioning method such that a value indicating a ratio of the longer side to the shorter side of a block generated through the splitting of a current block is greater than a value indicating a ratio of the longer side to the shorter side of the current block. Specifically, encoder 100 may eliminate binary splitting in a vertical direction and ternary splitting in a vertical direction performed on a vertically elongated current block. Note that the examples of a candidate to be eliminated from the first candidates are not limited to those listed above.

By thus eliminating the block partitioning methods as described above, encoder 100 may generate second candidates including one or more block partitioning method candidates.

When the shape of the current block does not satisfy the first condition (No in S1002), encoder 100 does not eliminate any block partitioning method candidate from the first candidates. Here, candidates generated by encoder 100 without eliminating any block partitioning method candidate from the first candidates may be defined as second candidates.

Next, encoder 100 selects a block partitioning method candidate from among the second candidates for a block partitioning method (S1004). Even when encoder 100 selects one block partitioning method from the second candidates, candidates generated by encoder 100 without eliminating any block partitioning method candidate from the first candidates may be defined as second candidates. An R-D optimization, for instance, may be used as a method for selecting a block partitioning method. The R-D optimization is assumed to be a method in which encoder 100 tries out all of a plurality of block partitioning method candidates, evaluates the cost of each candidate, and selects a block partitioning method candidate that gained the highest score in the cost evaluation.

Encoder 100 then splits the current block according to the block partitioning method selected in step S1004.

It should be noted that in the process performed in step S1003, the elimination of a block partitioning method candidate may be carried out without depending on a block partitioning method of a current block to be split and the number of partitions according to the block partitioning method. For example, a block partitioning method candidate to be eliminated from the first candidates may be determined according to the type of a picture such as I-picture, P-picture, and B-picture, or the type of a prediction mode such as intra prediction mode and inter prediction mode. Alternatively, a block partitioning method candidate to be eliminated from the first candidates may be determined using one of the following: a block partitioning method of a current block to be split; and the number of partitions according to the block partitioning method.

The process illustrated in FIG. 11 may be applied to the block partitioning of a prediction unit (PU) or a transform unit (TU).

[Examples of Block Partitioning Method]

Figure 12:
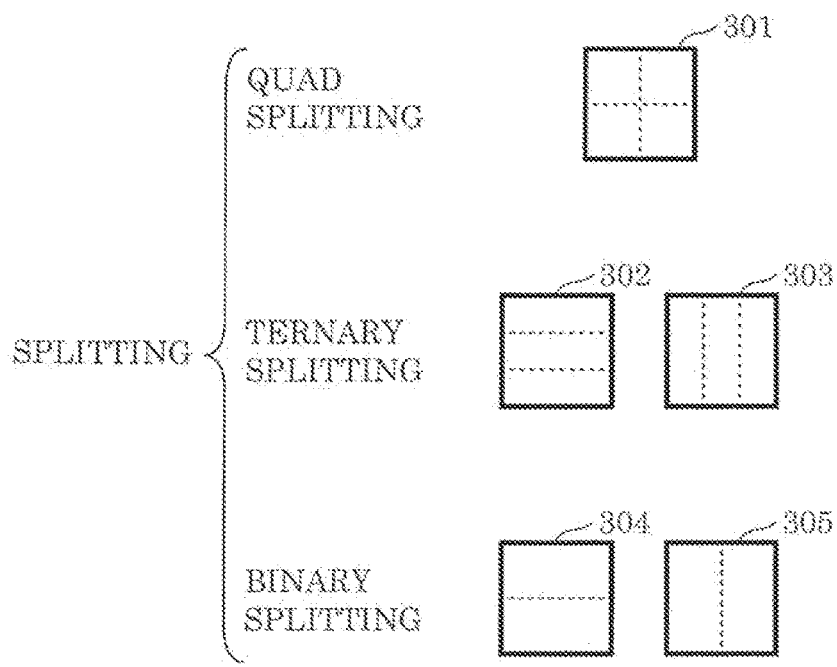
FIG. 12 is a diagram illustrating examples of a block partitioning method.

FIG. 12 is a diagram illustrating examples of a block partitioning method. The block partitioning method may comprise, for example, quad splitting of splitting a current block into symmetric quadrilaterals, ternary splitting of splitting a current block with the ratio of 1:2:1 in the same direction, and binary splitting of splitting a current block with the ratio of 1:1.

Quad splitting 301 of splitting a current block into symmetric quadrilaterals can be expressed as not involving a direction related to block partitioning because blocks generated through the splitting of the current block are bilaterally and vertically symmetrical.

In the ternary splitting of a current block, the shape of blocks generated through the splitting of the current block varies according to the direction, e.g., vertical, horizontal, etc., in which the splitting is performed on the current block. The ternary splitting comprises, for example, ternary splitting 302 of splitting a current block into three in a horizontal direction and ternary splitting 303 of splitting a current block into three in a vertical direction. Accordingly, the ternary splitting is expressed as involving a direction related to block partitioning.

When a current block is split into two, the shape of blocks generated through the splitting of the current block varies according to the direction, e.g., vertical, horizontal, etc., in which the splitting is performed on the current block. The binary splitting comprises, for example, binary splitting 304 of splitting a current block into two in a horizontal direction and binary splitting 305 of splitting a current block into two in a vertical direction. Accordingly, the binary splitting is expressed as involving a direction related to block partitioning.

It is to be noted that a partitioning method other than binary splitting and ternary splitting is expressed as involving a direction related to block partitioning when the shape of blocks generated through the splitting of a current block varies according to the direction, e.g., vertical, horizontal, etc., in which the splitting is performed.

The shape of a current block is not limited to a square and may be a rectangle, for instance.

Moreover, when splitting a current block into two or three, encoder 100 may hold block-partitioning-related direction information which is information on a direction related to block partitioning. The case where encoder 100 holds the block-partitioning-related direction information is not limited to binary or ternary splitting. The case where encoder 100 holds block-partitioning-related direction information may comprise all of cases where the shape of a block generated through the splitting of a current block varies according to the direction in which the current block is split.

Figure 13:
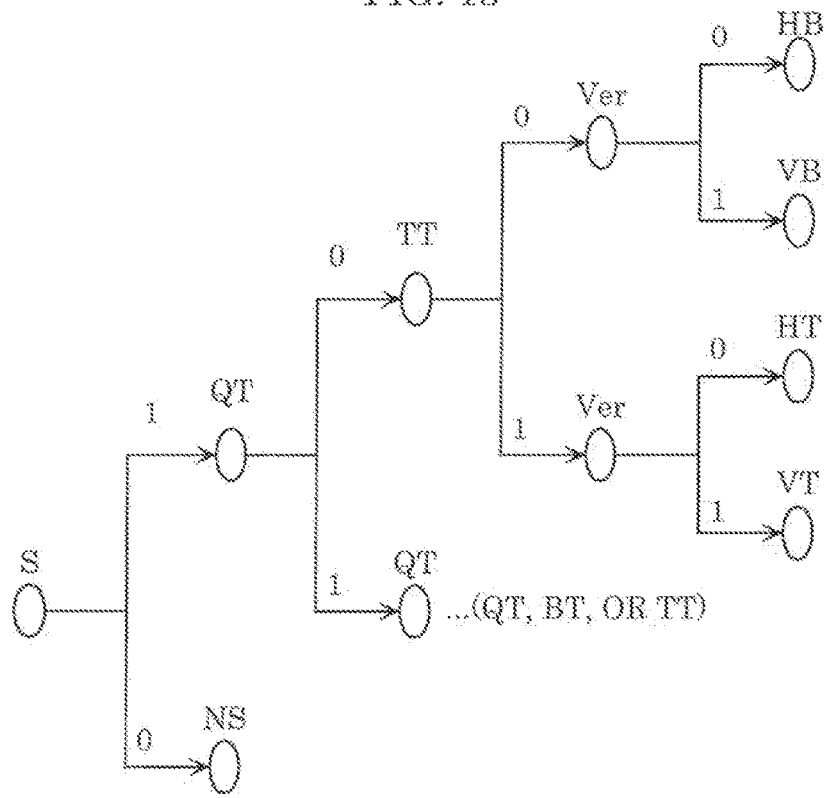
FIG. 13 is a diagram illustrating an example of a syntax tree indicating information on a block partitioning method.

FIG. 13 is a diagram illustrating an example of a syntax tree indicating information on a block partitioning method. FIG. 13 shows a syntax tree indicating block partitioning method information, which has, as block partitioning method candidates, a selection of binary splitting, ternary splitting, quad splitting, and no splitting.

First, S that is information indicating whether to perform splitting is presented. Next, QT that is information indicating whether to perform quad splitting is presented. Then, TT that is information indicating whether to perform ternary splitting is presented. Lastly, Ver which is information indicating a partitioning direction is presented. When information is set to perform QT, information may be set to perform QT again. In such a case, a recursive return from QT to QT is allowed in the syntax tree.

The following describes the case where S=1 is presented, QT=1 is presented two times, TT=0 is presented, and Ver=0 is presented. Encoder 100 firstly performs quad splitting to split a current block into four symmetrical quadrilaterals. Subsequently, encoder 100 further splits each of blocks generated through the splitting of the current block into four symmetrical quadrilaterals. In other words, encoder 100 recursively splits the current block into four symmetrical quadrilaterals for two times. After that, encoder 100 may perform binary splitting in a horizontal direction on a block generated through the splitting described above.

Concrete Example 1 of Encoding Process
According to First Aspect

Figure 14:
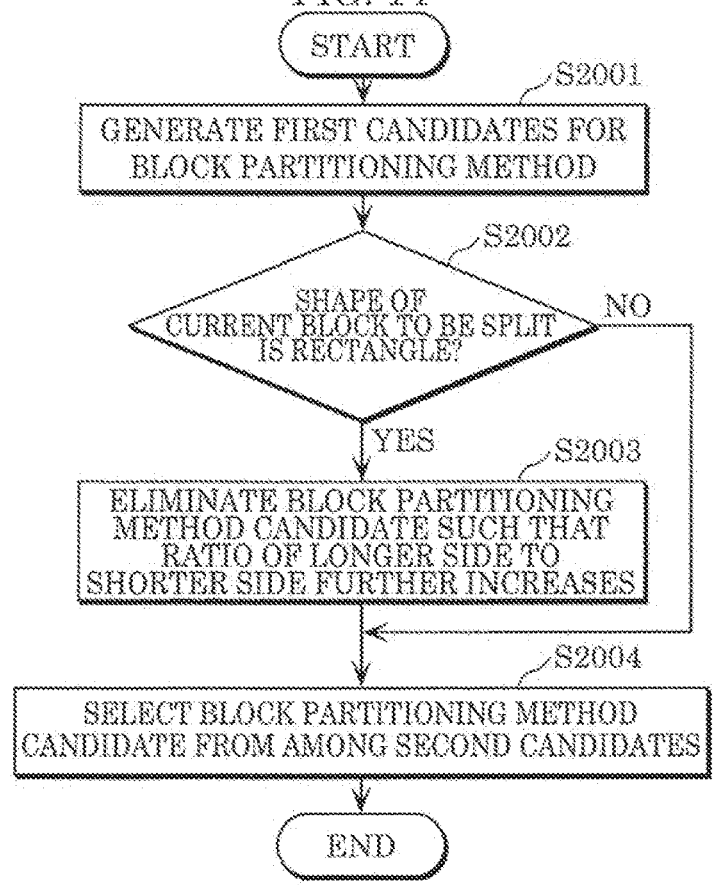
FIG. 14 is a flowchart illustrating a process of selecting a block partitioning method candidate, which is performed by a block splitter in an encoder according to concrete example 1 of the first aspect.

FIG. 14 is a flowchart illustrating a process of selecting a block partitioning method candidate, which is performed by a block splitter in an encoder according to concrete example 1 of the first aspect.

First, encoder 100 generates first candidates for a block partitioning method (S2001). A block partitioning method is a method for splitter 102 in encoder 100 to split a current block. A current block to be split is an image block to be split by splitter 102 when encoder 100 performs encoding. The first candidates may include, for example, a method of performing binary splitting in a vertical direction, a method of performing binary splitting in a horizontal direction, a method of performing ternary splitting in a vertical direction, a method of performing quad splitting, and a method in which no splitting is performed. Note that the block partitioning methods included in the first candidates are not limited to those listed above.

First, encoder 100 determines whether the shape of a current block to be split is a rectangle (S2002). Rectangle may be a vertically elongated rectangle or a horizontally elongated rectangle. A vertically elongated rectangle means a rectangle having sides along a vertical direction longer than sides along a horizontal direction. A horizontally elongated rectangle means a rectangle having sides along a horizontal direction longer than sides along a vertical direction. Note that a condition for determining the shape of the current block may be whether the current block is a square.

When the shape of the current block is a rectangle (Yes in S2002), encoder 100 eliminates, from the first candidates, at least one block partitioning method candidate such that a value indicating a ratio of the longer side to the shorter side of a block generated through the splitting of the current block is greater than a value indicating a ratio of the longer side to the shorter side of the current block (S2003).

For example, regarding candidates for a block partitioning method involving a direction related to block partitioning, such as ternary splitting 302 of splitting a current block into three in a horizontal direction, ternary splitting 303 of splitting a current block into three in a vertical direction, binary splitting 304 of splitting a current block into two in a horizontal direction, and binary splitting 305 of splitting a current block into two in a vertical direction, a candidate corresponding to a partitioning method such that the shorter side of a vertically elongated block is made shorter or a candidate corresponding to a partitioning method such that the shorter side of a horizontally elongated block is made shorter may be eliminated.

By thus eliminating the block partitioning method, encoder 100 may generate second candidates including one or more block partitioning method candidates.

When the shape of the current block is not a rectangle (No in S2002), encoder 100 does not eliminate any block partitioning method candidate from the first candidates. Here, candidates generated by encoder 100 without eliminating any block partitioning method candidate from the first candidates may be defined as second candidates.

Next, encoder 100 selects a block partitioning method candidate from among the second candidates for a block partitioning method (S2004). Here, encoder 100 may select one block partitioning method candidate from among the second candidates. An R-D optimization, for instance, may be used as a method for selecting a block partitioning method. The R-D optimization is assumed to be a method in which encoder 100 tries out all of a plurality of block partitioning method candidates, evaluates the cost of each candidate, and selects a block partitioning method candidate that gained the highest score in the cost evaluation.

Encoder 100 then splits the current block according to the block partitioning method selected in step S2004.

FIG. 15 is a chart illustrating block partitioning methods and a limiting condition when splitting is performed, according to concrete example 1 of the first aspect. When the shape of a current block to be split is a square, the current block is splittable in both vertical and horizontal directions. None of ternary splitting 306 of splitting a current block into three in a horizontal direction, ternary splitting 307 of splitting a current block into three in a vertical direction, binary splitting 308 of splitting a current block into two in a horizontal direction, and binary splitting 309 of splitting a current block into two in a vertical direction is prohibited or eliminated from block partitioning method candidates by encoder 100.

When the shape of the current block is a rectangle, encoder 100 may eliminate, from the first candidates for a block partitioning method, a candidate corresponding to a partitioning method such that the shorter side of a vertically elongated block is made shorter or a candidate corresponding to a partitioning method such that the shorter side of a horizontally elongated block is made shorter.

For example, encoder 100 prohibits ternary splitting 310 of splitting a horizontally elongated rectangle such that sides along a vertical direction are made shorter. On the contrary, encoder 100 does not prohibit ternary splitting 311 of splitting a horizontally elongated rectangle such that sides along a horizontal direction are made shorter.

In other words, encoder 100 eliminates ternary splitting 310 but does not eliminate ternary splitting 311 from the first candidates.

For example, encoder 100 prohibits binary splitting 312 of splitting a horizontally elongated rectangle such that sides along a vertical direction are made shorter. On the contrary, encoder 100 does not prohibit binary splitting 313 of splitting a horizontally elongated rectangle such that sides along a horizontal direction are made shorter.

In other words, encoder 100 eliminates binary splitting 312 but does not eliminate binary splitting 313 from the first candidates.

Figure 16:
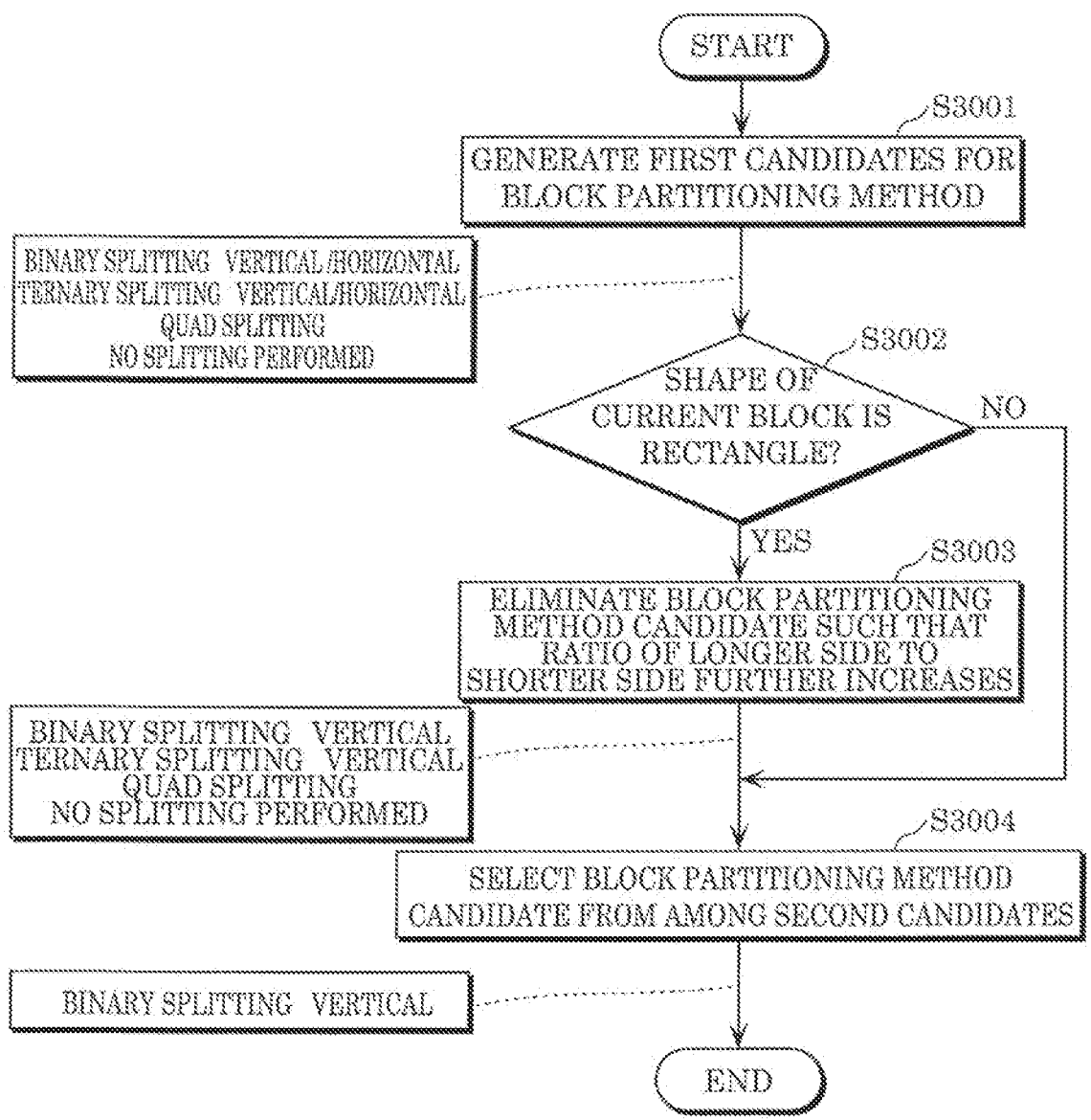
FIG. 16 is a flowchart illustrating a process of selecting a block partitioning method candidate when a current block to be split is a horizontally elongated rectangle, according to concrete example 1 of the first aspect.

Transition of Candidates for Block Partitioning Direction in Concrete Example 1 of Encoding Process According to the First Aspect FIG. 16 is a flowchart illustrating a process of selecting a block partitioning method candidate when a current block to be split is a horizontally elongated rectangle, according to concrete example 1 of the first aspect.

First, encoder 100 generates first candidates for a block partitioning method for a current block to be split (S3001). The first candidates may include, for example, a method of performing binary splitting in a vertical direction, a method of performing binary splitting in a horizontal direction, a method of performing ternary splitting in a vertical direction, a method of performing quad splitting, and a method in which no splitting is performed. Note that the block partitioning methods included in the first candidates are not limited to those listed above.

Next, encoder 100 determines whether the shape of the current block is a rectangle (S3002).

When the shape of the current block is a rectangle (Yes in S3002), encoder 100 eliminates, from the first candidates including a plurality of block partitioning methods, at least one block partitioning method candidate such that a value indicating a ratio of the longer side to the shorter side of a block generated through the splitting of the current block is greater than a value indicating a ratio of the longer side to the shorter side of the current block. For example, a partitioning method of performing binary splitting on a horizontally elongated rectangle in a horizontal direction and a partitioning method of performing ternary splitting on a horizontally elongated rectangle in a horizontal direction are eliminated.

By thus eliminating the block partitioning methods, encoder 100 may generate second candidates including one or more block partitioning method candidates.

When the shape of the current block is not a rectangle (No in S3002), no block partitioning method candidate is eliminated from the first candidates. Here, candidates generated by encoder 100 without eliminating any block partitioning method candidate from the first candidates may be defined as second candidates.

Encoder 100 then selects a block partitioning method candidate from the second candidates for a block partitioning method (S3004). Here, a method of performing binary splitting in a vertical direction on a current block to be split, for example, is selected.

As described above, either or both of the elimination and selection of a block partitioning method candidate for a current block to be split is/are performed.

Concrete Example 2 of Encoding Process According to First Aspect

Figure 17:
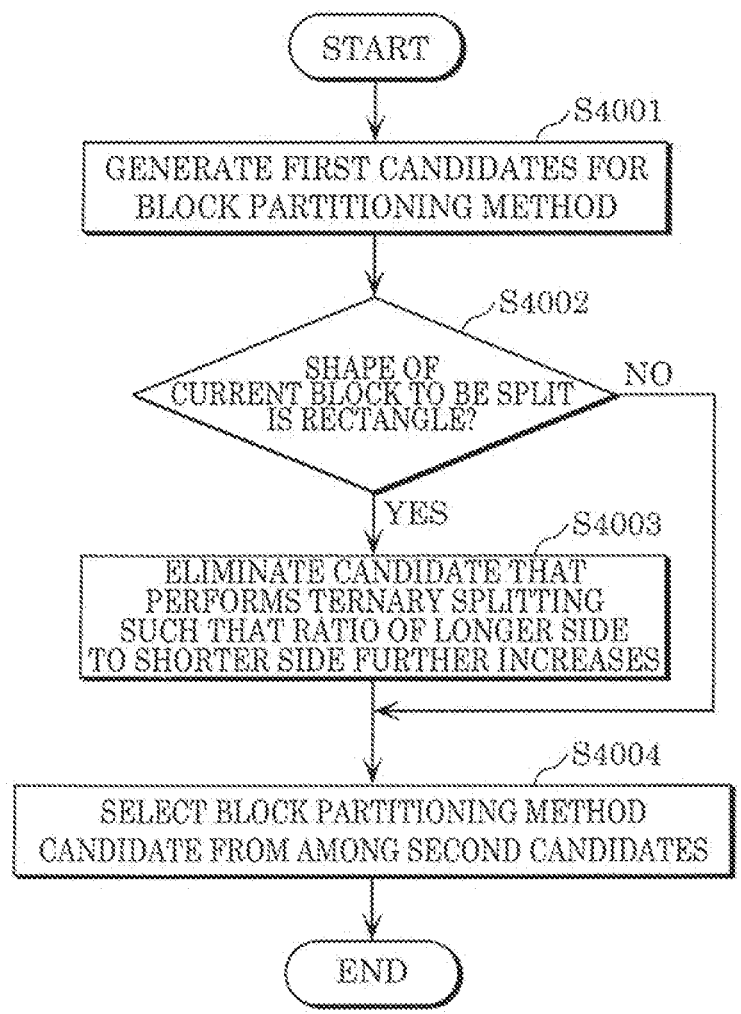
FIG. 17 is a flowchart illustrating a process of selecting a block partitioning method candidate, which is performed by the block splitter in the encoder according to the first aspect.

FIG. 17 is a flowchart illustrating a process of selecting a block partitioning method candidate, which is performed by the block splitter in the encoder according to the first aspect.

First, encoder 100 generates first candidates for a block partitioning method (S4001). A block partitioning method is a method for splitter 102 in encoder 100 to split a current block. A current block to be split is an image block to be split by splitter 102 when encoder 100 performs encoding. The first candidates may include, for example, a method of performing binary splitting in a vertical direction, a method of performing binary splitting in a horizontal direction, a method of performing ternary splitting in a vertical direction, a method of performing quad splitting, and a method in which no splitting is performed. Note that the block partitioning methods included in the first candidates are not limited to those listed above.

Next, encoder 100 determines whether the shape of a current block to be split is a rectangle (S4002). A condition for determining the shape of the current block may be whether the shape of the current block is a square.

When the shape of the current block is a rectangle (Yes in S4002), encoder 100 eliminates, from the first candidates including a plurality of block partitioning method candidates, a block partitioning method candidate corresponding to ternary splitting such that a value indicating a ratio of the longer side to the shorter side of a block generated through the splitting of the current block is greater than a value indicating a ratio of the longer side to the shorter side of the current block (S4003).

For example, a partitioning method of performing ternary splitting on a vertically elongated rectangle in a vertical direction and a partitioning method of performing ternary splitting on a horizontally elongated rectangle in a horizontal direction may be eliminated. Here, a block partitioning method candidate of performing binary splitting on a current block may not be eliminated.

A block partitioning method candidate that performs binary splitting on a current block to be split may be eliminated, but a block partitioning method candidate that performs ternary splitting on a current block may not be eliminated from the first candidates.

By thus eliminating the block partitioning method(s) as described above, encoder 100 may generate second candidates including one or more block partitioning method candidates.

When the shape of the current block is not a rectangle (No in S4002), no block partitioning method candidate is eliminated from the first candidates.

Here, candidates generated by encoder 100 without eliminating any block partitioning method candidate from the first candidates may be defined as second candidates.

Next, encoder 100 selects a block partitioning method candidate from the second candidates for a block partitioning method (S4004). Here, encoder 100 may select one block partitioning method candidate from among the second candidates. An R-D optimization, for instance, may be used as a method for selecting a block partitioning method. The R-D optimization is assumed to be a method in which encoder 100 tries out all of a plurality of block partitioning method candidates, evaluates the cost of each candidate, and selects a block partitioning method candidate that gained the highest score in the cost evaluation.

Encoder 100 then splits the current block according to the block partitioning method selected in step S4004.

Although it is described that encoder 100 eliminates, at step S4003, a block partitioning method candidate of performing ternary splitting such that a value indicating a ratio of the longer side to the shorter side of a block generated through the splitting of the current block is greater than a value indicating a ratio of the longer side to the shorter side of the current block, encoder 100 may eliminate a block partitioning method candidate of performing binary splitting such that a value indicating a ratio of the longer side to the shorter side of a block generated through the splitting of the current block is greater than a value indicating a ratio of the longer side to the shorter side of the current block.

FIG. 18 is a chart illustrating block partitioning methods and a limiting condition when splitting is performed, according to concrete example 2 of the first aspect. When the shape of a current block to be split is a square, the current block is splittable in both vertical and horizontal directions. None of ternary splitting 306 of splitting a current block into three in a horizontal direction, ternary splitting 307 of splitting a current block into three in a vertical direction, binary splitting 308 of splitting a current block into two in a horizontal direction, and binary splitting 309 of splitting a current block into two in a vertical direction is prohibited or eliminated from block partitioning method candidates by encoder 100.

When the shape of the current block is a rectangle, encoder 100 may eliminate, from the first candidates for a block partitioning method, a candidate corresponding to a partitioning method of performing ternary splitting on a vertically elongated block such that the shorter sides of the block are made shorter or a candidate corresponding to a partitioning method of performing ternary splitting on a horizontally elongated block such that the shorter sides of the block are made shorter.

For example, encoder 100 prohibits ternary splitting 310 of splitting a horizontally elongated rectangle such that sides along a vertical direction are made shorter. On the contrary, encoder 100 does not prohibit ternary splitting 311 of splitting a horizontally elongated rectangle such that sides along a horizontal direction are made shorter.

In other words, encoder 100 eliminates ternary splitting 310, but does not eliminate ternary splitting 311 from the first candidates.

For example, encoder 100 neither prohibits binary splitting 312 of splitting a horizontally elongated rectangle such that sides along a vertical direction are made shorter nor binary splitting 313 of splitting a horizontally elongated rectangle such that sides along a horizontal direction are made shorter.

In other words, encoder 100 eliminates neither binary splitting 312 nor binary splitting 313 from the first candidates.

Concrete Example 3 of Encoding Process According to First Aspect

Figure 19:
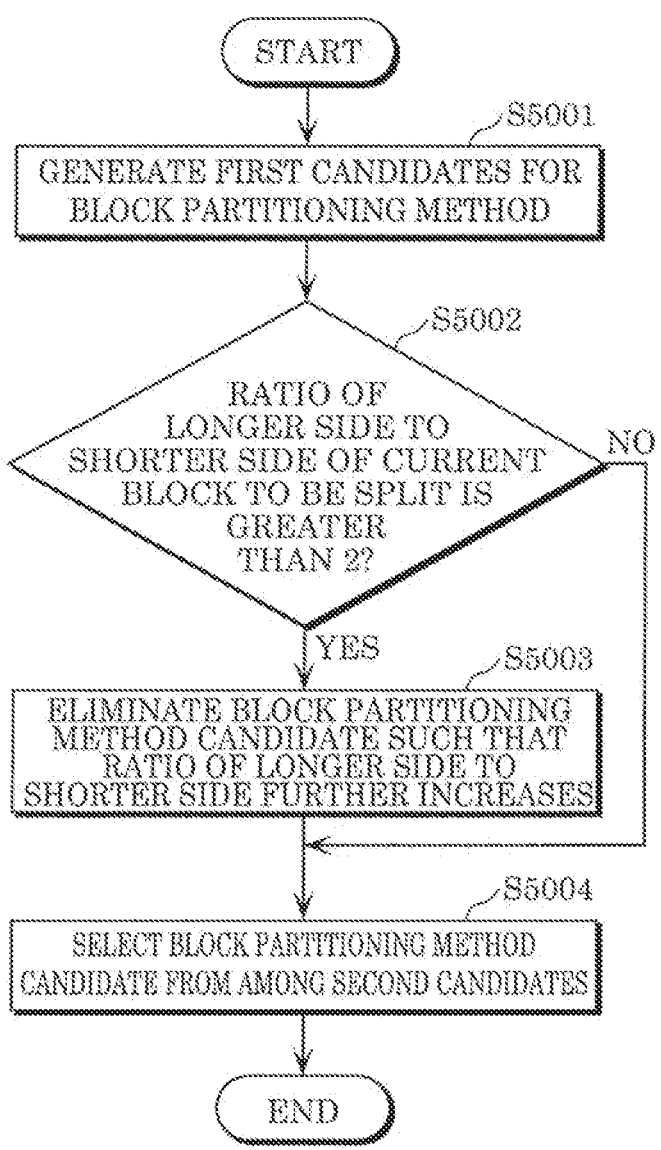
FIG. 19 is a flowchart illustrating a process of selecting a block partitioning method candidate, which is performed by a block splitter in an encoder according to concrete example 3 of the first aspect.

FIG. 19 is a flowchart illustrating a process of selecting a block partitioning method candidate, which is performed by a block splitter in an encoder according to concrete example 3 of the first aspect.

First, encoder 100 generates first candidates for a block partitioning method (S5001). A block partitioning method is a method for splitter 102 in encoder 100 to split a current block. A current block to be split is an image block to be split by splitter 102 when encoder 100 performs encoding. The first candidates may include, for example, a method of performing binary splitting in a vertical direction, a method of performing binary splitting in a horizontal direction, a method of performing ternary splitting in a vertical direction, a method of performing quad splitting, and a method in which no splitting is performed. Note that the block partitioning methods included in the first candidates are not limited to those listed above.

Next, encoder 100 determines whether a value indicating a ratio of the longer side to the shorter side of a current block to be split is greater than 2 (S5002).

When the value is greater than 2 (Yes in S5002), encoder 100 eliminates, from the first candidates, a candidate corresponding to a partitioning method such that a value indicating a ratio of the longer side to the shorter side of a block generated through the splitting of the current block is greater than a value indicating a ratio of the longer side to the shorter side of the current block (S5003).

By thus eliminating the block partitioning method, encoder 100 may generate second candidates including one or more block partitioning method candidates.

The following describes the case where binary or ternary splitting which is splitting that involves a direction related to block partitioning is performed when the ratio of the longer side to the shorter side of the current block is greater than 2, for example. In this case, a candidate corresponding to a partitioning method of splitting a horizontally elongated rectangle such that sides along a vertical direction are made shorter and a candidate corresponding to a partitioning method of splitting a vertically elongated rectangle such that sides along a horizontal direction are made shorter may be eliminated from the first candidates.

When the value indicating the ratio of the longer side to the shorter side of the current block is smaller than or equal to 2 (No in S5002), no block partitioning method candidate is eliminated from the first candidates including a plurality of block partitioning method candidates. Here, candidates generated by encoder 100 without eliminating any block partitioning method candidate from the first candidates may be defined as second candidates.

Next, encoder 100 selects a block partitioning method candidate from the second candidates for a block partitioning method (S5004). Here, encoder 100 may select one block partitioning method candidate from among the second candidates. An R-D optimization, for instance, may be used as a method for selecting a block partitioning method. The R-D optimization is assumed to be a method in which encoder 100 tries out all of a plurality of block partitioning method candidates, evaluates the cost of each candidate, and selects a block partitioning method candidate that gained the highest score in the cost evaluation.

Encoder 100 then splits the current block according to the block partitioning method selected in step S5004.

Although it is described that encoder 100 determines, at step S5002, whether the value indicating a ratio of the longer side to the shorter side of the current block is greater than 2, a value used for the determination by the encoder is not limited to 2. For example, encoder 100 may determine whether the value indicating the ratio of the longer side to the shorter side of the current block is greater than 4. Moreover, the value indicating the ratio of the longer side to the shorter side of the current block, which is used by encoder 100 for the determination at step S5002, may be any natural number.

FIG. 20 is a chart illustrating block partitioning methods and a limiting condition when splitting is performed, according to concrete example 3 of the first aspect.

When the shape of a current block to be split is a square, the current block is splittable in both vertical and horizontal directions. None of ternary splitting 306, ternary splitting 307, binary splitting 308, and binary splitting 309 is prohibited by encoder 100.

In other words, encoder 100 does not eliminate, from the first candidates, block partitioning method candidates corresponding to ternary splitting 306, ternary splitting 307, binary splitting 308, and binary splitting 309.

When the value indicating the ratio of the longer side to the shorter side of the current block is smaller than or equal to 2, neither a block partitioning method in a vertical direction nor a block partitioning method in a horizontal direction is prohibited. For example, any of the following is not prohibited: ternary splitting 314 of splitting a horizontally elongated rectangle such that sides along a vertical direction are made shorter; ternary splitting 315 of splitting a horizontally elongated rectangle such that sides along horizontal direction are made shorter; binary splitting 316 of splitting a horizontally elongated rectangle such that sides along a vertical direction are made shorter; and binary splitting 317 of splitting a horizontally elongated rectangle such that sides along a horizontal direction are made shorter.

In other words, encoder 100 does not eliminate, from the first candidates, block partitioning method candidates corresponding to ternary splitting 314, ternary splitting 315, binary splitting 316, and binary splitting 317.

When the value indicating the ratio of the longer side to the shorter side of the current block is greater than 2, a partitioning method of splitting a horizontally elongated rectangle such that sides along a vertical direction are made shorter is prohibited. A partitioning method of splitting a vertically elongated rectangle such that sides along a horizontal direction are made shorter is also prohibited. For example, ternary splitting 318 of splitting a horizontally elongated rectangle such that sides along a vertical direction are made shorter is prohibited, whereas ternary splitting 319 of splitting a horizontally elongated rectangle such that sides along a horizontal direction are made shorter is not prohibited. Binary splitting 320 of splitting a horizontally elongated rectangle such that sides along a vertical direction are made shorter is prohibited, whereas binary splitting 321 of splitting a horizontally elongated rectangle such that sides along a horizontal direction are made shorter is not prohibited.

In other words, encoder 100 eliminates, from the first candidates, block partitioning method candidates corresponding to ternary splitting 318 and binary splitting 320. Moreover, encoder 100 does not eliminate, from the first candidates, block partitioning method candidates corresponding to ternary splitting 319 and binary splitting 321.

Concrete Example 4 of Encoding Process According to First Aspect

Figure 21:
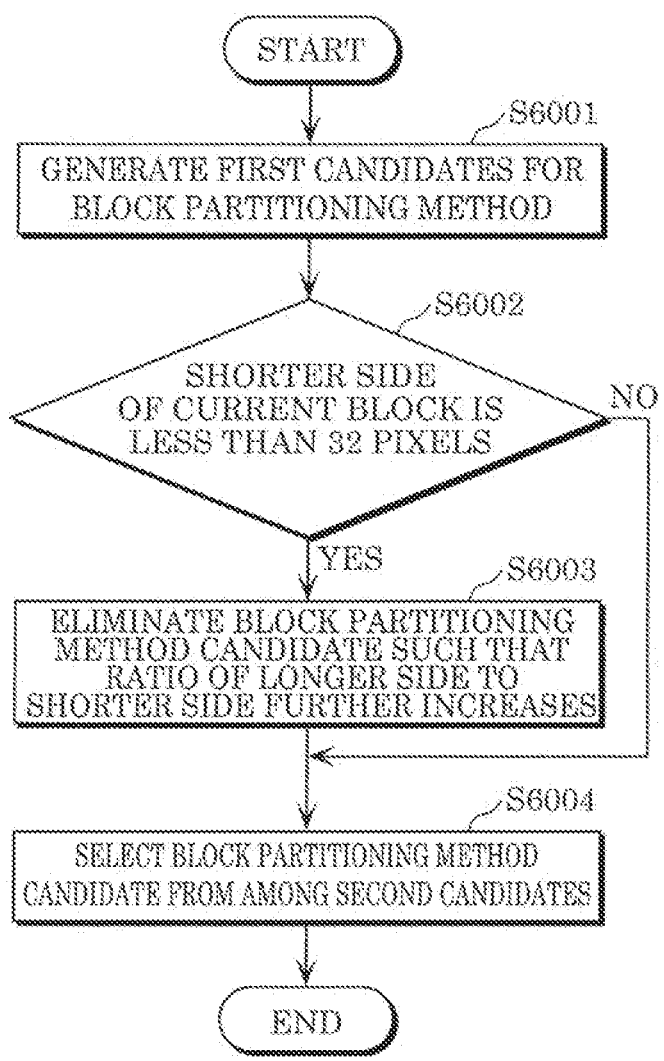
FIG. 21 is a flowchart illustrating a process of selecting a block partitioning method candidate, which is performed by a block splitter in an encoder according to concrete example 4 of the first aspect.

FIG. 21 is a flowchart illustrating a process of selecting a block partitioning method candidate, which is performed by a block splitter in an encoder according to concrete example 4 of the first aspect.

First, encoder 100 generates first candidates for a block partitioning method (S6001). A block partitioning method is a method for splitter 102 in encoder 100 to split a current block. A current block to be split is an image block to be split by splitter 102 when encoder 100 performs encoding. The first candidates may include, for example, a method of performing binary splitting in a vertical direction, a method of performing binary splitting in a horizontal direction, a method of performing ternary splitting in a vertical direction, a method of performing quad splitting, and a method in which no splitting is performed. Note that the block partitioning methods included in the first candidates are not limited to those listed above.

Next, encoder 100 determines whether the shape of a current block to be split is a rectangle and the length of the shorter side of the current block is less than 32 pixels (S6002).

When the shape of the current block is a rectangle and the length of the shorter side of the current block is less than 32 pixels (Yes in S6002), encoder 100 eliminates, from the first candidates, a block partitioning method candidate such that a value indicating a ratio of the longer side to the shorter side of a block generated through the splitting of the current block is greater than a value indicating a ratio of the longer side to the shorter side of the current block (S6003).

By thus eliminating the block partitioning method, encoder 100 may generate second candidates including one or more block partitioning method candidates.

In the case where the shape of a current block to be split is not a square and the length of the shorter side is less than 32 pixels when binary splitting or ternary splitting that involves a direction related to block partitioning is performed, for example, a candidate corresponding to a partitioning method of splitting a horizontally elongated rectangle such that sides along a vertical direction are made shorter and a candidate corresponding to a partitioning method of splitting a vertically elongated rectangle such that sides along a horizontal direction are made shorter are eliminated from the first candidates.

When the shape of the current block is not a rectangle or the length of the shorter side of the current block is greater than or equal to 32 pixels (No in S6002), no block partitioning method candidate is eliminated from the first candidates including a plurality of block partitioning method candidates. Here, candidates generated by encoder 100 without eliminating any block partitioning method candidate from the first candidates may be defined as second candidates.

Next, encoder 100 selects a block partitioning method candidate from the second candidates for a block partitioning method (S6004). Here, encoder 100 may select one block partitioning method candidate from among the second candidates. An R-D optimization, for instance, may be used as a method for selecting a block partitioning method. The R-D optimization is assumed to be a method in which encoder 100 tries out all of a plurality of block partitioning method candidates, evaluates the cost of each candidate, and selects a block partitioning method candidate that gained the highest score in the cost evaluation.

Encoder 100 then splits the current block according to the block partitioning method selected in step S6004.

Although encoder 100 determines, at step S6002, whether the length of the shorter side of the current block is less than 32 pixels, but the length to be used for the determination is not limited to 32 pixels. For example, encoder 100 may determine whether the shorter side of the current block is less than 64 pixels. The length of the shorter side to be used for the determination may be determined according to a picture size. A numerical value indicating the length of the shorter side to be used by encoder 100 in the determination at step S6002 may be any natural number.

FIG. 22 is a chart illustrating block partitioning methods and a limiting condition when splitting is performed, according to concrete example 4 of the first aspect. When the shape of the current block is a square, the current block is splittable in both vertical and horizontal directions. None of ternary splitting 306, ternary splitting 307, binary splitting 308, and binary splitting 309 is prohibited by encoder 100.

In other words, encoder 100 does not eliminate, from the first candidates, block partitioning method candidates corresponding to ternary splitting 306, ternary splitting 307, binary splitting 308, and binary splitting 309.

When the shape of the current block is not a square and the length of the shorter side of the current block is greater than or equal to 32 pixels, neither a block partitioning method in a vertical direction nor a block partitioning method in a horizontal direction is prohibited. For example, any of the following is not prohibited: ternary splitting 322 of splitting a horizontally elongated rectangle such that sides along a vertical direction are made shorter; ternary splitting 323 of splitting a horizontally elongated rectangle such that sides along horizontal direction are made shorter; binary splitting 325 of splitting a horizontally elongated rectangle such that sides along a horizontal direction are made shorter; binary splitting 326 of splitting a horizontally elongated rectangle such that sides along a horizontal direction are made shorter; and binary splitting 327 of splitting a vertically elongated rectangle such that sides along a horizontal direction are made shorter.

In other words, encoder 100 does not eliminate, from the first candidates, block partitioning method candidates corresponding to ternary splitting 322, ternary splitting 323, binary splitting 324, binary splitting 325, binary splitting 326, and binary splitting 327.

When the shape of the current block is not a square and the length of the shorter side is less than 32 pixels, a partitioning method of splitting a horizontally elongated rectangle such that sides along a vertical direction are made shorter is prohibited. A partitioning method of splitting a vertically elongated rectangle such that sides along a horizontal direction are made shorter is also prohibited. For example, ternary splitting 328 of splitting a horizontally elongated rectangle such that sides along a vertical direction are made shorter is prohibited, whereas ternary splitting 329 of splitting a horizontally elongated rectangle such that sides along a vertical direction are made shorter is not prohibited. Binary splitting 330 of splitting a horizontally elongated rectangle such that sides along a vertical direction are made shorter is prohibited, whereas binary splitting 331 of splitting a horizontally elongated rectangle such that sides along a horizontal direction are made shorter is not prohibited.

In other words, encoder 100 eliminates, from the first candidates, block partitioning method candidates corresponding to ternary splitting 328 and binary splitting 330. Moreover, encoder 100 does not eliminate, from the first candidates, block partitioning method candidates corresponding to ternary splitting 329 and binary splitting 331.

Concrete Example 5 of Encoding Process
According to First Aspect

Figure 23:
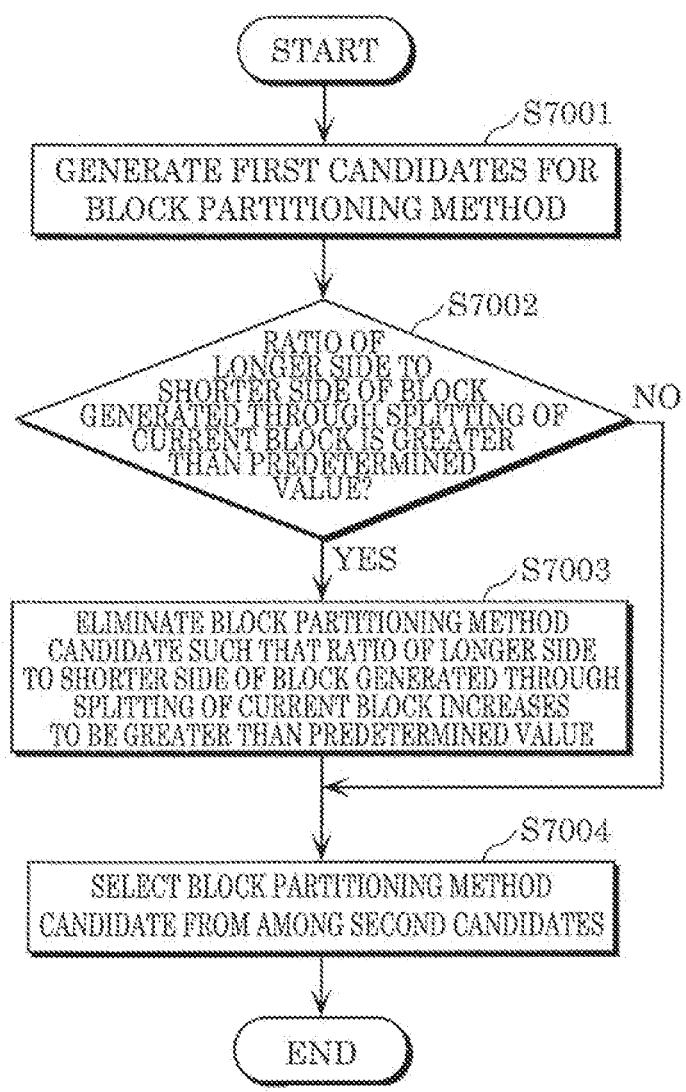
FIG. 23 is a flowchart illustrating a process of selecting a block partitioning method candidate, which is performed by a block splitter in an encoder according to concrete example 5 of the first aspect.

FIG. 23 is a flowchart illustrating a process of selecting a block partitioning method candidate, which is performed by a block splitter in an encoder according to concrete example 5 of the first aspect.

First, encoder 100 generates first candidates for a block partitioning method (S7001). A block partitioning method is a method for splitter 102 in encoder 100 to split a current block. A current block to be split is an image block to be split by splitter 102 when encoder 100 performs encoding. The first candidates may include, for example, a method of performing binary splitting in a vertical direction, a method of performing binary splitting in a horizontal direction, a method of performing ternary splitting in a vertical direction, a method of performing quad splitting, and a method in which no splitting is performed. Note that the block partitioning methods included in the first candidates are not limited to those listed above.

Next, encoder 100 determines whether a value indicating a ratio of the longer side to the shorter side of a block generated through the splitting of a current block is greater than a third value (S7002). The third value may be, for example, 4 or 8. The third value may be any natural number.

When the value is greater than the third value (Yes in S7002), encoder 100 eliminates, from the first candidates, a candidate corresponding to a block partitioning method such that the value indicating the ratio of the longer side to the shorter side of the block generated through the splitting of the current block increases to be greater than the third value (S7003).

By thus eliminating the block partitioning method, encoder 100 may generate second candidates including one or more block partitioning method candidates.

When the value is smaller than or equal to the third value (No in S7002), no block partitioning method candidate is eliminated from the first candidates including a plurality of block partitioning method candidates. Here, candidates generated by encoder 100 without eliminating any block partitioning method candidate from the first candidates may be defined as second candidates.

Next, encoder 100 selects a block partitioning method candidate from the second candidates for a block partitioning method (S7004). Here, encoder 100 may select one block partitioning method candidate from among the second candidates. An R-D optimization, for instance, may be used as a method for selecting a block partitioning method. The R-D optimization is assumed to be a method in which encoder 100 tries out all of a plurality of block partitioning method candidates, evaluates the cost of each candidate, and selects a block partitioning method candidate that gained the highest score in the cost evaluation.

Encoder 100 then splits the current block according to the block partitioning method selected in step S7004.

FIG. 24 is a flowchart illustrating a process of selecting a block partitioning method candidate, which is performed by a block splitter in an encoder according to concrete example 5 of the first aspect. When a value indicating a ratio of the longer side to the shorter side of a current block to be split is smaller than 2, the current block is splittable in both vertical and horizontal directions. None of binary splitting 332 of splitting a current block into two in a horizontal direction, binary splitting 333 of splitting a current block into two in a vertical direction, ternary splitting 334 of splitting a current block into three in a horizontal direction, and ternary splitting 335 of splitting a current block into three in a vertical direction is prohibited by encoder 100.

In other words, encoder 100 does not eliminate, from the first candidates, block partitioning method candidates corresponding to binary splitting 332, binary splitting 333, ternary splitting 334, and ternary splitting 335.

When the value indicating the ratio of the longer side to the shorter side of the current block is greater than or equal to 2 and smaller than 4, binary splitting 336 of splitting a horizontally elongated rectangle such that sides along a horizontal direction are made shorter, ternary splitting 337 of splitting a horizontally elongated rectangle such that sides along a horizontal direction are made shorter, and binary splitting 338 of splitting a horizontally elongated rectangle such that sides along a vertical direction are made shorter are not prohibited. On the contrary, ternary splitting 339 of splitting a horizontally elongated rectangle such that sides along a vertical direction are made shorter is prohibited. In ternary splitting 339, the ratio of the shorter side to be split may be 1:2:1.

In other words, encoder 100 does not eliminate, from the first candidates, block partitioning method candidates corresponding to binary splitting 36, ternary splitting 37, and binary splitting 38. In contrast, encoder 100 eliminates, from the first candidates, a block partitioning method candidate corresponding to ternary splitting 339.

When the value indicating the ratio of the longer side to the shorter side of the current block is greater than or equal to 4, binary splitting 340 of splitting a horizontally elongated rectangle such that sides along a horizontal direction are made shorter, ternary splitting 341 of splitting a horizontally elongated rectangle such that sides along a horizontal direction are made shorter are not prohibited by encoder 100. In contrast, binary splitting 342 of splitting a horizontally elongated rectangle such that sides along a vertical direction are made shorter and ternary splitting 343 of splitting a horizontally elongated rectangle such that sides along a vertical direction are made shorter are prohibited by encoder 100.

In other words, encoder 100 does not eliminate, from the first candidates, block partitioning method candidates corresponding to binary splitting 340 and ternary splitting 341. In contrast, encoder 100 eliminates, from the first candidates, block partitioning method candidates corresponding to ternary splitting 342 and ternary splitting 343.

Advantageous Effects of First Aspect

With the configuration according to the first aspect, it is predicted that an extremely elongated block is hardly generated in the splitting of a current block by splitter 102 in encoder 100. Accordingly, it is possible to reduce the number of block partitioning methods to be selected in the present processing by prohibiting in advance a block partitioning method that generates a shape that is most unlikely to be generated. This reduces the number of block partitioning methods targeted for calculation when encoder 100 determines a coding mode using optimization such as an R-D optimization, for instance. Encoder 100 therefore is capable of reducing the amount of processing necessary for encoding while inhibiting the degradation of coding efficiency.

Moreover, with the encoder intentionally biasing the generation frequency of each piece of information on a direction related to block partitioning, accuracy in probability estimation in arithmetic coding using a context increases. The arithmetic coding using a context is, for example, CABAC. Accordingly, by performing the processes described in the present disclosure, coding performance may be improved.

Note that the encoder, decoder, the encoding method, and the decoding method according to the present disclosure do not always need to include all of the elements described in the first aspect, and may include only one or more of the elements. Moreover, each of the determination conditions according to the first aspect may be the same as the corresponding one of those described in the concrete examples illustrated in the first aspect, or may be any combination of those described in the concrete examples illustrated in the first aspect. Each of the numerical values used for determination conditions in the first aspect may be modified.

With encoder 100 inhibiting the appearance of an extremely elongated block, subjective image quality may be improved.

It should be noted that the term "elongated" used herein may mean that a ratio of the longer side to the shorter side or a difference between the longer side and the shorter side of a block is greater than or equal to a predetermined value. The predetermined value may be, for example, 2, 4 or 8. The phrase "a current block is split into shapes each being more elongated than before the splitting" may mean that a ratio of the longer side to the shorter side or a difference between the longer side and the shorter side of a block generated through the splitting increases due to the splitting of the current block. The block according to the present disclosure is not limited to a rectangular block.

Internal Configuration of Block Splitter in Encoder According to Second Aspect

Figure 25:
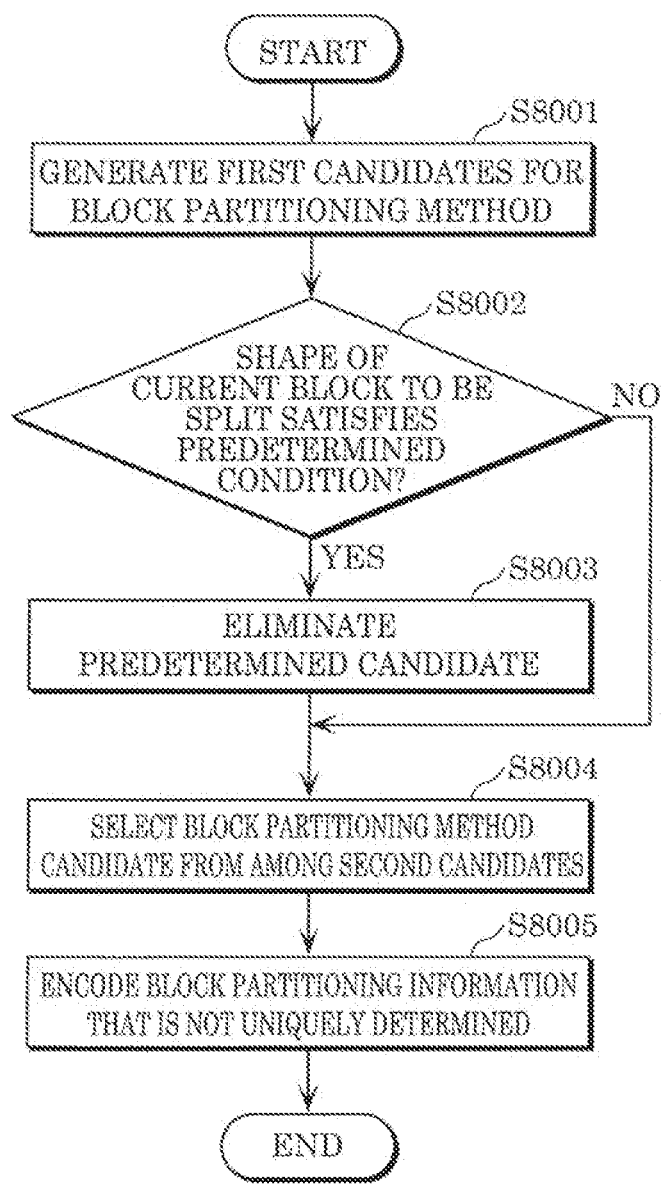
FIG. 25 is a flowchart illustrating a process of selecting a block partitioning method candidate, which is performed by a block splitter in an encoder according to a second aspect.

FIG. 25 is a flowchart illustrating a process of selecting a block partitioning method candidate, which is performed by a block splitter in an encoder according to a second aspect.

First, encoder 100 generates first candidates for a block partitioning method (S8001). A block partitioning method is a method for splitter 102 in encoder 100 to split a current block. A current block to be split is an image block to be split by splitter 102 when encoder 100 performs encoding. The first candidates may include, for example, a method of performing binary splitting in a vertical direction, a method of performing binary splitting in a horizontal direction, a method of performing ternary splitting in a vertical direction, a method of performing quad splitting, and a method in which no splitting is performed. Note that the block partitioning methods included in the first candidates are not limited to those listed above.

Next, encoder 100 determines whether the shape of a current block to be split satisfies a predetermined condition (S8002).

When the shape of the current block satisfies the predetermined condition (Yes in S8002), encoder 100 eliminates a predetermined block partitioning method candidate from the first candidates (S8003).

By thus eliminating the block partitioning method, encoder 100 may generate second candidates including one or more block partitioning method candidates.

When the shape of the current block does not satisfy the predetermined condition (No in S8002), no block partitioning method candidate is eliminated from the first candidates including a plurality of block partitioning method candidates. Here, the candidates generated by encoder 100 without eliminating any block partitioning method candidate from the first candidates may be defined as second candidates.

Next, encoder 100 selects a block partitioning method candidate from among the second candidates for a block partitioning method (S8004). Here, encoder 100 may select one block partitioning method candidate from among the second candidates. An R-D optimization, for instance, may be used as a method for selecting a block partitioning method. The R-D optimization is assumed to be a method in which encoder 100 tries out all of a plurality of block partitioning method candidates, evaluates the cost of each candidate, and selects a block partitioning method candidate that gained the highest score in the cost evaluation.

Encoder 100 then splits the current block according to the block partitioning method selected in step S8004.

Next, encoder 100 encodes block partitioning information that is not uniquely determined (S8005). The encoding performed by encoder 100 includes an encoding process and writing of encoded information into a bitstream.

The process in step S8005 may be performed when block partitioning information is not uniquely determined based on the shape of a current block to be split, and prohibited in other cases. For example, when nothing but splitting a rectangular current block such that a value indicating a ratio of the longer side to the shorter side of a block generated through the splitting decreases is performed, the process in step S8005 does not need to be performed. Block partitioning information may include either or both of a direction related to block partitioning and the number of partitions according to a block partitioning method.

Note that in the process performed in step S8003, the elimination of a block partitioning method candidate may be carried out without depending on a block partitioning method of a current block to be split and the number of partitions according to the block partitioning method. For example, a block partitioning method candidate to be eliminated from the first candidates may be determined according to the type of a picture such as I-picture, P-picture, and B-picture, or the type of a prediction mode such as intra prediction mode and inter prediction mode. Alternatively, a block partitioning method candidate to be eliminated from the first candidates may be determined using one of the following: a block partitioning method of a current block to be split; and the number of partitions according to the block partitioning method.

The process illustrated in FIG. 25 may be applied to the block partitioning of a prediction unit (PU) or a transform unit (TU).

Encoder 100 may write a condition used for the determination in step S8002 into the syntax such as a sequence layer, a picture layer, or a slice layer. Moreover, encoder 100 may write the condition into a sequence parameter set (SPS).

Concrete Example 1 of Encoding Process According to Second Aspect

Figure 26:
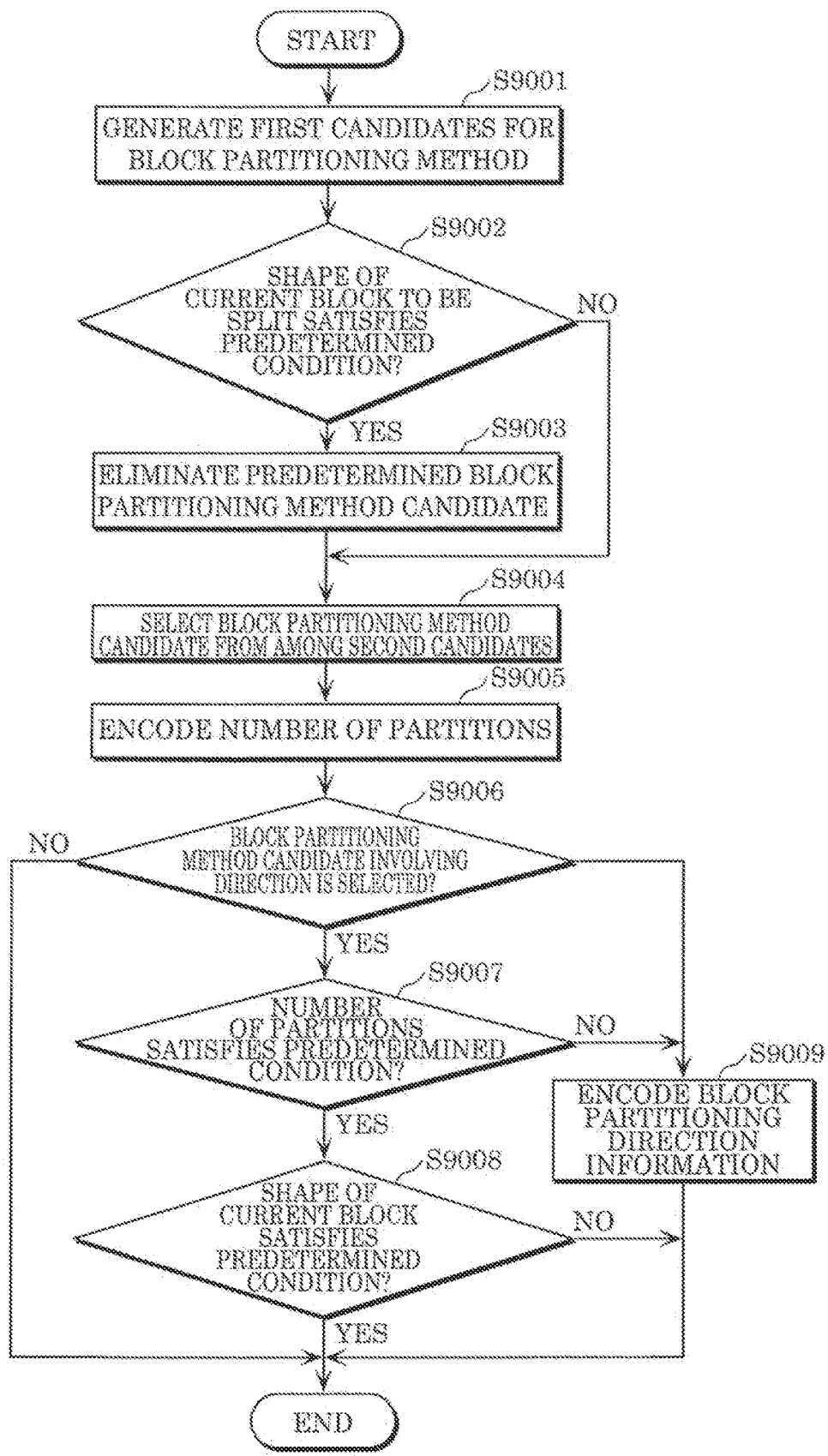
FIG. 26 is a flowchart illustrating a process of selecting a block partitioning method candidate, which is performed by a block splitter in an encoder according to concrete example 1 of the second aspect.

FIG. 26 is a flowchart illustrating a process of selecting a block partitioning method candidate, which is performed by a block splitter in an encoder according to concrete example 1 of the second aspect.

First, encoder 100 generates first candidates for a block partitioning method (S9001). A block partitioning method is a method for splitter 102 in encoder 100 to split a current block. A current block to be split is an image block to be split by splitter 102 when encoder 100 performs encoding. The first candidates may include, for example, a method of performing binary splitting in a vertical direction, a method of performing binary splitting in a horizontal direction, a method of performing ternary splitting in a vertical direction, a method of performing quad splitting, and a method in which no splitting is performed. Note that the block partitioning methods included in the first candidates are not limited to those listed above.

Next, encoder 100 determines whether the shape of a current block to be split satisfies a predetermined condition (S9002).

When the shape of the current block satisfies the predetermined condition (Yes in S9002), encoder 100 eliminates a predetermined block partitioning method candidate from the first candidates (S9003).

By thus eliminating the block partitioning method, encoder 100 may generate second candidates including one or more block partitioning method candidates.

When the shape of the current block does not satisfy the predetermined condition (No in S9002), no block partitioning method candidate is eliminated from the first candidates including a plurality of block partitioning method candidates. Here, candidates generated by encoder 100 without eliminating any block partitioning method candidate from the first candidates may be defined as second candidates.

Next, encoder 100 selects a block partitioning method candidate from among the second candidates for a block partitioning method (S9004). Here, encoder 100 may select one block partitioning method candidate from among the second candidates. An R-D optimization, for instance, may be used as a method for selecting a block partitioning method. The R-D optimization is assumed to be a method in which encoder 100 tries out all of a plurality of block partitioning method candidates, evaluates the cost of each candidate, and selects a block partitioning method candidate that gained the highest score in the cost evaluation.

Encoder 100 then splits the current block according to the block partitioning method selected in step S9004.

Next, encoder 100 encodes the number of partitions (S9005). The encoding performed by encoder 100 includes an encoding process and writing of encoded information into a bitstream.

Subsequently, encoder 100 determines whether the selected block partitioning method candidate is a block partitioning method candidate involving a direction related to block partitioning (S9006). The block partitioning method involving a direction related to block partitioning may be, for example, binary splitting or ternary splitting.

When the selected block partitioning method candidate is not a block partitioning method candidate involving a direction related to block partitioning (No in S9006), encoder 100 ends the process.

When the selected block partitioning method candidate is a block partitioning method candidate involving a direction related to block partitioning (Yes in S9006), encoder 100 determines whether the number of partitions according to the block partitioning method satisfies a predetermined condition (S9007). The predetermined condition may be, for example, that the number of partitions according to the block partitioning method is equal to the number of partitions obtained by a candidate that has been eliminated from the block partitioning method candidates.

When the number of partitions does not satisfy the predetermined condition (No in S9007), encoder 100 performs a process in step S9009. The process in step S9009 will be described later.

When the number of partitions satisfies the predetermined condition (Yes in S9007), encoder 100 determines whether the shape of the current block satisfies a predetermined condition (S9008). Here, the predetermined condition may be the same as the condition used in step S9003 for determining whether a block partitioning method candidate is to be eliminated.

When the shape of the current block does not satisfy the predetermined condition (No in S9008), encoder 100 encodes block-partitioning-related direction information which is information on a direction related to block partitioning (S9009). The encoding here may include an encoding process and writing of encoded information into a bitstream. After the encoding, encoder 100 ends the operation.

When the shape of the current block satisfies the predetermined condition (Yes in S9008), encoder 100 ends the process without encoding the block-partitioning-related direction information.

Note that the concrete examples of a determination condition related to the shape of a current block to be split and a block partitioning method candidate to be eliminated may be the same as those illustrated in the first aspect. The order of the processes performed by encoder 100 according to the present aspect may be reversed. In other words, encoder 100 may change the order of processes according to the shape of a syntax tree presenting an order of processes. When syntax presenting a direction related to block partitioning is located upper than syntax regarding the number of partitions according to a block partitioning method, for example, the order of step S9006 and step S9007 may be reversed.

Figure 27:
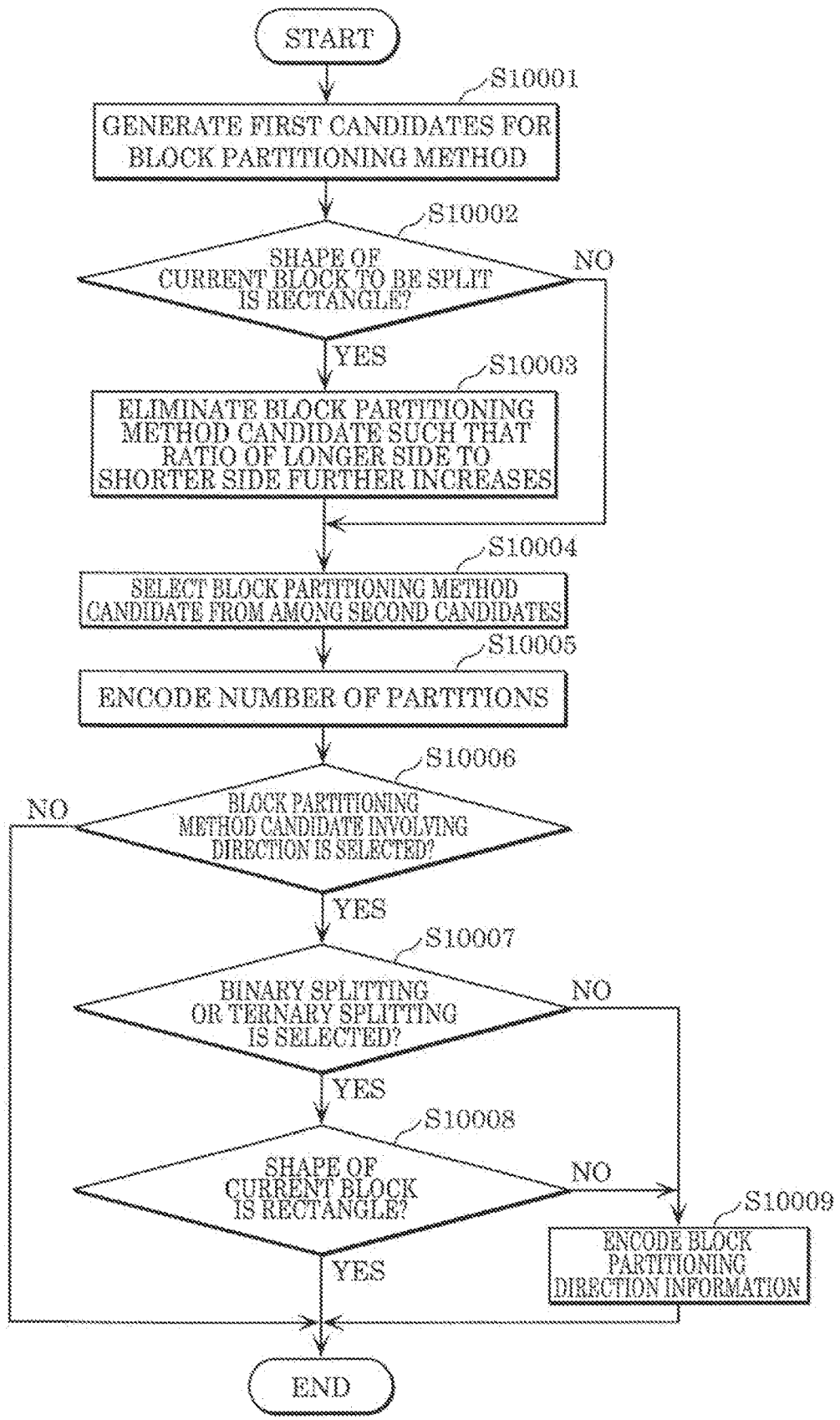
FIG. 27 is a flowchart illustrating a process of selecting a block partitioning method candidate, which is performed by a block splitter in an encoder according to concrete example 2 of the second aspect.

FIG. 27 is a flowchart illustrating a process of selecting a block partitioning method candidate, which is performed by a block splitter in an encoder according to concrete example 2 of the second aspect.

First, encoder 100 generates first candidates for a block partitioning method (S10001). A block partitioning method is a method for splitter 102 in encoder 100 to split a current block. A current block to be split is an image block to be split by splitter 102 when encoder 100 performs encoding. The first candidates may include, for example, a method of performing binary splitting in a vertical direction, a method of performing binary splitting in a horizontal direction, a method of performing ternary splitting in a vertical direction, a method of performing quad splitting, and a method in which no splitting is performed. Note that the block partitioning methods included in the first candidates are not limited to those listed above.

Next, encoder 100 determines whether the shape of a current block to be split is a rectangle (S10002).

When the shape of the current block is a rectangle (Yes in S10002), encoder 100 eliminates, from the first candidates, a block partitioning method candidate such that a value indicating a ratio of the longer side to the shorter side of a block generated through the splitting of the current block further increases to be greater than a value indicating a ratio of the longer side to the shorter side of the current block (S10003).

By thus eliminating the block partitioning method, encoder 100 may generate second candidates including one or more block partitioning method candidates.

When the shape of the current block is not a rectangle (No in S10002), no block partitioning method candidate is eliminated from the first candidates including a plurality of block partitioning method candidates. Here, candidates generated by encoder 100 without eliminating any block partitioning method candidate from the first candidates may be defined as second candidates.

Next, encoder 100 selects a block partitioning method candidate from among the second candidates for a block partitioning method (S10004). Here, encoder 100 may select one block partitioning method candidate from among the second candidates. An R-D optimization, for instance, may be used as a method for selecting a block partitioning method. The R-D optimization is assumed to be a method in which encoder 100 tries out all of a plurality of block partitioning method candidates, evaluates the cost of each candidate, and selects a block partitioning method candidate that gained the highest score in the cost evaluation.

Encoder 100 then splits the current block according to the block partitioning method selected in step S10004.

Next, encoder 100 encodes the number of partitions (S10005). The encoding performed by encoder 100 includes an encoding process and writing of encoded information into a bitstream.

Subsequently, encoder 100 determines whether the selected block partitioning method candidate is a block partitioning method candidate involving a direction related to block partitioning (S10006). The block partitioning method involving a direction related to block partitioning may be, for example, binary splitting or ternary splitting.

When the selected block partitioning method candidate is not a block partitioning method candidate involving a direction related to block partitioning (No in S10006), encoder 100 ends the process.

When the selected block partitioning method candidate is a block partitioning method candidate involving a direction related to block partitioning (Yes in S10006), encoder 100 determines whether the block partitioning method is binary splitting or ternary splitting (S10007).

When the block partitioning method is neither binary splitting nor ternary splitting (No in step S10007), encoder 100 performs a process in step S10009. The process in step S10009 will be described later.

When the block partitioning method is binary splitting or ternary splitting (Yes in S10007), encoder 100 determines whether the shape of the current block is a rectangle (S10008).

When the shape of the current block is not a rectangle (No in S10008), encoder 100 encodes block-partitioning-related direction information which is information on a direction related to block partitioning (S10009). The encoding here may include an encoding process and writing of encoded information into a bitstream. For example, binary splitting 305 of splitting a current block into two in a vertical direction is selected from the second candidates. When the shape of the current block is horizontally elongated, encoder 100 presents S=0, QT=0, and TT=0 in a syntax tree such that illustrated in FIG. 3 and writes syntax into a bitstream without using Ver. For example, binary splitting 302 of splitting a current block into three in a horizontal direction is selected from the second candidates. When the shape of the current block is vertically elongated, encoder 100 presents S=0, QT=0, and TT=1 in a syntax tree such that illustrated in FIG. 3 and writes syntax into a bitstream without using Ver.

When the shape of the current block is a rectangle (Yes in S10008), encoder 100 ends the process without encoding the block-partitioning-related direction information.

Figure 28:
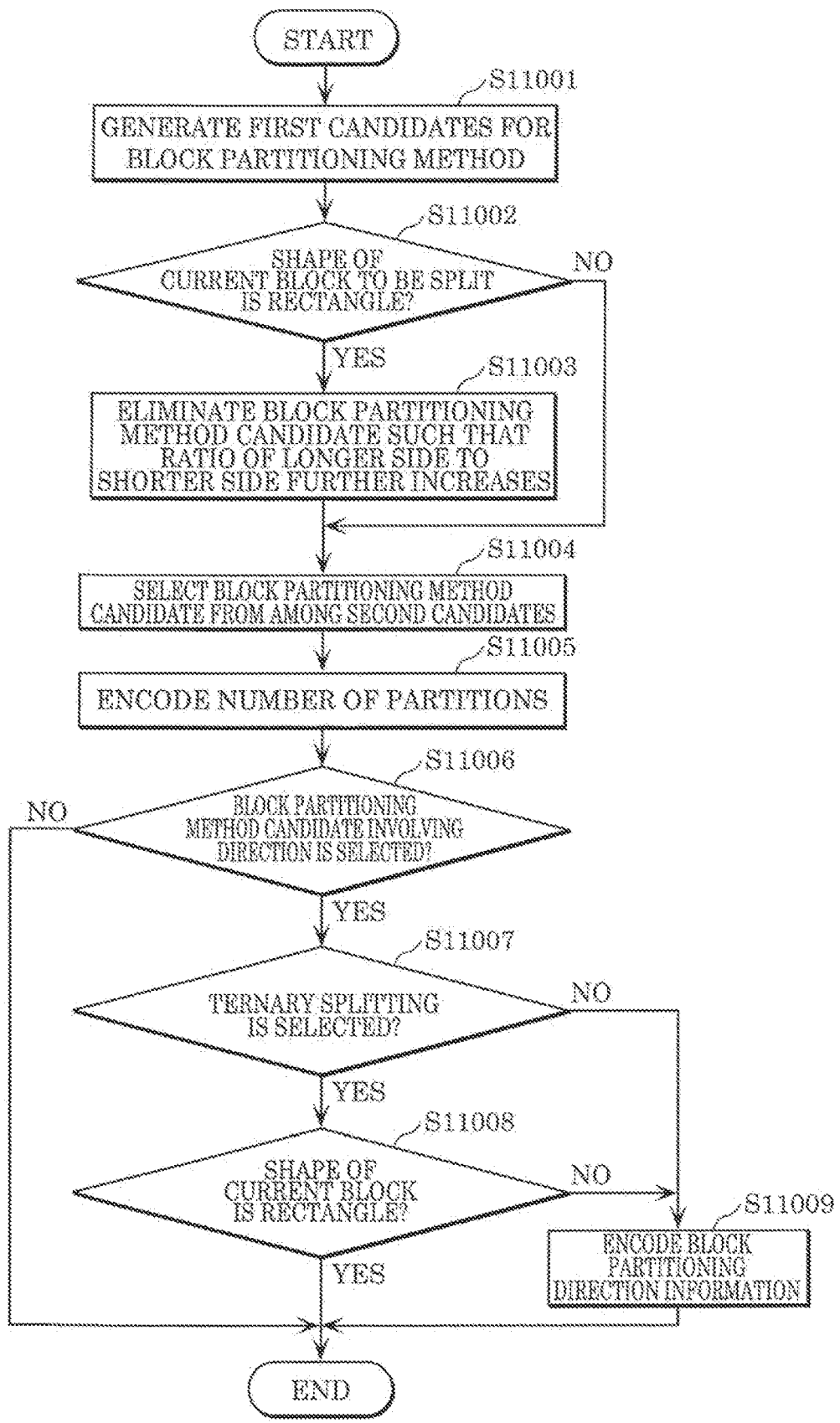
FIG. 28 is a flowchart illustrating a process of selecting a block partitioning method candidate, which is performed by a block splitter in an encoder according to concrete example 3 of the second aspect.

FIG. 28 is a flowchart illustrating a process of selecting a block partitioning method candidate, which is performed by a block splitter in an encoder according to concrete example 3 of the second aspect.

First, encoder 100 generates first candidates for a block partitioning method (S11001). A block partitioning method is a method for splitter 102 in encoder 100 to split a current block. A current block to be split is an image block to be split by splitter 102 when encoder 100 performs encoding. The first candidates may include, for example, a method of performing binary splitting in a vertical direction, a method of performing binary splitting in a horizontal direction, a method of performing ternary splitting in a vertical direction, a method of performing quad splitting, and a method in which no splitting is performed. Note that the block partitioning methods included in the first candidates are not limited to those listed above.

Next, encoder 100 determines whether the shape of a current block to be split is a rectangle (S11002).

When the shape of the current block is a rectangle (Yes in S11002), encoder 100 eliminates, from the first candidates, a block partitioning method candidate such that a value indicating a ratio of the longer side to the shorter side of a block generated through the splitting of the current block further increases to be greater than a value indicating a ratio of the longer side to the shorter side of the current block (S11003).

By thus eliminating the block partitioning method, encoder 100 may generate second candidates including one or more block partitioning method candidates.

When the shape of the current block is not a rectangle (No in S11002), no block partitioning method candidate is eliminated from the first candidates including a plurality of block partitioning method candidates. Here, candidates generated by encoder 100 without eliminating any block partitioning method candidate from the first candidates may be defined as second candidates.

Next, encoder 100 selects a block partitioning method candidate from among the second candidates for a block partitioning method (S11004). Here, encoder 100 may select one block partitioning method candidate from among the second candidates. An R-D optimization, for instance, may be used as a method for selecting a block partitioning method. The R-D optimization is assumed to be a method in which encoder 100 tries out all of a plurality of block partitioning method candidates, evaluates the cost of each candidate, and selects a block partitioning method candidate that gained the highest score in the cost evaluation.

Encoder 100 then splits the current block according to the block partitioning method selected in step S11004.

Next, encoder 101 encodes the number of partitions (S11005). The encoding performed by encoder 100 includes an encoding process and writing of encoded information into a bitstream.

Subsequently, encoder 100 determines whether the selected block partitioning method candidate is a block partitioning method candidate involving a direction related to block partitioning (S11006). The block partitioning method involving a direction related to block partitioning may be, for example, binary splitting or ternary splitting.

When the selected block partitioning method candidate is not a block partitioning method candidate involving a direction related to block partitioning (No in S11006), encoder 100 ends the process.

When the selected block partitioning method candidate is a block partitioning method candidate involving a direction related to block partitioning (Yes in S11006), encoder 100 determines whether the block partitioning method is ternary splitting (S11007).

When the block partitioning method is not ternary splitting (No in S11007), encoder 110 performs a process in step S11009. The process in step S11009 will be described later.

When the block partitioning method is ternary splitting (Yes in S11007), encoder 100 determines whether the shape of the current block is a rectangle (S11008).

When the shape of the current block is not a rectangle (No in S11008), encoder 100 encodes block-partitioning-related direction information which is information on a direction related to block partitioning (S11009). The encoding here may include an encoding process and writing of encoded information into a bitstream. For example, binary splitting 305 of splitting a current block into two in a vertical direction is selected from the second candidates. When the shape of the current block is horizontally elongated, encoder 100 presents S=0, QT=0, TT=0, and Ver=1 in a syntax tree such that illustrated in FIG. 3 and writes syntax into a bitstream. For example, ternary splitting 302 of splitting a current block into three in a horizontal direction is selected from the second candidates. When the shape of the current block is vertically elongated, encoder 100 presents S=0, QT=0, and TT=1 in a syntax tree such that illustrated in FIG. 3 and writes syntax into a bitstream without using Ver.

When the shape of the current block is a rectangle (Yes in S11008), encoder 100 ends the process without encoding the block-partitioning-related direction information.

At step S11007, encoder 100 determines whether the number of partitions according to the block partitioning method is three, but may determine whether the number of partitions is two.

At step S11008, encoder 100 determines whether the shape of the current block is a rectangle, but may determine whether a value indicating a ratio of the longer side to the shorter side of the current block is greater than a predetermined value.

Internal Configuration of Block Splitter in Decoder According to Second Aspect

Figure 29:
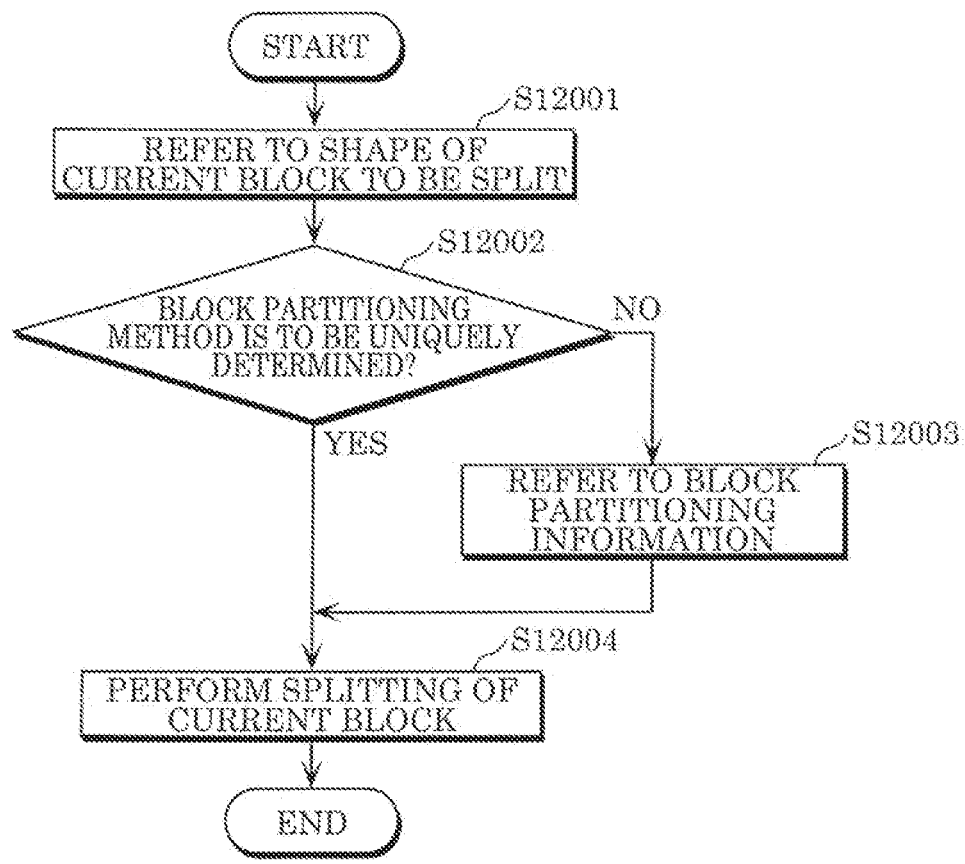
FIG. 29 is a flowchart illustrating a process of referring to block partitioning information and performing block partitioning, which is performed by a decoder according to the second aspect.

FIG. 29 is a flowchart illustrating a process of referring to block partitioning information and performing block partitioning, which is performed by a decoder according to the second aspect.

First, decoder 200 refers to the shape of a current block to be split (S12001). A current block to be split is a block to be split by decoder 200. Here, decoder 200 may calculate the shape of the current block.

Next, decoder 200 determines whether a block partitioning method is to be uniquely determined based on the shape of the current block (S12002).

When the block partitioning method is to be uniquely determined based on the shape of the current block (Yes in S12002), decoder 200 does not refer to block partitioning information etc.

When the block partitioning method is not to be uniquely determined based on the shape of the current block (No in S12002), decoder 200 refers to block partitioning information (S12003). In other words, decoder 200 reads out the shape of the current block or block partitioning information that is encoded and written into a bitstream by encoder 100.

Next, decoder 200 performs block partitioning according to a predetermined block partitioning method (S12004). The predetermined block partitioning method may be a block partitioning method indicated in the block partitioning information referred to in step S12003. When the block partitioning method is to be uniquely determined in step S12002, the predetermined block partitioning method may be that block partitioning method uniquely determined.

Decoder 200 then ends the operation.

In the process illustrated in FIG. 29, a block partitioning method candidate may be eliminated based on a determination condition other than the shape of a current block to be split. For example, a block partitioning method candidate to be eliminated from the first candidates may be determined according to the type of a picture such as I-picture, P-picture, and B-picture, or the type of a prediction mode such as intra prediction mode and inter prediction mode. Alternatively, a block partitioning method candidate to be eliminated from the first candidates may be determined using one of the following: a block partitioning method of a current block to be split; and the number of partitions according to the block partitioning method.

Concrete Example 1 of Decoding Process According to Second Aspect

Figure 30:
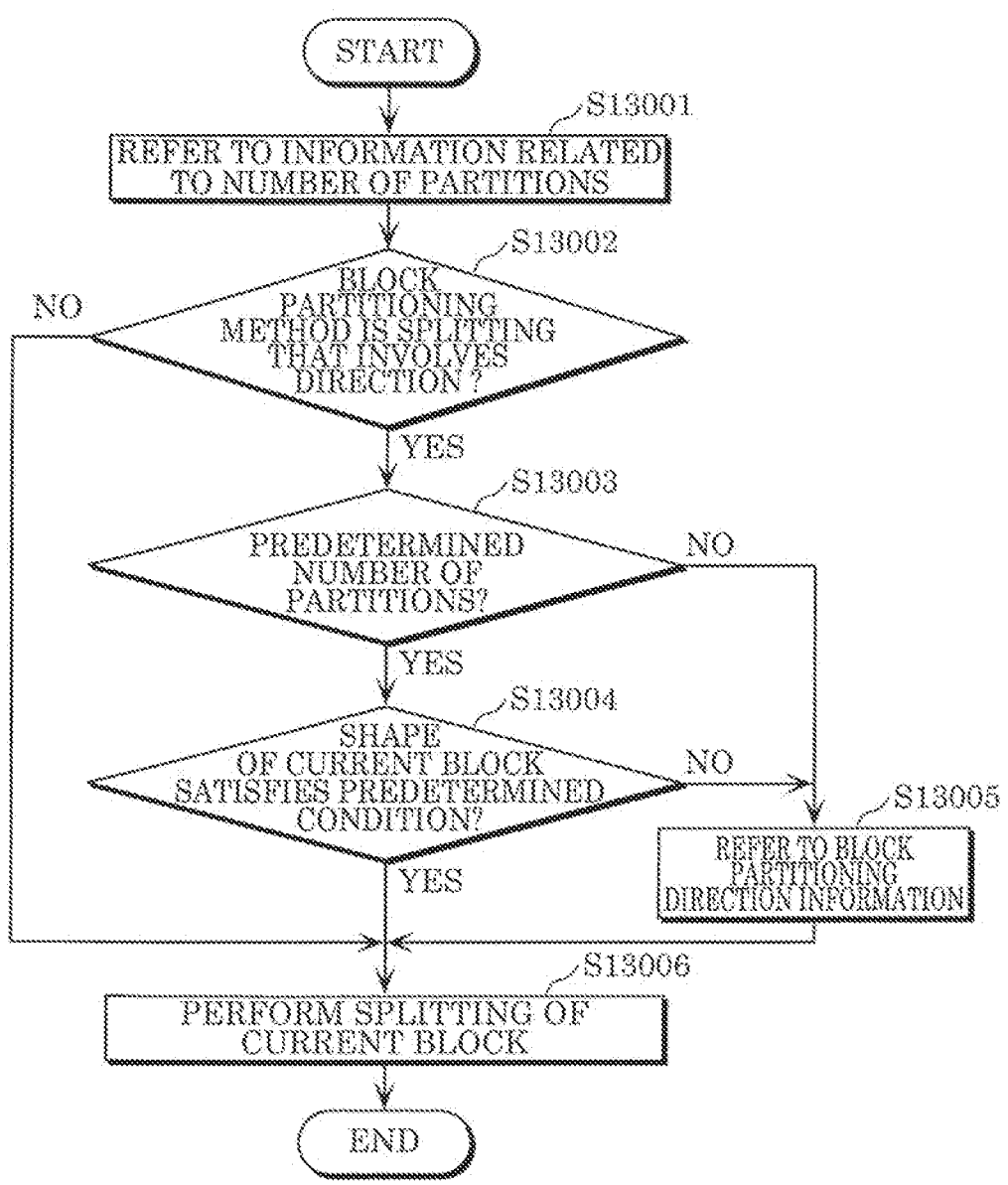
FIG. 30 is a flowchart illustrating a process of referring to block partitioning information and performing block partitioning, which is performed by a decoder according to concrete example 1 of the second aspect.

FIG. 30 is a flowchart illustrating a process of referring to block partitioning information and performing block partitioning, which is performed by a decoder according to concrete example 1 of the second aspect.

First, decoder 200 refers to information related to the number of partitions according to the block partitioning method used for encoding (S13001). Decoder 200 may refer to the information related to the number of partitions by decoding a bitstream transmitted from encoder 100. In other words, decoder 200 reads out the shape of a current block to be split or block partitioning information that is encoded and written into the bitstream by encoder 100. The information referred to here may be, for example, TT-Flag, QT-Flag, or S-Flag in the syntax tree illustrated in FIG. 13.

Next, decoder 200 determines whether the block partitioning method is a block partitioning method candidate corresponding to splitting that involves a direction related to block partitioning (S13002).

When the block partitioning method is not a block partitioning method candidate corresponding to splitting that involves a direction related to block partitioning (No in S13002), decoder 200 does not refer to block partitioning information. This applies also to the case, for example, where block partitioning information is to be uniquely determined based on the shape of a current block to be split. This is because decoder 200 does not need to refer to information on a direction related to block partitioning. Decoder 200 then performs splitting of the current block (S13006).

When the block partitioning method is a block partitioning method candidate corresponding to splitting that involves a direction related to block partitioning (Yes in S13002), decoder 200 determines whether the number of partitions is a predetermined number (S13003). Decoder 200 may determine, for example, whether the number of partitions is three.

When the number of partitions is not the predetermined number (No in S13003), decoder 200 refers to block-partitioning-related direction information which is information on a direction related to block partitioning (S13005). Decoder 200 then performs splitting of the current block (S13006).

When the number of partitions is the predetermined number (Yes in S13003), decoder 200 determines whether the shape of the current block satisfies a predetermined condition (S13004). The predetermined condition here is, for example, whether the shape of the current block is a rectangle.

When the shape of the current block satisfies the predetermined condition (Yes in S13004), decoder 200 performs splitting of the current block (S13006). The current block may be split in a predetermined direction. For example, when the current block is vertically elongated, the current block may be split in a horizontal direction, and when the current block is horizontally elongated, the current block may be split in a vertical direction.

When the shape of the current block does not satisfy the predetermined condition (No in S13004), decoder 200 refers to block partitioning information (S13005). Subsequently, decoder 200 splits the current block based on the block partitioning information (S13006).

Thus, when the shape of the current block satisfies the predetermined condition at step S13006, decoder 200 may split the current block without parsing the block partitioning information.

The block partitioning information may include either or both of a direction related to block partitioning and the number of partitions according to a block partitioning method.

Concrete Example 2 of Decoding Process According to Second Aspect

Figure 31:
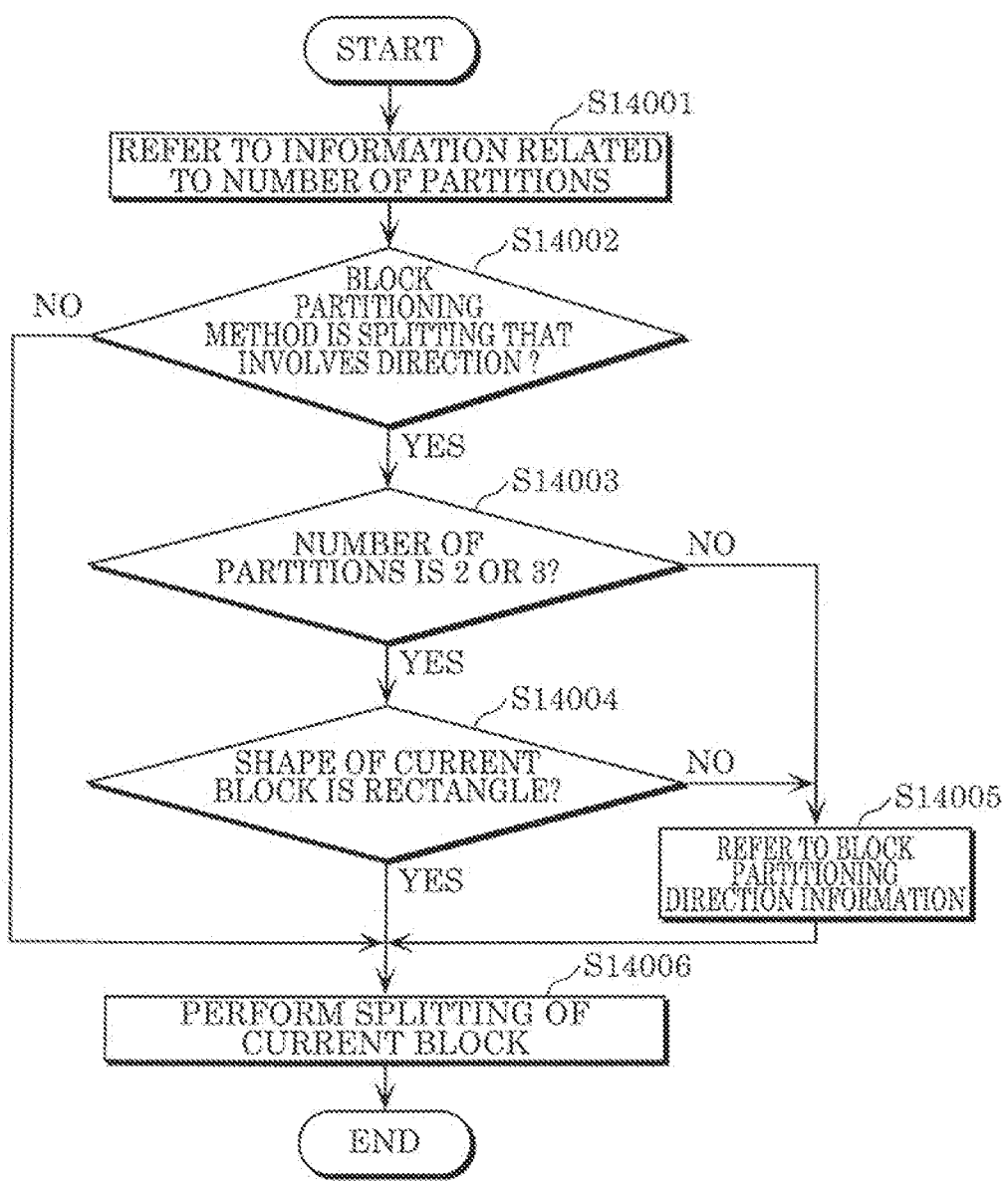
FIG. 31 is a flowchart illustrating a process of referring to block partitioning information and performing block partitioning, which is performed by a decoder according to concrete example 2 of the second aspect.

FIG. 31 is a flowchart illustrating a process of referring to block partitioning information and performing block partitioning, which is performed by a decoder according to concrete example 2 of the second aspect.

First, decoder 200 refers to information related to the number of partitions according to the block partitioning method used for encoding (S14001). Decoder 200 may refer to the information related to the number of partitions by decoding a bitstream transmitted from encoder 100. In other words, decoder 200 reads out the shape of a current block to be split or block partitioning information that is encoded and written into a bitstream by encoder 100. The information referred to here may be, for example, TT-Flag, QT-Flag, or S-Flag in the syntax tree illustrated in FIG. 13.

Next, decoder 200 determines whether the block partitioning method is a block partitioning method candidate corresponding to splitting that involves a direction related to block partitioning (S14002).

When the block partitioning method is not a block partitioning method candidate corresponding to splitting that involves a direction related to block partitioning (No in S14002), decoder 200 does not refer to block partitioning information. This is because decoder 200 does not need to refer to block-partitioning-related information which is information on a direction related to block partitioning. Decoder 200 then performs splitting of the current block (S14006).

When the block partitioning method is a block partitioning method candidate corresponding to splitting that involves a direction related to block partitioning (Yes in S14002), decoder 200 determines whether the number of partitions is two or three (S14003).

When the number of partitions is neither two nor three (No in S14003), decoder 200 refers to block-partitioning-related direction information which is information on a direction related to block partitioning (S14005). Decoder 200 then performs splitting of the current block (S14006).

When the number of partitions is two or three (Yes in S14003), decoder 200 determines whether the shape of the current block is a rectangle (S14004).

When the shape of the current block is a rectangle (Yes in S14004), decoder 200 performs splitting of the current block (S14006). Decoder 200 performs the splitting without referring to the block-partitioning-related direction information. When the number of partitions according to the block partitioning method referred to is two or three, for example, decoder 200 may split a vertically elongated block in a horizontal direction or split a horizontally elongated block in a vertical direction.

When the shape of the current block is not a rectangle (No in S14004), decoder 200 refers to block partitioning information (S14005). Decoder 200 then performs splitting of the current block based on the block partitioning information (S14006).

At step S14004, decoder 200 determines whether the shape of the current block is a rectangle, but may determine whether a value indicating a ratio of the longer side to the shorter side of the current block is greater than a first value. The first value may be 2 or 4. The first value may be any natural number.

At step S14004, decoder 200 determines whether the shape of the current block is a rectangle, but may determine whether the shape of the current block is a rectangle and a value indicating a ratio of the longer side to the shorter side of the current block is smaller than a second value. The second value may be, for example, 64 pixels. The second value may be a given number of pixels in a range selectable by encoder 100.

At step S14004, decoder 200 determines whether the shape of the current block is a rectangle, but may determine whether a value indicating a ratio of the longer side to the shorter side of a block generated through the splitting of the current block is greater than a third value. The third value may be 4 or 8. The third value may be any natural number.

Concrete Example 3 of Decoding Process According to Second Aspect

Figure 32:
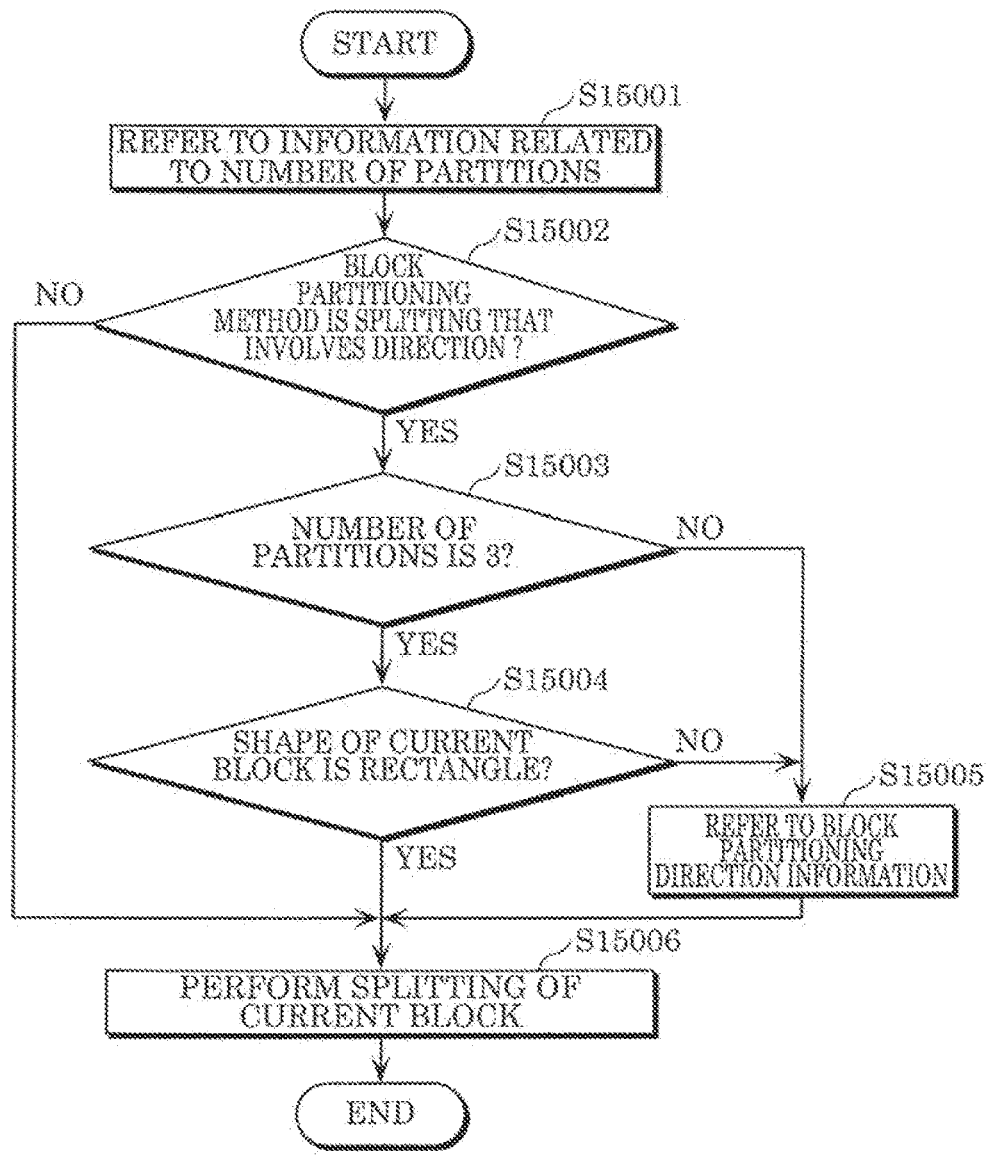
FIG. 32 is a flowchart illustrating a process of referring to block partitioning information and performing block partitioning, which is performed by a decoder according to concrete example 3 of the second aspect.

FIG. 32 is a flowchart illustrating a process of referring to block partitioning information and performing block partitioning, which is performed by a decoder according to concrete example 3 of the second aspect.

First, decoder 200 refers to information related to the number of partitions in accordance with a block partitioning method (S15001). Decoder 200 may refer to the information related to the number of partitions by decoding a bitstream transmitted from encoder 100. The information referred to here may be, for example, TT-Flag, QT-Flag, or S-Flag in the syntax tree illustrated in FIG. 13.

Next, decoder 200 determines whether the block partitioning method referred to is a block partitioning method candidate involving a direction related to block partitioning (S15002).

When the block partitioning method referred to is not a block partitioning method candidate involving a direction related to block partitioning (No in S15002), decoder 200 does not refer to block partitioning information. This is because decoder 200 does not need to refer to block-partitioning-related direction information which is information on a direction related to block partitioning. Decoder 200 then performs splitting of the current block (S15006).

When the block partitioning method referred to by decoder 200 is a block partitioning method candidate involving a direction related to block partitioning (Yes in S15002), decoder 200 determines whether the number of partitions is three (S15003).

When the number of partitions is not three (No in S15003), decoder 200 refers to block-partitioning-related direction information (S15005). Decoder 200 then performs splitting of the current block (S15006).

When the number of partitions is three (Yes in S15003), decoder 200 determines whether the shape of the current block is a rectangle (S15004).

When the shape of the current block is a rectangle (Yes in S15004), decoder 200 performs splitting of the current block (S15006). Decoder 200 performs the splitting without referring to the block-partitioning-related direction information. For example, when the number of partitions according to the block partitioning method referred to is three, decoder 200 may split a vertically elongated block in a horizontal direction or split a horizontally elongated block in a vertical direction.

When the shape of the current block is not a rectangle (No in S15004), decoder 200 refers to block partitioning information (S15005). Decoder 200 then splits the current block based on the block partitioning information (S15006).

In the process illustrated in FIG. 32, when information indicating that ternary splitting is to be performed on a horizontally elongated block is written in a bitstream, for example, decoder 200 may perform ternary splitting on a current block to be split in a vertical direction without referring to block-partitioning-related direction information. When information indicating that binary splitting is to be performed on a horizontally elongated block is written in a bitstream, for example, decoder 200 refers to block-partitioning-related direction information and performs block partitioning. When the block-partitioning-related direction information referred to indicates horizontal splitting, decoder 200 may perform binary splitting on the current block in a horizontal direction.

Advantageous Effects of Second Aspect

With the configuration according to the second aspect, it is predicted that an extremely elongated block is hardly generated in the splitting of a current block by splitter 102 in encoder 100. Accordingly, it is possible to reduce the number of block partitioning methods to be selected in the present processing by prohibiting in advance a block partitioning method that generates a shape that is most unlikely to be generated. This reduces the number of block partitioning methods targeted for calculation when encoder 100 determines a coding mode using optimization such as an R-D optimization, for instance. Encoder 100 therefore is capable of reducing the amount of processing necessary for encoding while inhibiting the degradation of coding efficiency. Besides, by additionally skipping the process of writing syntax into a bitstream, the amount of processing necessary for encoding is further reduced.

Moreover, with the encoder intentionally biasing the generation frequency of each piece of information on a direction related to block partitioning, accuracy in probability estimation in arithmetic coding using a context increases. The arithmetic coding using a context is, for example, CABAC. Accordingly, by performing the processes described in the present disclosure, coding performance may be improved.

Moreover, by inhibiting the appearance of an extremely elongated block, subjective image quality may be improved.

Note that the encoder, decoder, the encoding method, and the decoding method according to the present disclosure do not always need to include all of the elements described in the second aspect, and may include only one or more of the elements. Moreover, each of the determination conditions according to the second aspect may be the same as the corresponding one of those described in the concrete examples illustrated in the second aspect, or may be any combination of those described in the concrete examples illustrated in the second aspect. Each of the numerical values used for determination conditions in the second aspect may be modified.

Variations

In the process of splitting a current block performed by encoder 100 or decoder 200, when the structure of a block is set differently between chroma signals and luma signals, encoder 100 may use the present disclosure for either luma signals or chroma signals.

Encoder 100 or decoder 200 may determine, per slice, whether to execute the processes included in the present disclosure.

Encoder 100 or decoder 200 may determine, per tile, whether to execute the processes included in the present disclosure.

Encoder 100 or decoder 200 may determine, per slice type, whether to execute the processes included in the present disclosure. A slice type is, for example, I-slice, P-slice, or B-slice.

The ternary splitting performed on a current block to be split by encoder 100 or decoder 200 does not need to split the block into blocks of equal size. For example, the current block may be split so that the length of a given side of the block is split with the ratio of 1:2:1.

Encoder 100 or decoder 200 may determine whether to execute the processes included in the present disclosure according to a prediction mode.

In the processes performed by encoder 100, a flag indicating that the processes included in the present disclosure have been performed into syntax such as a sequence layer, a picture layer, or a slice layer in a bitstream.

Encoder 100 may write information related to the determination condition used for the processes included in the present disclosure into syntax, in a bitstream, such as a sequence layer, a picture layer, or a slice layer. The information related to determination condition includes a value indicating a ratio of the longer side to the shorter side of a current block to be split, a value indicating a ratio of the longer side to the shorter side of a block generated through the splitting of the current block, an absolute value indicating the shorter side of the current block, information on a block partitioning method candidate to be eliminated, etc.

When the number of partitions according to a block partitioning method is uniquely determined based on the shape of a current block to be split, encoder 100 or decoder 200 may skip encoding or decoding of information related to the number of partitions according to the block partitioning method. When it is determined that splitting is not performed on a current block having the size of 8×8, for example, encoder 100 or decoder 200 does not need to perform encoding or decoding of information related to the number of partitions according to the block partitioning method used for 8×8 blocks.

The concrete examples of the determination conditions used in the processed included in the present disclosure are not limited to those described herein. Moreover, the number of times a process of the determination is performed in the processes included in the present disclosure may be different from those described in the concrete examples.

Implementation

Figure 33:
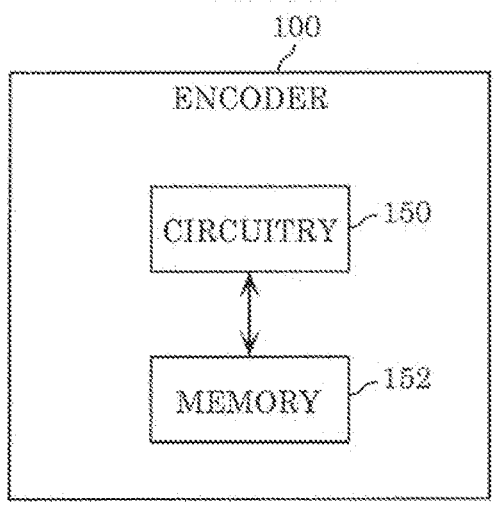
FIG. 33 is a block diagram illustrating an example of implementation of encoder 100.

FIG. 33 is a block diagram illustrating an example of implementation of encoder 100. Encoder 100 includes processing circuitry 150 and memory 152. For example, the elements of encoder 100 illustrated in FIG. 1 are implemented by processing circuitry 150 and memory 152 illustrated in FIG. 33.

Circuitry 150 is an electronic circuit accessible to memory 152 and processes information. For example, processing circuitry 152 is a dedicated or general-purpose electronic circuit which encodes videos using memory 152. Circuitry 260 may be a processor such as a CPU. Circuitry 150 may be an aggregate of a plurality of electronic circuits.

For example, circuitry 152 may serve as elements among the elements of encoder 100 illustrated in FIG. 1 other than the elements for storing information. Namely, circuitry 150 may perform the above-described operations as the operations of these elements.

Memory 152 is a dedicated or general-purpose memory that stores information for circuitry 152 to encode videos. Memory 152 may be an electronic circuit and connected to circuitry 150 or included in circuitry 160.

Memory 152 may be an aggregate of a plurality of electronic circuits or may include a plurality of sub memories. Memory 152 may be a magnetic disk or an optical disc, and may be expressed as storage or recording medium. Memory 162 may be nonvolatile memory or volatile memory.

For example, memory 152 may serve as elements for storing information, among the elements of encoder 100 illustrated in FIG. 1.

Memory 152 may store an encoded video or a bit string corresponding to the encoded video. Memory 152 may also store a program for circuitry 150 to encode a video.

Note that encoder 100 may not include all the elements illustrated in FIG. 1, and may not perform all the processes described above. One or more of the elements illustrated in FIG. 1 may be included in another device, or one or more of the processes described above may be performed by another device. One or more of the elements illustrated in FIG. 1 are implemented by encoder 100, and with one or more of the above-described processes carried out, information related to the encoding of the video is appropriately set.

Figure 34:
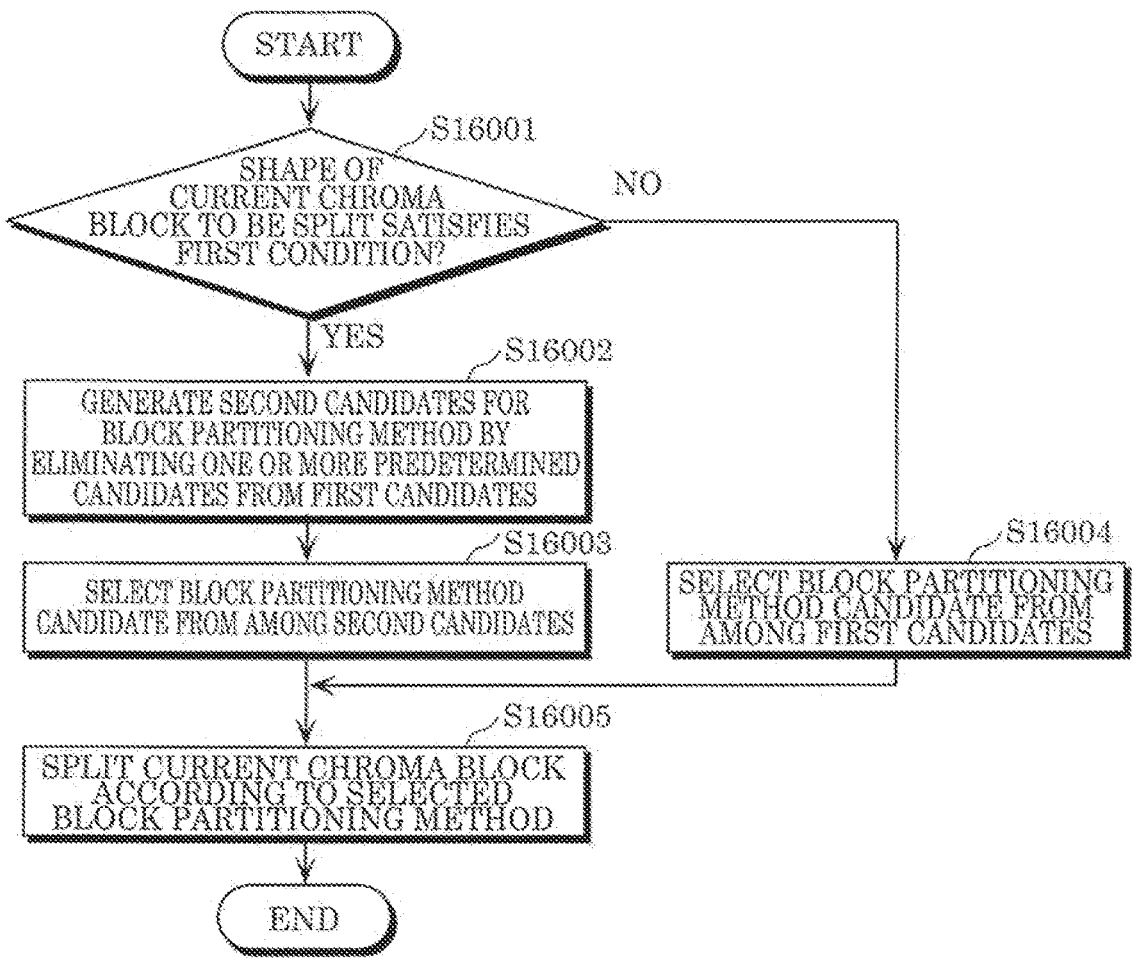
FIG. 34 is a flowchart illustrating an example of an operation performed by encoder 100.

FIG. 34 is a flowchart illustrating an example of an operation performed by encoder 100. For example, encoder 100 illustrated in FIG. 33 performs the operation illustrated in FIG. 34 when splitter 102 splits a current chroma block. Specifically, circuitry 150 performs the following operation using memory 152.

First, encoder 100 determines whether the shape of a current chroma block to be split satisfies a first condition (S16001).

When the shape of the current chroma block satisfies the first condition (Yes in S16001), encoder 100 generates second candidates including a plurality of block partitioning method candidates by eliminating one or more predetermined block partitioning method candidates from first candidates including a plurality of block partitioning methods (S16002).

Note that the candidate eliminated at S16002 may include a candidate that splits a block having one side longer than the other side so that a ratio of one side to the other side further increases. In addition, the candidate eliminated at S16002 may include a candidate that splits into two a block having one side longer than the other side so that a ratio of one side to the other side further increases. Moreover, the candidate eliminated at S16002 may include a candidate that splits into three a block having one side longer than the other side so that a ratio of one side to the other side further increases.

Encoder selects a block partitioning method candidate from among the second candidates for a block partitioning method (S16003).

Subsequently, encoder 100 splits the current chroma block according to the block partitioning method selected at step S16003 (S16005). Encoder 100 then ends the operation.

When the shape of the current chroma block does not satisfy the first condition (No in S16001), on the other hand, encoder 100 selects a block partitioning method candidate from among the first candidates including a plurality of candidates for a block partitioning method (S16004).

Subsequently, encoder 100 splits the current chroma block according to the block partitioning method selected at step S16004 (S16005). Encoder 100 then ends the operation.

Figure 35:
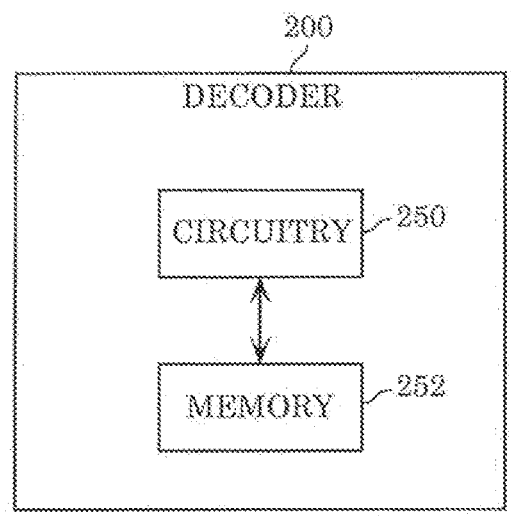
FIG. 35 is a block diagram illustrating an example of implementation of decoder 200.

FIG. 35 is a block diagram illustrating an example of implementation of decoder 200. Decoder 200 includes processing circuitry 250 and memory 252. For example, the elements of decoder 200 illustrated in FIG. 10 are implemented by processing circuitry 250 and memory 252 illustrated in FIG. 35.

Circuitry 250 is an electronic circuit accessible to memory 252 and processes information. For example, circuitry 260 is a dedicated or general-purpose electronic circuit which decodes videos using memory 252. Circuitry 250 may be a processor such as a CPU. Circuitry 250 may be an aggregate of a plurality of electronic circuits.

For example, circuitry 250 may serve as at least two of the elements of decoder 200 illustrated in FIG. 10, other than the elements for storing information. Namely, circuitry 250 may perform the above-described operations as the operations of these elements.

Memory 252 is a dedicated or general-purpose memory that stores information for circuitry 250 to encode videos. Memory 252 may be an electronic circuit and connected to circuitry 250.

Memory 252 may be an aggregate of a plurality of electronic circuits or may include a plurality of sub memories. Memory 252 may be a magnetic disk or an optical disc, and may be expressed as storage or recording medium. Memory 252 may be nonvolatile memory or volatile memory.

For example, memory 252 may serve as elements for storing information, among the elements of decoder 200 illustrated in FIG. 35.

Memory 252 may store a decoded video and a bit string corresponding to the decoded video. Memory 252 may also store a program for circuitry 250 to decode videos.

Note that decoder 200 may not include all the elements illustrated in FIG. 10, and may not perform all the processes described above. One or more of the elements illustrated in FIG. 10 may be included in another device, and one or more of the processes described above may be performed by another device. One or more of the elements illustrated in FIG. 10 are implemented by decoder 200, and with one or more of the above-described processes carried out, information relating to the decoding of the video is appropriately set.

Figure 36:
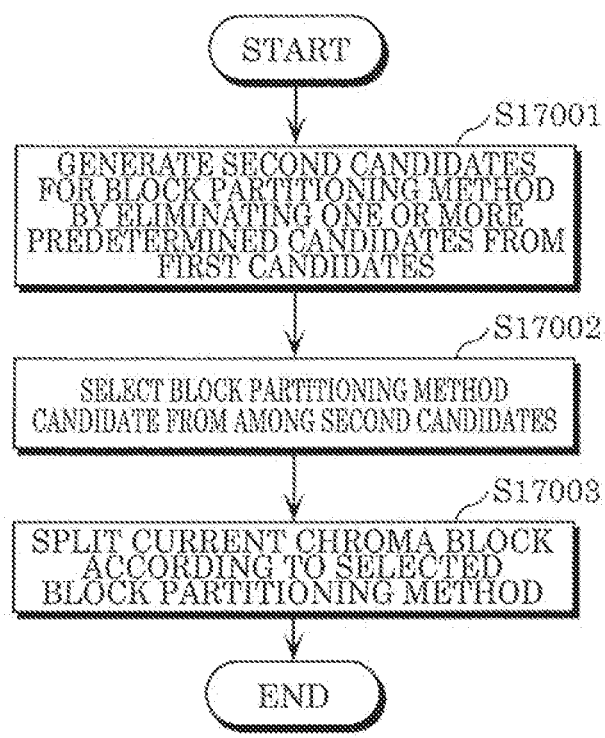
FIG. 36 is a flowchart illustrating an example of an operation performed by decoder 200.

FIG. 36 is a flowchart illustrating an example of an operation performed by decoder 200. For example, decoder 200 illustrated in FIG. 35 performs the operation illustrated in FIG. 36 when splitting a current chroma block. Specifically, circuitry 250 performs the following operation using memory 252.

First, decoder 200 generates second candidates including a plurality of block partitioning method candidates by eliminating one or more predetermined block partitioning method candidates from first candidates including a plurality of block partitioning method candidates (S17001).

Decoder 200 selects a block partitioning method candidate from among the second block coding method candidates (S17002).

Subsequently, decoder 200 splits the current chroma block according to the block partitioning method selected in step S17002 (S17003). Decoder 200 then ends the operation.

[Supplemental Information]

Encoder 100 and decoder 200 according to the present embodiment may be used as an image encoder and an image decoder, respectively, or may be used as a video encoder and a video decoder, respectively.

In the present embodiment, each of the elements may be configured of dedicated hardware or may be implemented by executing a software program suitable for the element. Each of the elements may be implemented by a program executor such as a CPU or a processor reading and executing a software program recorded on a recording medium such as a hard disc or a semiconductor memory.

Specifically, encoder 100 and decoder 200 may each include processing circuitry, and storage electrically coupled to the processing circuitry and accessible from the processing circuitry. For example, the processing circuitry corresponds to processor 150 or 250 and the storage corresponds to memory 152 or 252.

The processing circuitry includes at least one of the dedicated hardware and the program executor, and performs processing using the storage. If the processing circuitry includes a program executor, the storage stores a software program to be executed by the program executor.

Here, the software which implements encoder 100 or decoder 200 according to the present embodiment, for instance, is a program as follows.

Namely, the program causes a computer to execute: determining whether a shape of a current block to be split in an image satisfies a first condition; generating one or more second candidates for a block partitioning method by eliminating one or more predetermined candidates from a plurality of first candidates for a block partitioning method when the shape of the current block satisfies the first condition; selecting a block partitioning method from among the one or more second candidates; and splitting the current block according to the block partitioning method selected.

Alternatively, the program may cause the computer to parse, from a bitstream generated by encoding the image, block partitioning information relating to a block partitioning method according to which a current block in an image is split, and split the current block based on the block partitioning information that has been parsed. When the current block in the image satisfies a first condition, the block partitioning information may be generated by generating one or more second candidates for a block partitioning method and selecting a block partitioning method from among the second candidates generated by eliminating one or more predetermined candidates from first candidates.

The elements may be circuits as described above. These circuits may constitute one circuitry as a whole, or may be separate circuits. Each element may be implemented by a general-purpose processor or by a dedicated processor.

Processing performed by a specific element may be performed by a different element. The order of performing processes may be changed or the processes may be performed in parallel. An encoder/decoder may include encoder 100 and decoder 200.

The ordinal numbers such as the first and the second used in the description may be switched where necessary. A new ordinal number may be provided for or any of the existing ordinal numbers may be removed from the elements.

The above has given a description of aspects of encoder 100 and decoder 200 based on the embodiments, yet the aspects of encoder 100 and decoder 200 are not limited to the embodiments. The aspects of encoder 100 and decoder 200 may also encompass various modifications that may be conceived by those skilled in the art to the embodiments, and embodiments achieved by combining elements in different embodiments, without departing from the scope of the present disclosure.

This aspect may be implemented in combination with at least one or more of the other aspects according to the present disclosure.

Embodiment 2

As described in each of the above embodiments, each functional block can typically be realized as an MPU and memory, for example. Moreover, processes performed by each of the functional blocks are typically realized by a program execution unit, such as a processor, reading and executing software (a program) recorded on a recording medium such as ROM. The software may be distributed via, for example, downloading, and may be recorded on a recording medium such as semiconductor memory and distributed. Note that each functional block can, of course, also be realized as hardware (dedicated circuit).

Moreover, the processing described in each of the embodiments may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments of the present disclosure are not limited to the above exemplary embodiments; various modifications may be made to the exemplary embodiments, the results of which are also included within the scope of the embodiments of the present disclosure.

Next, application examples of the moving picture encoding method (image encoding method) and the moving picture decoding method (image decoding method) described in each of the above embodiments and a system that employs the same will be described. The system is characterized as including an image encoder that employs the image encoding method, an image decoder that employs the image decoding method, and an image encoder/decoder that includes both the image encoder and the image decoder. Other configurations included in the system may be modified on a case-by-case basis.

USAGE EXAMPLES

FIG. 37 illustrates an overall configuration of content providing system ex100 for implementing a content distribution service. The area in which the communication service is provided is divided into cells of desired sizes, and base stations ex106, ex107, ex108, ex109, and ex110, which are fixed wireless stations, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above elements. The devices may be directly or indirectly connected together via a telephone network or near field communication rather than via base stations ex106 through ex110, which are fixed wireless stations. Moreover, streaming server ex103 is connected to devices including computer ex111, gaming device ex112, camera ex113, home appliance ex114, and smartphone ex115 via, for example, internet ex101. Streaming server ex103 is also connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the typical 2G, 3G, 3.9G, and 4G systems, as well as the next-generation 5G system.

Home appliance ex118 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) performs the encoding processing described in the above embodiments on still-image or video content captured by a user via the terminal, multiplexes video data obtained via the encoding and audio data obtained by encoding audio corresponding to the video, and transmits the obtained data to streaming server ex103. In other words, the terminal functions as the image encoder according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices each function as the image decoder according to one aspect of the present disclosure.

[Decentralized Processing]

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of, for example, some kind of an error or a change in connectivity due to, for example, a spike in traffic, it is possible to stream data stably at high speeds since it is possible to avoid affected parts of the network by, for example, dividing the processing between a plurality of edge servers or switching the streaming duties to a different edge server, and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Moreover, since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Moreover, the server may stream video data after performing transcoding to convert the encoding format of the video data. For example, the server may convert the encoding format from MPEG to VP, and may convert H.264 to H.265.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

[3D, Multi-Angle]

In recent years, usage of images or videos combined from images or videos of different scenes concurrently captured or the same scene captured from different angles by a plurality of terminals such as camera ex113 and/or smartphone ex115 has increased. Videos captured by the terminals are combined based on, for example, the separately-obtained relative positional relationship between the terminals, or regions in a video having matching feature points.

In addition to the encoding of two-dimensional moving pictures, the server may encode a still image based on scene analysis of a moving picture either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. Note that the server may separately encode three-dimensional data generated from, for example, a point cloud, and may, based on a result of recognizing or tracking a person or object using three-dimensional data, select or reconstruct and generate a video to be transmitted to a reception terminal from videos captured by a plurality of terminals.

This allows the user to enjoy a scene by freely selecting videos corresponding to the video capturing terminals, and allows the user to enjoy the content obtained by extracting, from three-dimensional data reconstructed from a plurality of images or videos, a video from a selected viewpoint. Furthermore, similar to with video, sound may be recorded from relatively different angles, and the server may multiplex, with the video, audio from a specific angle or space in accordance with the video, and transmit the result.

In recent years, content that is a composite of the real world and a virtual world, such as virtual reality (VR) and augmented reality (AR) content, has also become popular. In the case of VR images, the server may create images from the viewpoints of both the left and right eyes and perform encoding that tolerates reference between the two viewpoint images, such as multi-view coding (MVC), and, alternatively, may encode the images as separate streams without referencing. When the images are decoded as separate streams, the streams may be synchronized when reproduced so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoder may obtain or store virtual object information and three-dimensional data, generate two-dimensional images based on movement from the perspective of the user, and then generate superimposed data by seamlessly connecting the images. Alternatively, the decoder may transmit, to the server, motion from the perspective of the user in addition to a request for virtual object information, and the server may generate superimposed data based on three-dimensional data stored in the server in accordance with the received motion, and encode and stream the generated superimposed data to the decoder. Note that superimposed data includes, in addition to RGB values, an a value indicating transparency, and the server sets the a value for sections other than the object generated from three-dimensional data to, for example, 0, and may perform the encoding while those sections are transparent. Alternatively, the server may set the background to a predetermined RGB value, such as a chroma key, and generate data in which areas other than the object are set as the background.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In the future, both indoors and outdoors, in situations in which a plurality of wireless connections are possible over near, mid, and far distances, it is expected to be able to seamlessly receive content even when switching to data appropriate for the current connection, using a streaming system standard such as MPEG-DASH. With this, the user can switch between data in real time while freely selecting a decoder or display apparatus including not only his or her own terminal, but also, for example, displays disposed indoors or outdoors. Moreover, based on, for example, information on the position of the user, decoding can be performed while switching which terminal handles decoding and which terminal handles the displaying of content. This makes it possible to, while in route to a destination, display, on the wall of a nearby building in which a device capable of displaying content is embedded or on part of the ground, map information while on the move. Moreover, it is also possible to switch the bit rate of the received data based on the accessibility to the encoded data on a network, such as when encoded data is cached on a server quickly accessible from the reception terminal or when encoded data is copied to an edge server in a content delivery service.

[Scalable Encoding]

Figure 38:
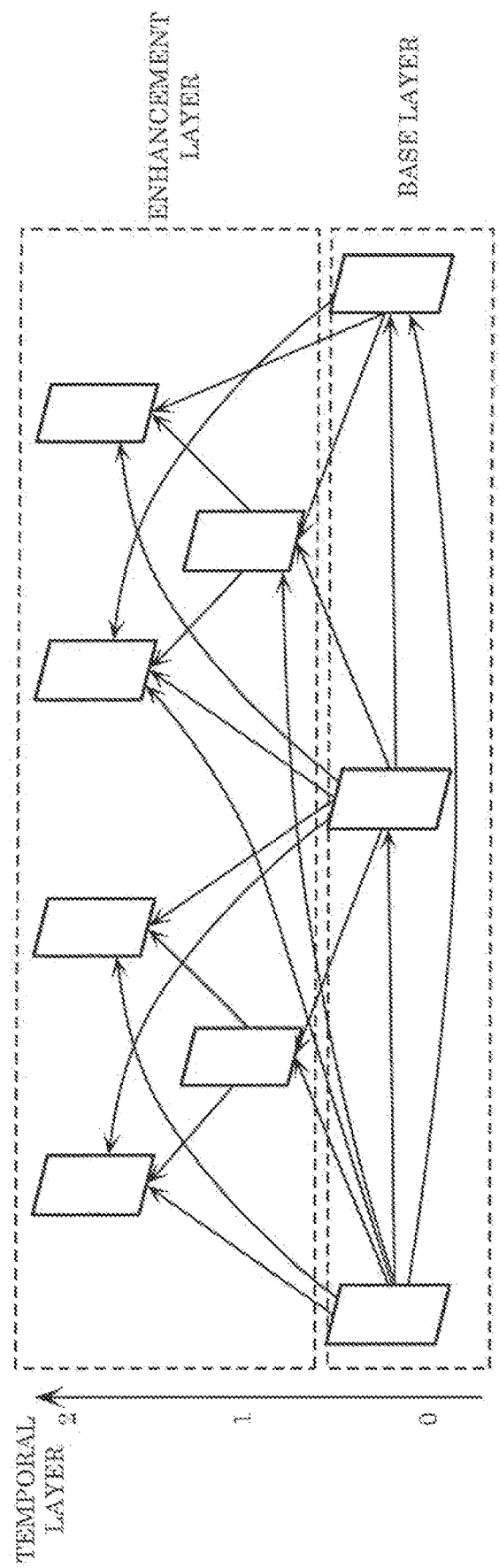
FIG. 38 illustrates one example of an encoding structure in scalable encoding.

The switching of content will be described with reference to a scalable stream, illustrated in FIG. 38, which is compression coded via implementation of the moving picture encoding method described in the above embodiments. The server may have a configuration in which content is switched while making use of the temporal and/or spatial scalability of a stream, which is achieved by division into and encoding of layers, as illustrated in FIG. 38. Note that there may be a plurality of individual streams that are of the same content but different quality. In other words, by determining which layer to decode up to based on internal factors, such as the processing ability on the decoder side, and external factors, such as communication bandwidth, the decoder side can freely switch between low resolution content and high resolution content while decoding. For example, in a case in which the user wants to continue watching, at home on a device such as a TV connected to the internet, a video that he or she had been previously watching on smartphone ex115 while on the move, the device can simply decode the same stream up to a different layer, which reduces server side load.

Furthermore, in addition to the configuration described above in which scalability is achieved as a result of the pictures being encoded per layer and the enhancement layer is above the base layer, the enhancement layer may include metadata based on, for example, statistical information on the image, and the decoder side may generate high image quality content by performing super-resolution imaging on a picture in the base layer based on the metadata. Super-resolution imaging may be improving the SN ratio while maintaining resolution and/or increasing resolution. Metadata includes information for identifying a linear or a non-linear filter coefficient used in super-resolution processing, or information identifying a parameter value in filter processing, machine learning, or least squares method used in super-resolution processing.

Figure 39:
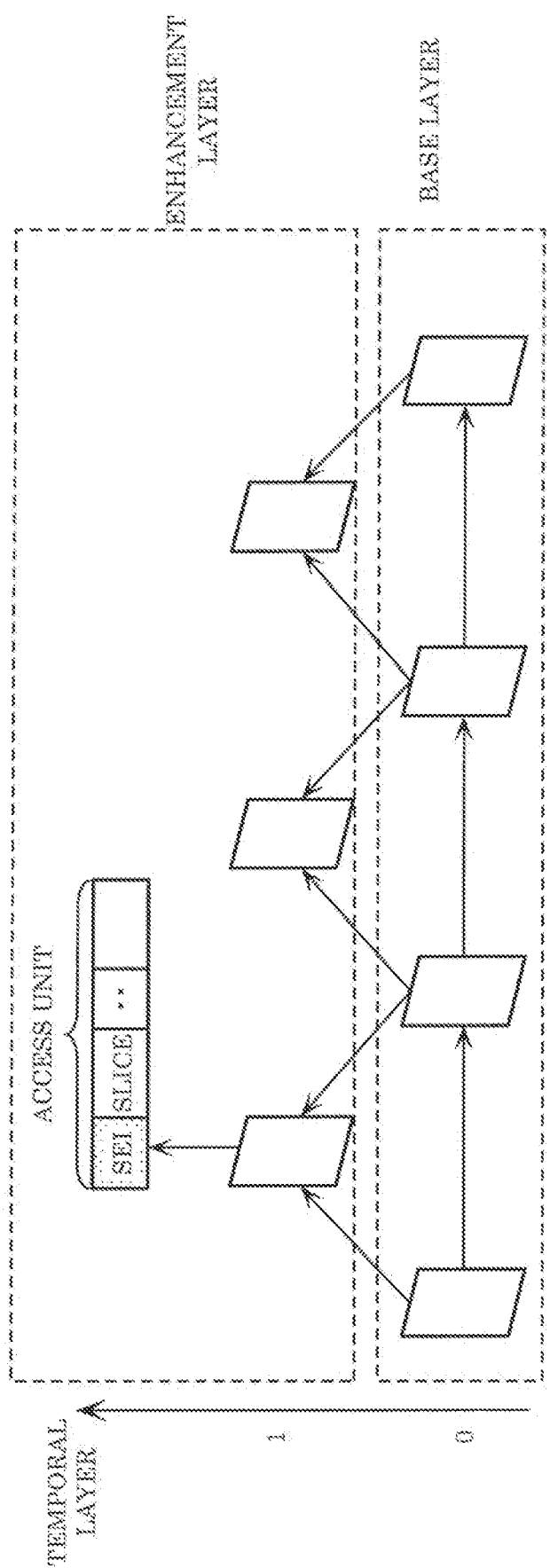
FIG. 39 illustrates one example of an encoding structure in scalable encoding.

Alternatively, a configuration in which a picture is divided into, for example, tiles in accordance with the meaning of, for example, an object in the image, and on the decoder side, only a partial region is decoded by selecting a tile to decode, is also acceptable. Moreover, by storing an attribute about the object (person, car, ball, etc.) and a position of the object in the video (coordinates in identical images) as metadata, the decoder side can identify the position of a desired object based on the metadata and determine which tile or tiles include that object. For example, as illustrated in FIG. 39, metadata is stored using a data storage structure different from pixel data such as an SEI message in HEVC. This metadata indicates, for example, the position, size, or color of the main object.

Moreover, metadata may be stored in units of a plurality of pictures, such as stream, sequence, or random access units. With this, the decoder side can obtain, for example, the time at which a specific person appears in the video, and by fitting that with picture unit information, can identify a picture in which the object is present and the position of the object in the picture.

[Web Page Optimization]

Figure 40:
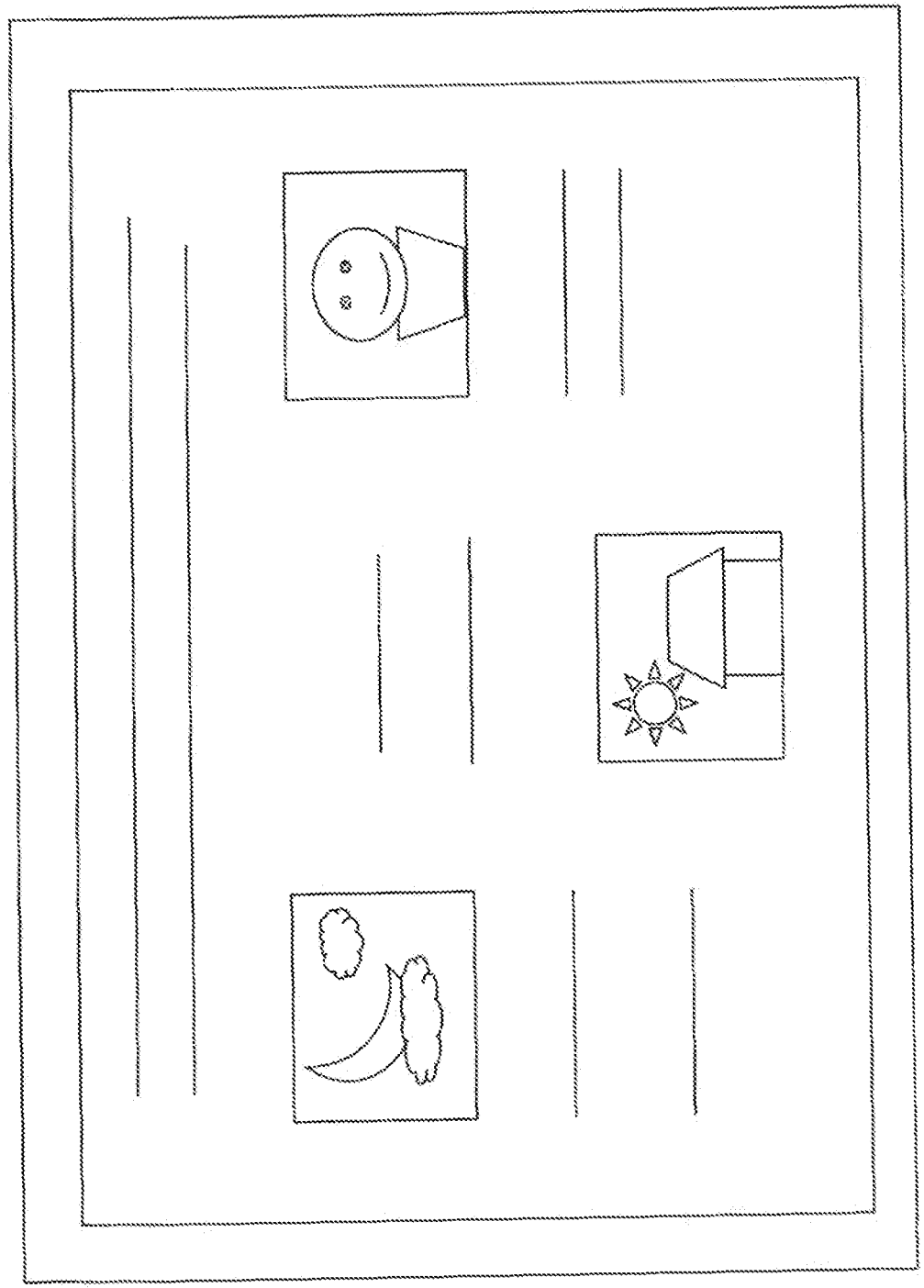
FIG. 40 illustrates an example of a display screen of a web page.
Figure 41:
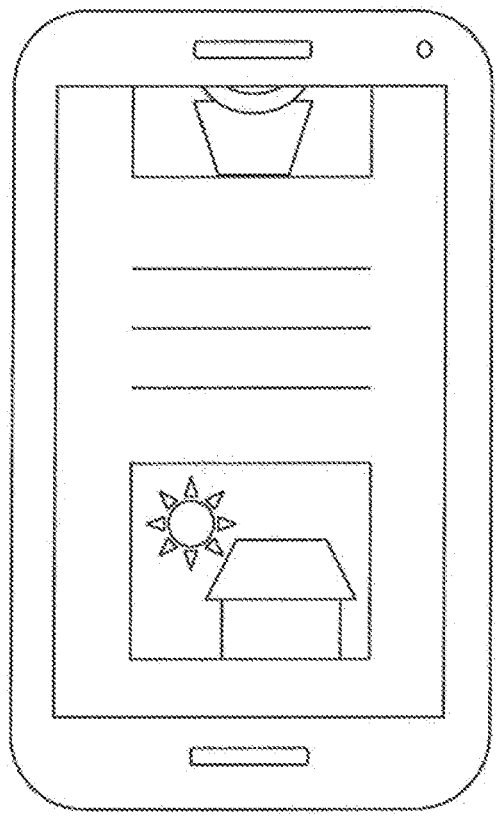
FIG. 41 illustrates an example of a display screen of a web page.

FIG. 40 illustrates an example of a display screen of a web page on, for example, computer ex111. FIG. 41 illustrates an example of a display screen of a web page on, for example, smartphone ex115. As illustrated in FIG. 40 and FIG. 41, a web page may include a plurality of image links which are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoder) displays, as the image links, still images included in the content or I pictures, displays video such as an animated gif using a plurality of still images or I pictures, for example, or receives only the base layer and decodes and displays the video.

When an image link is selected by the user, the display apparatus decodes giving the highest priority to the base layer. Note that if there is information in the HTML code of the web page indicating that the content is scalable, the display apparatus may decode up to the enhancement layer. Moreover, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Moreover, the display apparatus may purposely ignore the reference relationship between pictures and coarsely decode all B and P pictures as forward reference pictures, and then perform normal decoding as the number of pictures received over time increases.

[Autonomous Driving]

When transmitting and receiving still image or video data such two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., including the reception terminal is mobile, the reception terminal can seamlessly receive and decode while switching between base stations among base stations ex106 through ex110 by transmitting information indicating the position of the reception terminal upon reception request. Moreover, in accordance with the selection made by the user, the situation of the user, or the bandwidth of the connection, the reception terminal can dynamically select to what extent the metadata is received or to what extent the map information, for example, is updated.

With this, in content providing system ex100, the client can receive, decode, and reproduce, in real time, encoded information transmitted by the user.

[Streaming of Individual Content]

In content providing system ex100, in addition to high image quality, long content distributed by a video distribution entity, unicast or multicast streaming of low image quality, short content from an individual is also possible. Moreover, such content from individuals is likely to further increase in popularity. The server may first perform editing processing on the content before the encoding processing in order to refine the individual content. This may be achieved with, for example, the following configuration.

In real-time while capturing video or image content or after the content has been captured and accumulated, the server performs recognition processing based on the raw or encoded data, such as capture error processing, scene search processing, meaning analysis, and/or object detection processing. Then, based on the result of the recognition processing, the server—either when prompted or automatically—edits the content, examples of which include: correction such as focus and/or motion blur correction; removing low-priority scenes such as scenes that are low in brightness compared to other pictures or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement based on an image processing result. Alternatively, the server may generate and encode a video digest based on a result of an analysis of the meaning of a scene.

Note that there are instances in which individual content may include content that infringes a copyright, moral right, portrait rights, etc. Such an instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Moreover, the server may be configured to recognize the faces of people other than a registered person in images to be encoded, and when such faces appear in an image, for example, apply a mosaic filter to the face of the person. Alternatively, as pre- or post-processing for encoding, the user may specify, for copyright reasons, a region of an image including a person or a region of the background be processed, and the server may process the specified region by, for example, replacing the region with a different image or blurring the region. If the region includes a person, the person may be tracked in the moving picture the head region may be replaced with another image as the person moves.

Moreover, since there is a demand for real-time viewing of content produced by individuals, which tends to be small in data size, the decoder first receives the base layer as the highest priority and performs decoding and reproduction, although this may differ depending on bandwidth. When the content is reproduced two or more times, such as when the decoder receives the enhancement layer during decoding and reproduction of the base layer and loops the reproduction, the decoder may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

OTHER USAGE EXAMPLES

The encoding and decoding may be performed by LSI ex500, which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content or whether it is capable of executing a specific service. When the terminal is not compatible with the encoding scheme of the content or when the terminal is not capable of executing a specific service, the terminal first downloads a codec or application software then obtains and reproduces the content.

Aside from the example of content providing system ex100 that uses internet ex101, at least the moving picture encoder (image encoder) or the moving picture decoder (image decoder) described in the above embodiments may be implemented in a digital broadcasting system. The same encoding processing and decoding processing may be applied to transmit and receive broadcast radio waves superimposed with multiplexed audio and video data using, for example, a satellite, even though this is geared toward multicast whereas unicast is easier with content providing system ex100.

[Hardware Configuration]

Figure 42:
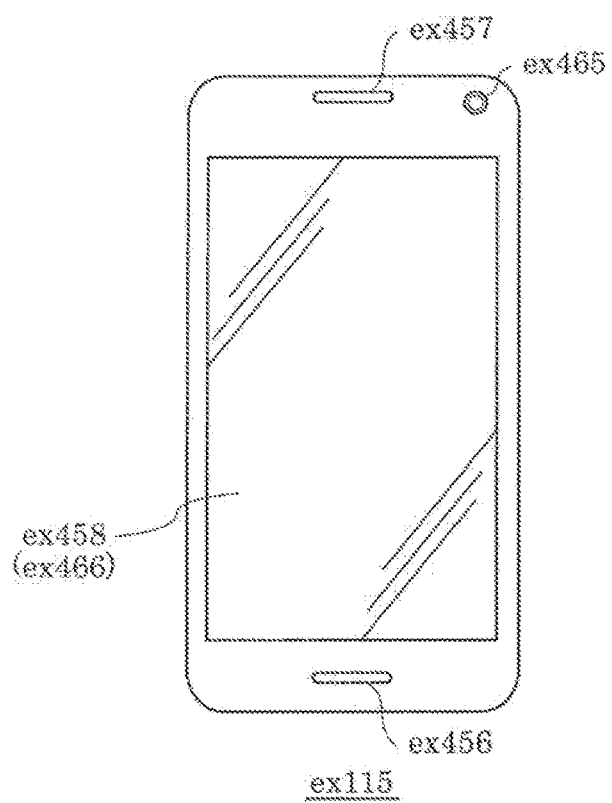
FIG. 42 illustrates one example of a smartphone.
Figure 43:
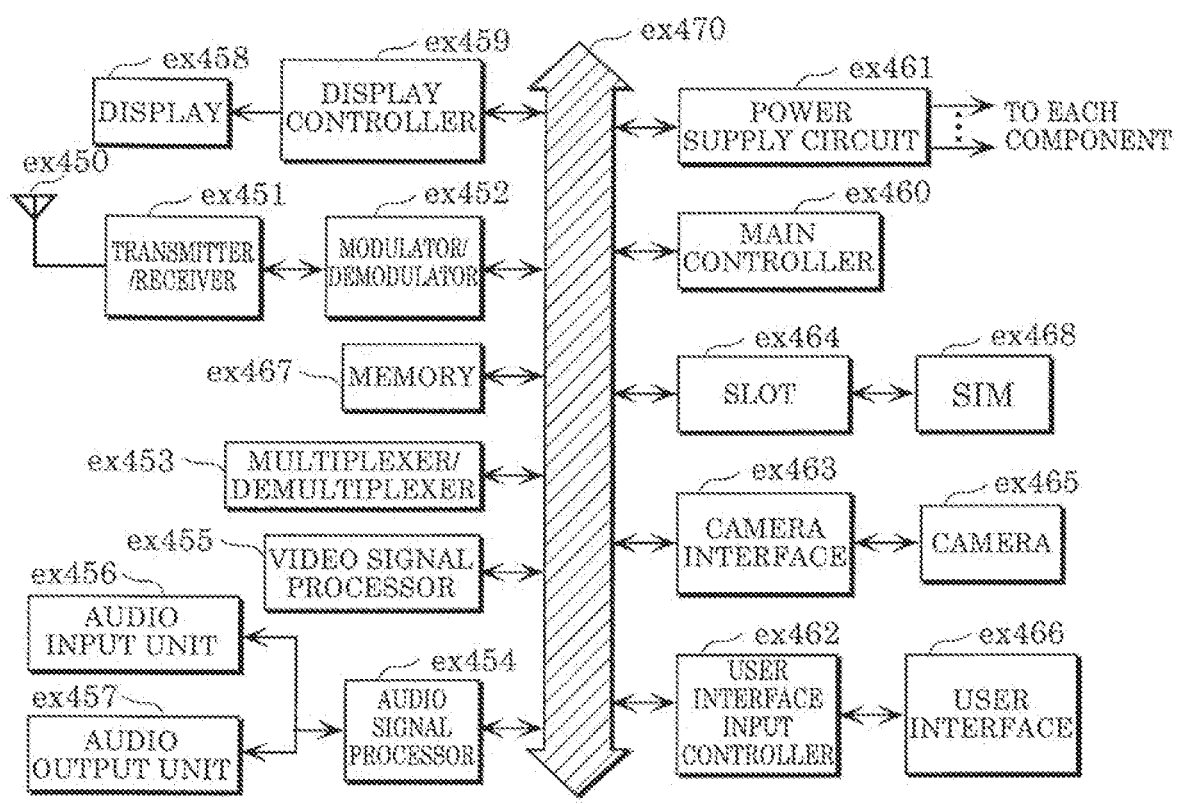
FIG. 43 is a block diagram illustrating a configuration example of a smartphone.

FIG. 42 illustrates smartphone ex115. FIG. 43 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Moreover, main controller ex460 which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns the power button of power supply circuit ex461 on, smartphone ex115 is powered on into an operable state by each component being supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, and this is applied with spread spectrum processing by modulator/demodulator ex452 and digital-analog conversion and frequency conversion processing by transmitter/receiver ex451, and then transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 as a result of operation of, for example, user interface ex466 of the main body, and similar transmission and reception processing is performed. In data transmission mode, when sending a video, still image, or video and audio, video signal processor ex455 compression encodes, via the moving picture encoding method described in the above embodiments, a video signal stored in memory ex467 or a video signal input from camera ex465, and transmits the encoded video data to multiplexer/demultiplexer ex453. Moreover, audio signal processor ex454 encodes an audio signal recorded by audio input unit ex456 while camera ex465 is capturing, for example, a video or still image, and transmits the encoded audio data to multiplexer/demultiplexer ex453. Multiplexer/demultiplexer ex453 multiplexes the encoded video data and encoded audio data using a predetermined scheme, modulates and converts the data using modulator/demodulator (modulator/demodulator circuit) ex452 and transmitter/receiver ex451, and transmits the result via antenna ex450.

When video appended in an email or a chat, or a video linked from a web page, for example, is received, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiments, and video or a still image included in the linked moving picture file is displayed on display ex458 via display controller ex459. Moreover, audio signal processor ex454 decodes the audio signal and outputs audio from audio output unit ex457. Note that since real-time streaming is becoming more and more popular, there are instances in which reproduction of the audio may be socially inappropriate depending on the user's environment. Accordingly, as an initial value, a configuration in which only video data is reproduced, i.e., the audio signal is not reproduced, is preferable. Audio may be synchronized and reproduced only when an input, such as when the user clicks video data, is received.

Although smartphone ex115 was used in the above example, three implementations are conceivable: a transceiver terminal including both an encoder and a decoder; a transmitter terminal including only an encoder; and a receiver terminal including only a decoder. Further, in the description of the digital broadcasting system, an example is given in which multiplexed data obtained as a result of video data being multiplexed with, for example, audio data, is received or transmitted, but the multiplexed data may be video data multiplexed with data other than audio data, such as text data related to the video. Moreover, the video data itself rather than multiplexed data maybe received or transmitted.

Although main controller ex460 including a CPU is described as controlling the encoding or decoding processes, terminals often include GPUs. Accordingly, a configuration is acceptable in which a large area is processed at once by making use of the performance ability of the GPU via memory shared by the CPU and GPU or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of, for example pictures, all at once.

This aspect may be implemented in combination with one or more of the other aspects according to the present disclosure. In addition, one or more of the processes in the flowcharts, one or more of the constituent elements of the apparatuses, and part of the syntax described in this aspect may be implemented in combination with other aspects.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to, for example, television receivers, digital video recorders, car navigation systems, mobile phones, digital cameras, digital camcorders, video conference systems, and electron mirrors.

What is claimed is:

1. An encoder, comprising:
   circuitry; and
   memory coupled to the circuitry,
   wherein the circuitry, in operation:
      determines whether a shape of a current chroma block to be split in an image satisfies a first condition;
      generates one or more second candidates for a block partitioning method by eliminating one or more predetermined candidates from a plurality of first candidates for a block partitioning method when the shape of the current chroma block satisfies the first condition;
      selects a block partitioning method from among the one or more second candidates; and
      splits the current chroma block according to the block partitioning method selected, and
   the plurality of first candidates include at least a ternary splitting in vertical direction and the one or more second candidates exclude the ternary splitting in vertical direction.

2. A decoder, comprising:
   circuitry; and
   memory coupled to the circuitry,
   wherein the circuitry, in operation:
      parses, from an encoded bitstream generated by encoding an image, block partitioning information relating to a block partitioning method according to which a current chroma block to be split in the image is split; and
      splits the current chroma block based on the block partitioning information parsed,
   when a shape of the current chroma block satisfies a first condition, the block partitioning information is generated by (i) generating one or more second candidates for a block partitioning method by eliminating one or more predetermined candidates from a plurality of first candidates for a block partitioning method and (ii) selecting a block partitioning method from among the one or more second candidates, and
   the plurality of first candidates include at least a ternary splitting in vertical direction and the one or more second candidates exclude the ternary splitting in vertical direction.

* * * * *